(12) United States Patent
Luk et al.

(10) Patent No.: US 12,262,665 B2
(45) Date of Patent: Apr. 1, 2025

(54) APPARATUS, ARTICLE AND SUPPORT FOR FAUX FLORAL ARRANGEMENTS

(71) Applicants: Han Luk, Hong Kong (HK); Edmond K. Chow, Hong Kong (HK)

(72) Inventors: Han Luk, Hong Kong (HK); Edmond K. Chow, Hong Kong (HK)

( * ) Notice: Subject to any disclaimer, the term of this patent is extended or adjusted under 35 U.S.C. 154(b) by 0 days.

(21) Appl. No.: 15/817,282

(22) Filed: Nov. 19, 2017

(65) Prior Publication Data

US 2019/0116738 A1 Apr. 25, 2019

Related U.S. Application Data

(63) Continuation-in-part of application No. 29/623,217, filed on Oct. 24, 2017.

(51) Int. Cl.

| A01G 5/04 | (2006.01) |
|---|---|
| A01G 5/00 | (2006.01) |
| A41G 1/00 | (2006.01) |
| A47F 7/00 | (2006.01) |
| A47G 7/00 | (2006.01) |

(52) U.S. Cl.
CPC ............... *A01G 5/04* (2013.01); *A41G 1/00* (2013.01); *A47F 7/00* (2013.01); *A47G 7/00* (2013.01)

(58) Field of Classification Search
CPC .... A01G 5/04; A01G 5/00; A01G 5/06; A47F 7/00; A47F 7/0014; A47F 7/0007; A47G 7/00
USPC ....... 248/27.8, 318; 47/41.11, 41.01, 12, 13, 47/11, 39, 41.1, 41.14; 211/85.23, 163, 211/164
See application file for complete search history.

(56) References Cited

U.S. PATENT DOCUMENTS

| 516,259 | A | * | 3/1894 | Brueckner | A01G 5/04 248/27.8 |
|---|---|---|---|---|---|
| 1,652,936 | A | * | 12/1927 | Heinz | A47F 5/01 211/181.1 |
| RE17,487 | E | * | 11/1929 | Heinz | A61G 17/04 211/181.1 |
| 1,907,917 | A | * | 5/1933 | White | A01G 5/04 108/16 |
| 1,994,694 | A | * | 3/1935 | Dobron | A01G 5/04 211/195 |
| 2,493,810 | A | * | 1/1950 | Gipson | A01G 17/06 248/27.8 |
| RE23,812 | E | * | 3/1954 | White | A01G 5/04 248/27.8 |
| 3,418,194 | A | * | 12/1968 | Loftice | A41G 1/00 132/251 |
| 3,458,384 | A | * | 7/1969 | Radus | A01G 5/04 24/357 |

(Continued)

*Primary Examiner* — Nkeisha Smith

(57) ABSTRACT

An invention is disclosed for apparatuses, articles, structures, and supports for faux or artificial floral arrangements. Embodiments of such an apparatus, article, structure and support would provide, among other benefits and advantages, a more reliable, adaptable and extensible support for elaborate and extensive arrangements of faux floral artifacts over an extended area in a three-dimensional manner. In addition, faux floral products that incorporate or are otherwise equipped with the invention would become more environmental friendly and cost effective, and easier to manufacture and transport than the current approaches in the art aimed for the same goals or benefits.

20 Claims, 53 Drawing Sheets

(56) References Cited

U.S. PATENT DOCUMENTS

| | | | | |
|---|---|---|---|---|
| 6,667,079 B1 * | 12/2003 | Glenn | ............... | A01G 5/04 |
| | | | | 211/85.31 |
| 7,406,798 B2 * | 8/2008 | Barrett | ............... | A47G 7/07 |
| | | | | 47/41.01 |
| 8,151,516 B1 * | 4/2012 | Harshman | ............ | A01G 5/04 |
| | | | | 47/41.01 |

\* cited by examiner

APPARATUS, ARTICLE AND SUPPORT FOR FAUX FLORAL ARRANGEMENTS

CROSS-REFERENCES TO RELATED APPLICATIONS

The present application is a continuation-in-part of U.S. application Ser. No. 29/623,217, filed Oct. 24, 2017 and entitled "APPARATUS, ARTICLE AND SUPPORT FOR FAUX FLORAL ARRANGEMENTS."

TECHNICAL FIELD

The present invention relates to apparatuses, articles, structures, and supports for faux or artificial floral arrangements. In particular, embodiments of the present invention provide improved apparatuses, articles and supports for supporting fabricated arrangements of floral artifacts, items or objects in a sturdy and cost effective manner, among other benefits and advantages.

BACKGROUND

Artificial, fake, or faux floral products possess unique advantages and characteristics that make them perennially relevant in homes, businesses, and marketplaces. These advantages and characteristics include, but not limited to, permanence, weather-independent availability, non-allergenicity, and ease of transport. However, sophisticated and elaborate arrangements of floral items, such as artificial flowers, posies, blossoms and leaves, often necessitate higher extraneous material and manufacturing costs, difficulty in transport, and increased defect rates and susceptibility to shape or form distortion, among other difficulties and challenges, when these arrangements are intended for a surface or space that spans across an area or extent larger than the footprint of several flowers, such as those for casket sprays.

For instance, a large block of Styrofoam or a platform of floral foams may be used to provide the frame, structure, or support for planar floral arrangements of faux flowers and leaves, such as those for casket sprays or wall decors, but the resulting products can be susceptible to breakage or deformation in transport, and difficult to stay in place on intended surfaces. A block or a thick sheet of solid plastic material may be used instead, but such a solution can increase the use of plastic and the weight of the product, thereby making it less environmental friendly and more costly in transport. These undesirable characteristics also entail higher costs to buyers and higher prices to consumers. There appears to be no apparatus, article or support in the art that has provided a base, frame or structure, planar or otherwise, to facilitate elaborate arrangements of artificial floral items and their production in a supply-optimal, transport-friendly and cost-effective way.

SUMMARY

In accordance with one aspect of the present invention or one of its embodiments, there is provided a support, such as a frame, structure, base, etc., for faux or artificial floral items that comprises the following parts: a part that provides or comprises an outline, or otherwise possesses a contour; and a plurality of other parts, each coming in contact with the part or a portion of that part, and extending inward of the outline or contour, or towards the inner space of the part forming or indicating the outline or contour. In this embodiment, the part may enclose three or more hollow spaces, each of which being formed by, or otherwise bordered by, the part and one or more of the other parts. In one aspect or embodiment, the part and the other parts of such a support may comprise or be made of solid material, such as plastic, metal, alloy, etc. In another aspect or embodiment, the outline or contour is closed, or in form of a loop or continuous line. In one aspect or embodiment, the outline or contour resembles a shape of polygon, and there exists a symmetry. In another aspect or embodiment, the outline or contour comprises one or more symmetries around at least two axes.

In one aspect or embodiment of the present invention, the part and the other parts of such a support may comprise a plurality of connectors (e.g., post and/or receptacle connectors), each of which being oriented for connection with one or more faux floral items at an angle (e.g., perpendicularly or at an angle of 45 degree or larger) from an imaginary plane or surface across the part and the other parts, thereby, for instance, enabling individual artificial flowers, posies, and blossoms (or any other artifacts) with an upright or vertical compatible connector (e.g., a female connector for mating with a male connector, or a post connector for mating with a receptacle connector) to stand upright or protrude upward with respect to the imaginary plane or surface.

According to another aspect or embodiment of the present invention, such a support may further comprise another plurality of connectors, each of which being oriented for connection at a different angle (e.g., horizontally or at an angle of less than 45 degree) from the imaginary plane or surface across the part and the other parts, thereby, for instance, enabling individual artificial leaves, posies, and blossoms (or any other artifacts) with a compatible connector to protrude sideways or lie closer to the horizon with respect to the imaginary plane or surface, or to extend the overall footprint of the support. This other plurality of connectors together with the plurality of connectors enable elaborate and sophisticated arrangements of artificial floral artifacts in a three-dimensional manner based on a planar or close-to-planar support. In addition, additional supports or parts may be attached or coupled to the planar support to extend structurally in a vertical and/or horizontal manner, thereby, for instance, providing structural extensibility as needed, while benefiting from the advantages afforded by the design of such a support.

According to one aspect or embodiment of the present invention, a portion of such a support, such as the part, a member of the plurality of parts, or a member of the other plurality of parts, has a cross section that comprises two contiguous shapes that are asymmetric to each other along a virtual or imaginary linear axis across the cross section, with one being smaller than the other in cross-sectional area. In one aspect or embodiment, the larger shape is rectangular, and the smaller shape is rectangular or square, with the smaller shape (or the middle of the smaller shape) being aligned at or near the middle of the length of the larger shape (i.e., the longer side of the larger rectangular shape). For example, the support may comprise a linear or curvature section where there is a raised band running along the line or curve at the middle, with the width of the raised band smaller than (e.g., 50% smaller than) the full or longest extent of the width of the section. In another aspect or embodiment, the larger shape may be rectangular, square, half-circular, half-oval, triangular, or trapezoid, and the smaller shape may also be rectangular, square, half-circular, half-oval, triangular, or trapezoid, with the smaller shape (or the middle of the smaller shape) being aligned at or near the middle of the length of the larger shape. In one aspect or embodiment, a side or surface of such a portion of the support comprises one or more connectors (female and/or male), where the side or surface is different from the side(s) or surface(s) of the portion making up or forming the smaller shape in cross section area. For example, in one aspect or embodiment, for a portion that comprises a rectangle and a square in cross section, with the length of the square short than the length of the rectangle, and the middle of the length of the square aligned with the middle of the length of the rectangle, one or more connectors may be found on the area or surface of the portion (of the support) that is opposite to the side or boundary, or axis associated with the length of the rectangle space that is next to the square space (or the length of the square space).

According to one aspect or embodiment of the present invention, a portion of such a support, such as the part, a member of the plurality of parts, or a member of the other plurality of parts, has a cross section that comprises a plurality of contiguous shapes, with one shape being the largest, and the other shapes attached to the largest shape on the same side or length of that shape. In one aspect or embodiment, the largest shape may be rectangular, square, half-circular, half-oval, triangular, or trapezoid, and one side of each of the other one or more shapes joins one side of the largest shape. In one aspect or embodiment, the largest shape is rectangular, and the other shapes are either square, triangular, or rectangular. This collection of the other shapes may comprise two shapes, each attaching to the same length or side of the largest rectangular shape, and being placed away from the either ends of the length or side of the largest rectangular shape, without touching each other. In another aspect or embodiment, these other shapes may comprise more than two shapes, where two of these other shapes each attach to the same length or side of the largest rectangular shape, and being flush with or placed near the either end of the length or side of the largest rectangular shape, with the remainder of these other shapes being placed in between these two shapes, and attached to the same length or side of the largest rectangular shape, while none of all these other shapes touches one another.

According to one aspect or embodiment of the present invention, a portion of such a support, such as the part, a member of the plurality of parts, or a member of the other plurality of parts, has a cross section that comprises a plurality of contiguous shapes, with one shape being the largest, and the other shapes attached to the largest shape on two or more sides or lengths of that shape. In one aspect or embodiment, the largest shape may be rectangular, square, half-circular, half-oval, triangular, or trapezoid, and one side of each of the other shapes joins one side of the largest shape. In one aspect or embodiment, the largest shape is rectangular, and the other shapes are either square, triangular, rectangular. These other shapes may comprise an odd number of shapes, with some of them being each attaching to one length or side of the largest rectangular shape, and the rest being each attaching to another length or side of the largest shape (e.g., the opposite length or side to each other). The length or side that attaches to or borders with the subset with the odd number of the other shapes attaches to or borders with a shape in the subset at or near the middle of the length or side, with the other shapes in the subset, if any, being placed on the either side of the shape at or near the middle, while none of the shapes in the subset touches one another. The length or side that has the other subset with the even number of the other shapes comprises two shapes in the other subset, each at or near the either end of the length or side, with the remainder or rest of the shapes in the subset, if any, being placed in between these two shapes at or near the either end of the length or side, while none of the shapes in the other subset touches one another. In one aspect or embodiment, the other shapes may comprise three shapes, with one shape attached at the middle of one length of the largest rectangular shape in the cross section, and the other two shapes each flushed with or attached close to the either end of the opposite length or side of the largest rectangular shape. In one aspect or embodiment, the attaching or joining side of the shape that is located at or near the middle is shorter by 50% than the full length of the attaching or joining side of the adjacent rectangular shape, and the attaching or joining side of each of the two shapes that is located at or near the either end is shorter by 33% than the full length of the other attaching or joining side of the adjacent rectangular shape. In one aspect or embodiment, such a portion of the support comprises one raised band running in or near the middle of a surface or side along the length or curve of a part of the support, and two raised bands running at or near the either edges of another surface or side (e.g., the opposite surface or side) along the same length or curve of the part. In another aspect or embodiment, one or more connectors (female or male) are located on this other surface or side. In one aspect or embodiment, one or more connectors are located between these two raised bands running along or being placed on this other surface or side.

According to yet another aspect or embodiment of the present invention, such a collection of the other shapes may comprise an even number of shapes, which may be divided into two subsets, each with an odd number of shapes, with one or more shapes in one subset each being attaching to one length or side of the largest rectangular shape, and one or more shapes in the other subset each being attaching to another length or side of the largest shape (e.g., the opposite length or side to each other). Each attaching or bordering length or side of the largest rectangular shape in the cross section attaches to or borders with a shape in the either subset, with the shape being placed at or near the middle of the length or side, while the remainder or rest of the shapes in the subset, if any, are placed on the either side of the shape at or near the middle, while none of the shapes in the subset touches one another. In one aspect or embodiment, the other shapes may comprise six shapes, with one shape attached at the middle of one length of the largest rectangular shape in the cross section, and two other shapes each flushed with or attached close to the either end of the same length or side of the largest rectangular shape. The remainder three shapes are likewise arranged and attached to the opposite length or side of the largest rectangular shape. In one aspect or embodiment, the attaching or joining side of each of the six shapes is shorter by 20% than the full length of an attaching or joining side of the rectangular shape.

According to yet another aspect or embodiment of the present invention, such a collection of the other shapes may comprise an even number of shapes, which may be divided into two subsets, each with an even number of shapes, with shapes in one subset each being attaching to one length or side of the largest rectangular shape, and shapes in the other subset each being attaching to another length or side of the largest shape (e.g., the opposite length or side to each other). Each attaching or bordering length or side of the largest rectangular shape in the cross section attaches to or borders with two shapes in the either subset, with each of these two shapes at or near the either end of the length or side, while the remainder or rest of the shapes in the subset, if any, are placed in between these two shapes at or near the either end of the length or side, and none of the shapes in each of these two subsets touches one another. In one aspect or embodiment, the other shapes may comprise four shapes, with two shapes each flushed with or attached close to the either end of the same length or side of the largest rectangular shape. The remainder two shapes are likewise arranged and attached to the opposite length or side of the largest rectangular shape. In one aspect or embodiment, the attaching or joining side of each of the four shapes is shorter by 33% than the full length of an attaching or joining side of the rectangular shape.

According to one aspect or embodiment of the present invention, the part of such a support that provides or comprises an outline, or otherwise possesses a contour, may comprise a plurality of extensions, where each of these extensions points outward from the outline or contour, and at least one of these extensions comprises one or more (male or female) connectors. In one aspect or embodiment, these extensions are linear or curving structures that extend along the same virtual or imaginary plane of the outline or contour. In one aspect or embodiment, at least one of the one or more connectors is placed on a surface or side of an extension, where the surface or side is perpendicular to the surface or side of a portion or section of the part where one or more raised bands or similar structures run along. In another aspect or embodiment, at least one of the one or more connectors is placed on a surface or side of an extension, where the surface or side is facing the same direction as that of the surface or side of a portion or section of the part where one or more raised bands or similar structure run along. In yet another aspect or embodiment, at least one of the one or more connectors is placed on a surface or side of an extension, where the surface or side is facing the opposite direction as that of the surface or side of a portion or section of the part where one or more raised bands or similar structure run along.

According to one aspect or embodiment of the present invention, the part of such a support that may provide or comprise an outline, or otherwise possess a contour, may comprise four or more hollow spaces, and the plurality of the other parts of such a support may each extend linearly inward of the outline or contour. In one aspect or embodiment, each of the four or more hollow spaces comprises at least four shapes, where each of the at least four shapes is either a triangle or a right-angled trapezoid. In one aspect or embodiment, such a support comprises another plurality of parts, each of which coming in contact with, or otherwise being attached to, one or more members of the plurality of the other parts. Each part from among the plurality of the other parts and the other plurality of parts may comprise two ends or points of connection or attachment, with each end or point being in contact with a second part and a third part respectively, where the second part is from among the plurality of the other parts or from the other plurality of parts, and the third part is also from among the plurality of the other parts or from the other plurality of parts. In one aspect or embodiment, the part, the plurality of other parts, and the other plurality of parts are interconnected in a non-articulated manner, such as a support made of plastic from a single mound, or a structure made of constitute parts (e.g., plastics) firmly glued or heat-sealed together. In one aspect or embodiment, each part from among the plurality of the other parts extends towards the center of the outline or contour formed by the part of the support, and each part from among the other plurality of parts extends across or between two parts from among the plurality of the other parts. In another aspect or embodiment, each part from among the other plurality of parts extends linearly across or between two parts from among the plurality of the other parts. In yet another aspect or embodiment, each part from among the other plurality of parts extends across or between two parts from among the plurality of the other parts, and two or more parts from among the other plurality of parts form a parenthesis or a round or angular bracket around the center of the outline or contour formed by the part of the support.

According to one aspect or embodiment of the present invention, the part of such a support that may provide or comprise an outline, or otherwise possess a contour, encloses or otherwise comprises at least three structures that are contiguous to one another, or arranged in a series, where each of the at least three structures has an outline or contour resembling a diamond or diamond-like shape with four or five corners or angles, and each of these structures includes, encloses, or otherwise comprises at least two shapes, each of the at least two shapes being either a triangle or a right-angled trapezoid. In one aspect or embodiment, the at least two shapes are hollow. In another aspect or embodiment, the four or more hollow spaces within or of the outline or contour-forming part of such a support may together comprise at least six shapes, where each of the six shapes is from among the at least two shapes associated with the three structures, or each of the three structures.

According to another aspect or embodiment of the present invention, the part of such a support that may provide or comprise an outline, or otherwise possess a contour, comprises two sets of extensions, the first set comprising a plurality of extensions being aligned in parallel with one another, and the second set comprising another plurality of extensions, each of which being aligned at an angle with an extension from among the first set. In one aspect or embodiment, such two sets of extensions together may comprise a plurality of connectors, for example, post connectors, and the plurality of connectors extend outward from the center of and along a plane formed by the outline or contour. One or more connectors in the plurality of connectors may be oriented at one or more angles different from some other connectors with respect to the extension that each connector is attached to, thereby enabling artificial floral artifacts (e.g., artificial leaves) that are attached to these connectors to fan out, or form a dispersing or radiating pattern, around the outline or contour.

According to another aspect or embodiment of the present invention, the part of such a support that may provide or comprise an outline, or otherwise possess a contour, comprises an outline resembling a shape of hexagon. The shape of hexagon comprises two parallel lines, a space or region within the outline comprises two or more patterns of structure, the space or region runs parallel to the two parallel lines, each of the two or more patterns of structure comprises at least two spaces, and the at least two spaces comprising at least two hollow spaces each resembling a shape of triangle. In one embodiment, the length of the outline is extended in proportion to the number of the patterns of structure, and the number of patterns is three or larger.

OBJECTS AND ADVANTAGES

Among other benefits and advantages, embodiments of the present invention are able to provide a stable and extensible support for elaborate and extensive arrangements of faux floral artifacts over an extended area in a three-dimensional manner, and faux floral products that incorporate or are otherwise equipped with it become more environmental friendly, and are easier to manufacture and transport. These and other aspects of the present invention provide significant benefits and advantages over prior art. Further objects and advantages of the present invention will become apparent from consideration of the description or disclosure herein.

DETAILED DESCRIPTION OF ILLUSTRATIVE EMBODIMENTS

Disclosed are apparatuses, articles, structures and supports for faux or artificial floral arrangements in accordance with the present invention.

Figure 1:
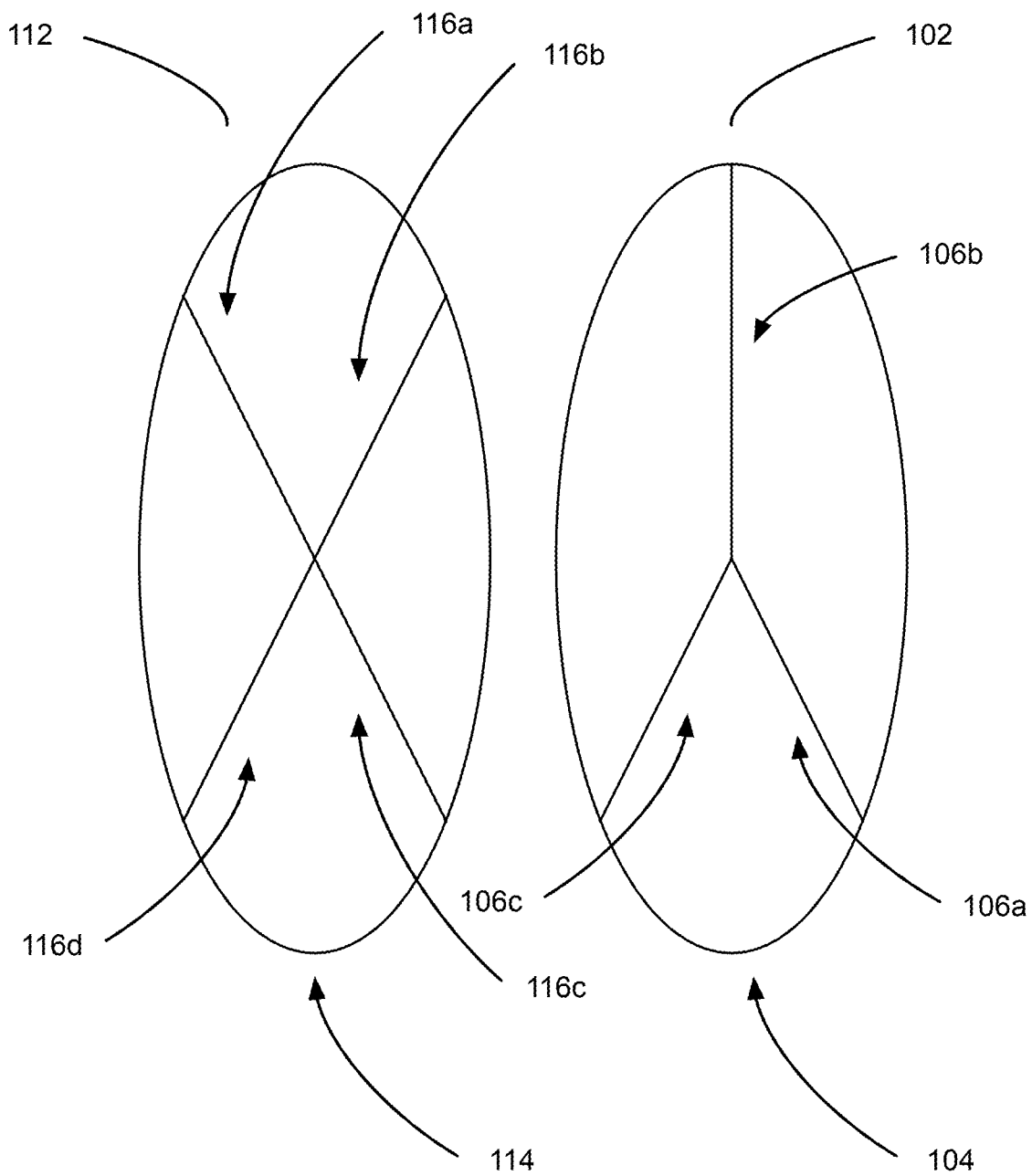
FIG. 1 illustrates a design in accordance with an embodiment of the present invention.

Figures herein or herewith illustrate a plenty of design and functional aspects and features in accordance with various embodiments of the present invention. For instance, FIG. 1 illustrates a design 102 of support for faux or artificial floral items, such as a frame, structure, base, etc., that comprises a rim or an outer part 104 enclosing or otherwise containing a plurality of parts 106a, 106b, 106c, where these parts each have at least one end attached or connected to the outer part 104, and the other end also attached or connected (e.g., to an end of another part among the plurality of parts 106a, 106b, 106c). In one embodiment, these parts are linear, and they together partition into a plurality of subspaces or hollow spaces the inner of an outline or contour formed by the rim or outer part 104. In one embodiment, a plurality of connectors, such as post connectors (not shown in FIG. 1), are placed on the outer part 104 and one or more of the linear parts 106a, 106b, 106c, such that some of these connectors are oriented for connection or mating with faux or artificial floral items along or parallel to the inner geometrical plane or surface enclosed by the outer part 104, while some other of these connectors are oriented for connection or mating perpendicular to or at an angle from the inner geometrical plane or surface. Such design facilitates, for instance, arrangement of faux floral items to expand or extend both horizontally (e.g., along or parallel to the inner geometrical plane or surface, and radially away from the outer part 104) and vertically (e.g., above and beyond the inner geometrical plane or surface). For example, a by-and-large two-dimensional support based on or otherwise embodying the design 102 may be placed or laid upon a flat or horizontal surface, thereby holding up or serving as a base or prop for a three-dimensional faux floral arrangement.

In one embodiment, one or more cross sections of the outer part 104 and the plurality of linear parts 106a, 106b, 106c resemble a shape of rectangle. In another embodiment, one or more cross sections of the outer part 104 and the plurality of linear parts 106a, 106b, 106c resemble a shape of oval or circle. In yet another embodiment, one or more cross sections of the outer part 104 and the plurality of linear parts 106a, 106b, 106c resemble a shape of polygon. In one embodiment, the outer part 104 and the plurality of linear parts 106a, 106b, 106c are made of or otherwise comprise plastic material, and these parts are connected without any articulated joints. In one embodiment, the outer part 104 and the plurality of linear parts 106a, 106b, 106c belong to a single molding, or are otherwise produced into a single piece by molding. In another embodiment, one or more of the connections among these parts are formed via glues or adhesives. In some embodiments of the design 102, while the support may be flexible, elastic, or bendable to some extent, it is structurally stable to preserve its shape and form for its intended faux floral arrangement(s). For example, a wide range of organic polymers such as polyethylene, polyvinyl chloride (also known as PVC), nylon, cellulose acetate, and crinothene, can be molded into a firm or stable form, with a shape resembling the design 102.

A design 112 in FIG. 1 comprises a rim or an outer part 114 that encloses or otherwise contains a plurality of linear parts 116a, 116b, 116c, 116d, where these linear parts each have at least one end attached or connected to the outer part 114, and the other end also attached or connected (e.g., to an end of another linear part among the plurality of linear parts 116a, 116b, 116c, 116d). In one embodiment, these linear parts together partition into four subspaces or hollow spaces the inner of an outline or contour formed by the rim or outer part 114. In one embodiment, such a support may comprise a plurality of linear parts, and two or more of these linear parts may be connected to extend into or otherwise constitute a longer linear part whose ends both attach or connect to the outer part of this support. For example, if the design 112 is regarded as having two linear parts that partition the inner of the outer part 114 into four hallow spaces, then the parts 116a and 116c would be one of these two linear parts, and the parts 116b and 116d, the other.

In one embodiment, a plurality of connectors, such as post connectors (not shown in FIG. 1), are placed on the outer part 114 and one or more of the linear parts 116a, 116b, 106c, 106d, such that some of these connectors are oriented for connection or mating with faux or artificial floral items along or parallel to the inner geometrical plane or surface enclosed by the outer part 114, while some other of these connectors are oriented for connection or mating perpendicular to or at an angle from the inner geometrical plane or surface. In one embodiment, one or more cross sections of the outer part 114 and the plurality of linear parts 116a, 116b, 116c, 116d are rectangular. In another embodiment, one or more cross sections of the outer part 114 and the plurality of linear parts 116a, 116b, 116c, 116d are of oval or circular shape. In yet another embodiment, one or more cross sections of the outer part 114 and the plurality of linear parts 116a, 116b, 116c, 116d are of polygon. In some embodiments of the design 112, while the support may be flexible, elastic, or bendable to some extent, it is structurally stable to preserve its shape and form for its intended faux floral arrangement(s). For example, a wide range of organic polymers such as polyethylene, polyvinyl chloride (also known as PVC), nylon, cellulose acetate, and crinothene, can be molded into a firm or stable form, with a shape resembling the design 112.

Figure 2:
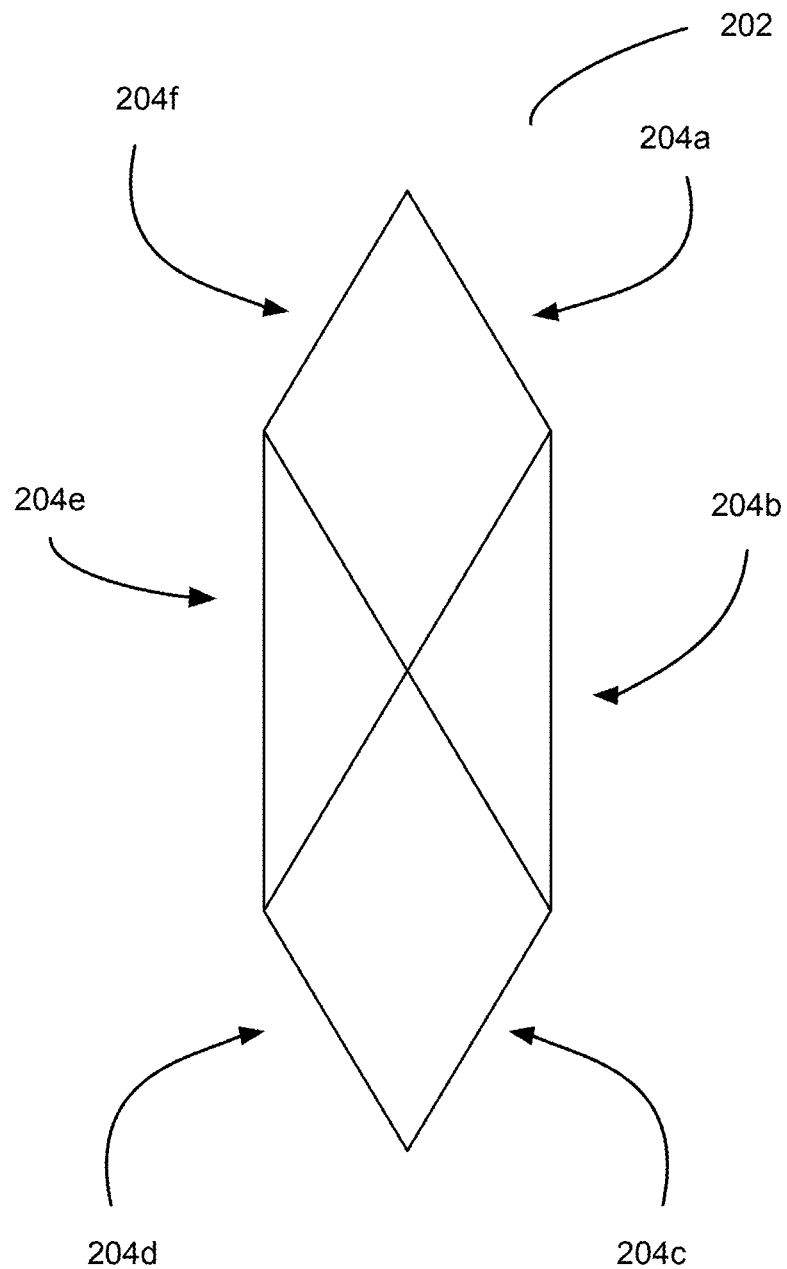
FIG. 2 illustrates another design in accordance with an embodiment of the present invention.

FIG. 2 illustrates another design aspect in accordance with an embodiment of the present invention. A design 202 of support for faux or artificial floral items, such as a frame, structure, base, etc., comprises a rim or an outer part that is of a polygon shape, resembling a hexagon (with subparts or sides 204a, 204b, 204c, 204d, 204e, 204f). The outer part encloses or otherwise contains a plurality of linear parts, which are similar to the plurality of linear parts 116a, 116b, 116c, 116d shown in FIG. 1. These linear parts partition into a plurality (e.g., two) of triangle-shaped subspaces or hollow spaces, and a plurality (e.g., two) of diamond-shaped subspaces or hollow spaces the space enclosed by the hexagon-shaped rim or outer part. Applicable to at least one manufacturing process, the design 202 is better than the design 112, in that the former can be easier to make with the same or lower defect rates in a large quantity than the latter. In addition, applicable to at least one material, the design 202 is better than the design 112, in that the former can be more resilient to deformation, for example, during transport or placement, than the latter.

Figure 3:
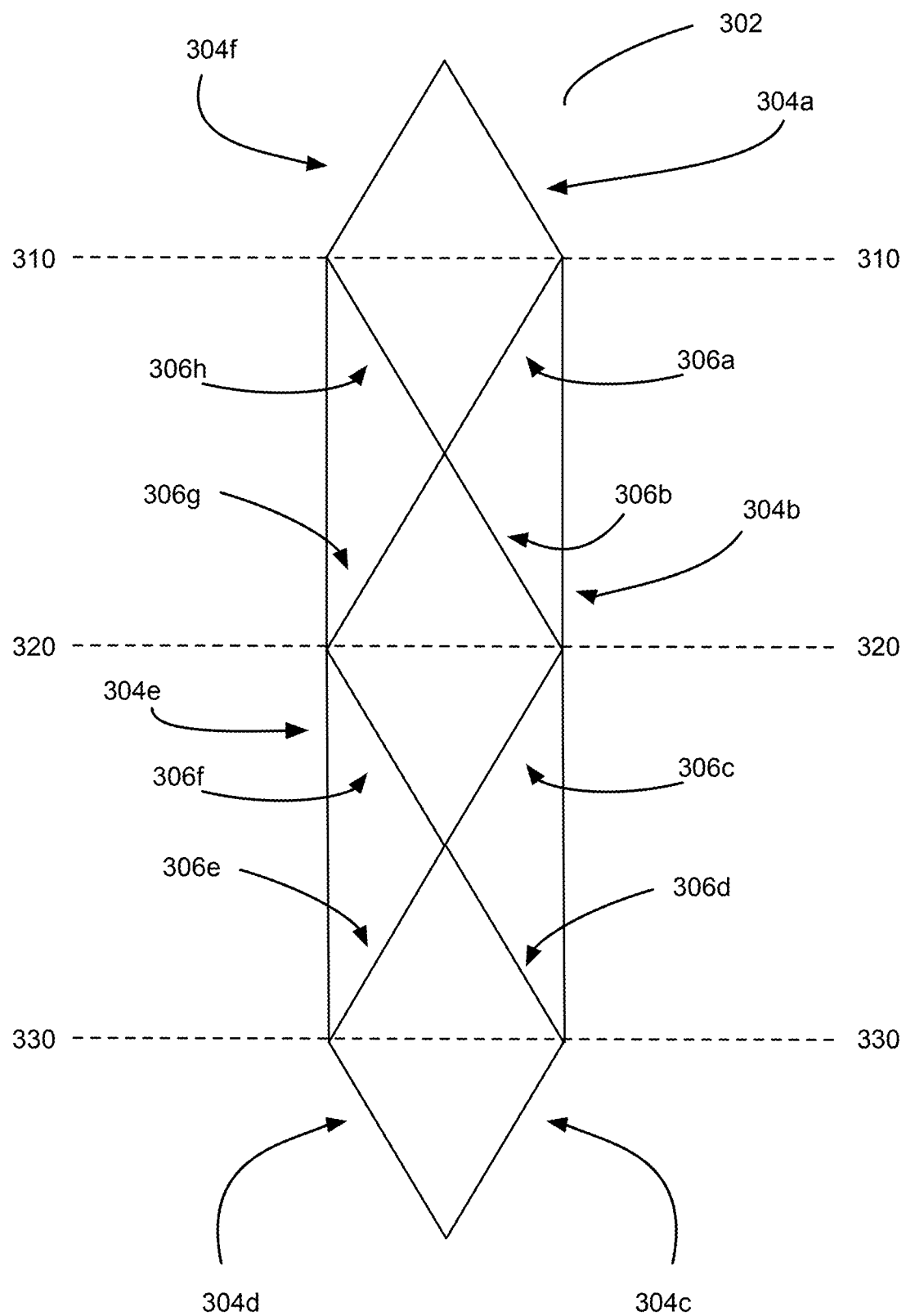
FIG. 3 illustrates another design aspect in accordance with an embodiment of the present invention.

FIG. 3 illustrates another design aspect in accordance with an embodiment of the present invention. A design 302 of support for faux or artificial floral items, such as a frame, structure, base, etc., comprises a rim or an outer part that is of a polygon shape, resembling a hexagon (with subparts or sides 304a, 304b, 304c, 304d, 304e, 304f). The rim or outer part encloses or otherwise contains a plurality of linear parts 306a, 306b, 306c, 306d, 306e, 306f, 306g, 306h. Similar to the design 202, these linear parts partition into a plurality (e.g., four) of triangle-shaped subspaces or hollow spaces, and a plurality (e.g., three) of diamond-shaped subspaces or hollow spaces the space enclosed by the hexagon-shaped rim or outer part. By incorporating additional linear parts (e.g., doubling those in the design 202) within the rim or outer part, a support with design similar to the design 202 can be extended length-wise, while preserving the structural advantages or characteristics of the design, as illustrated in the design 302. For instance, in one embodiment, a part or portion similar to one delimited between or otherwise identified by the non-solid illustrative lines 310 and 320 (or by the non-solid illustrative lines 320 and 330) may extend the length of a support with design similar to the design 302 by being inserted between the top half of the support (e.g., the part above the non-solid illustrative line 320), and the bottom half of the support (e.g., the part below the non-solid illustrative line 320), thereby partitioning into six triangle-shaped subspaces or hollow spaces, and four diamond-shaped subspaces or hollow spaces the space enclosed by the hexagon-shaped rim or outer part. (Not shown in FIG. 3.) One of ordinary skill in the art would readily appreciate that more than one such part or portion can be used to extend indefinitely the length of the support, while preserving or otherwise maintaining the hexagon or hexagon-like shape of the rim or outer part.

Figure 4:
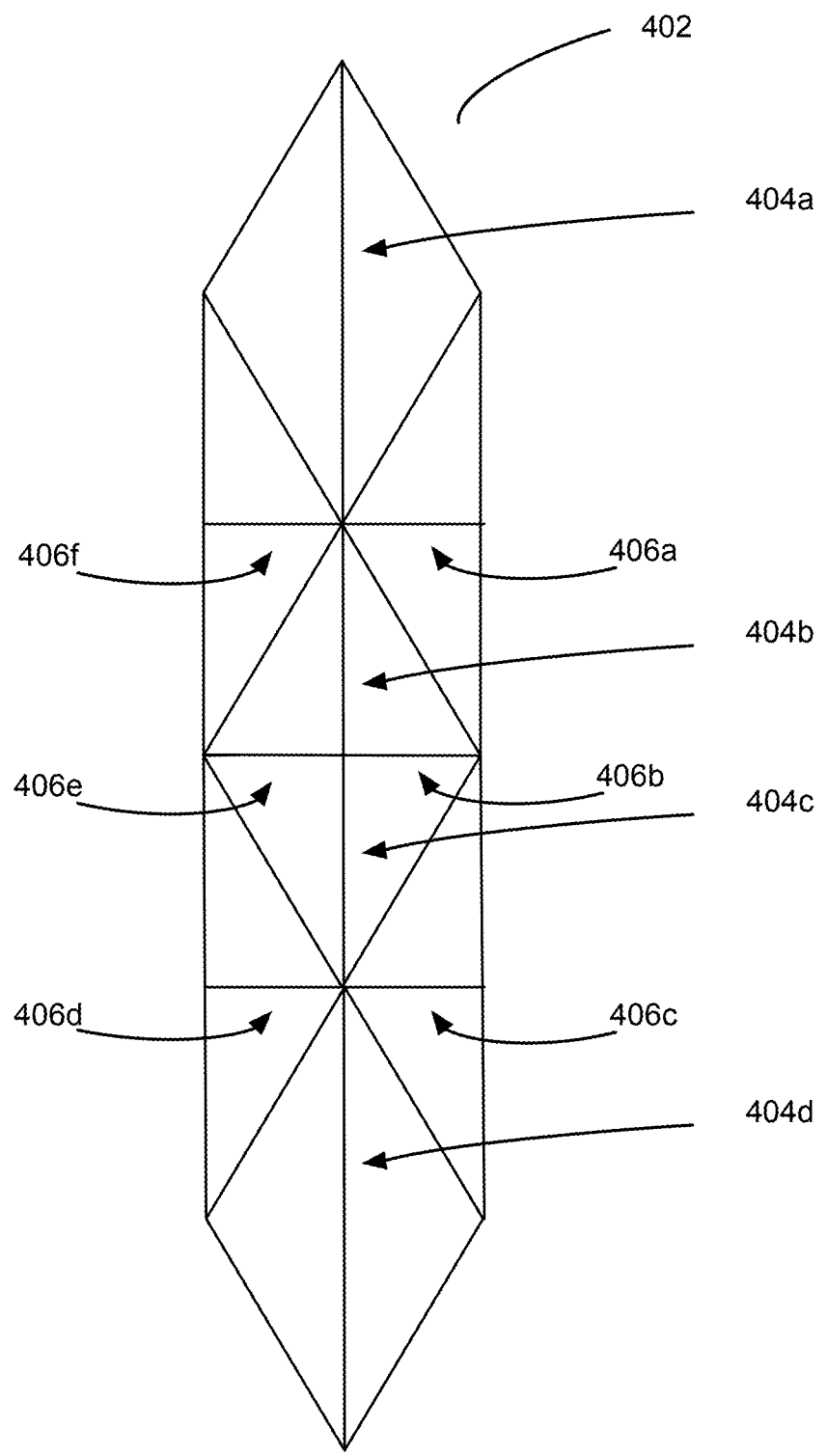
FIG. 4 illustrates another design aspect in accordance with an embodiment of the present invention.

FIG. 4 illustrates another design aspect in accordance with an embodiment of the present invention. A design 402 of support is similar to the design 302, with the addition of linear parts, some of which (e.g., linear parts 404a, 404b, 404c, 404d) run parallel to the two length-wise parallel lines or subparts of the hexagon or hexagon-like shape of the rim or outer part, and the other of which (e.g., linear parts 406a, 406b, 406c, 406d, 406e, 406f) run across them. If the quantity or number of such additional linear parts in the design 402 is four, then the linear parts 404a, 404b, 404c, 404d may constitute one linear part, and the linear parts 406a and 406f, the linear parts 406b and 406e, and the linear parts 406c and 406d may constitute each of the other three linear parts, respectively. In comparison to the design 302, the design 402 comprises more inner or hollow spaces that resemble a shape of triangle (e.g., 16 in total), and less that resemble a shape of diamond (e.g., zero). Applicable to at least one manufacturing process and/or one type of material, a support manufactured based on the design 402 possesses more resiliency to deformation in shape, and/or more surface for placement of connectors (thereby allowing more elaborate faux floral arrangement patterns), than a support based on the design 302, while the design 402 would require more material to make, with all other factors being equal.

Figure 5:
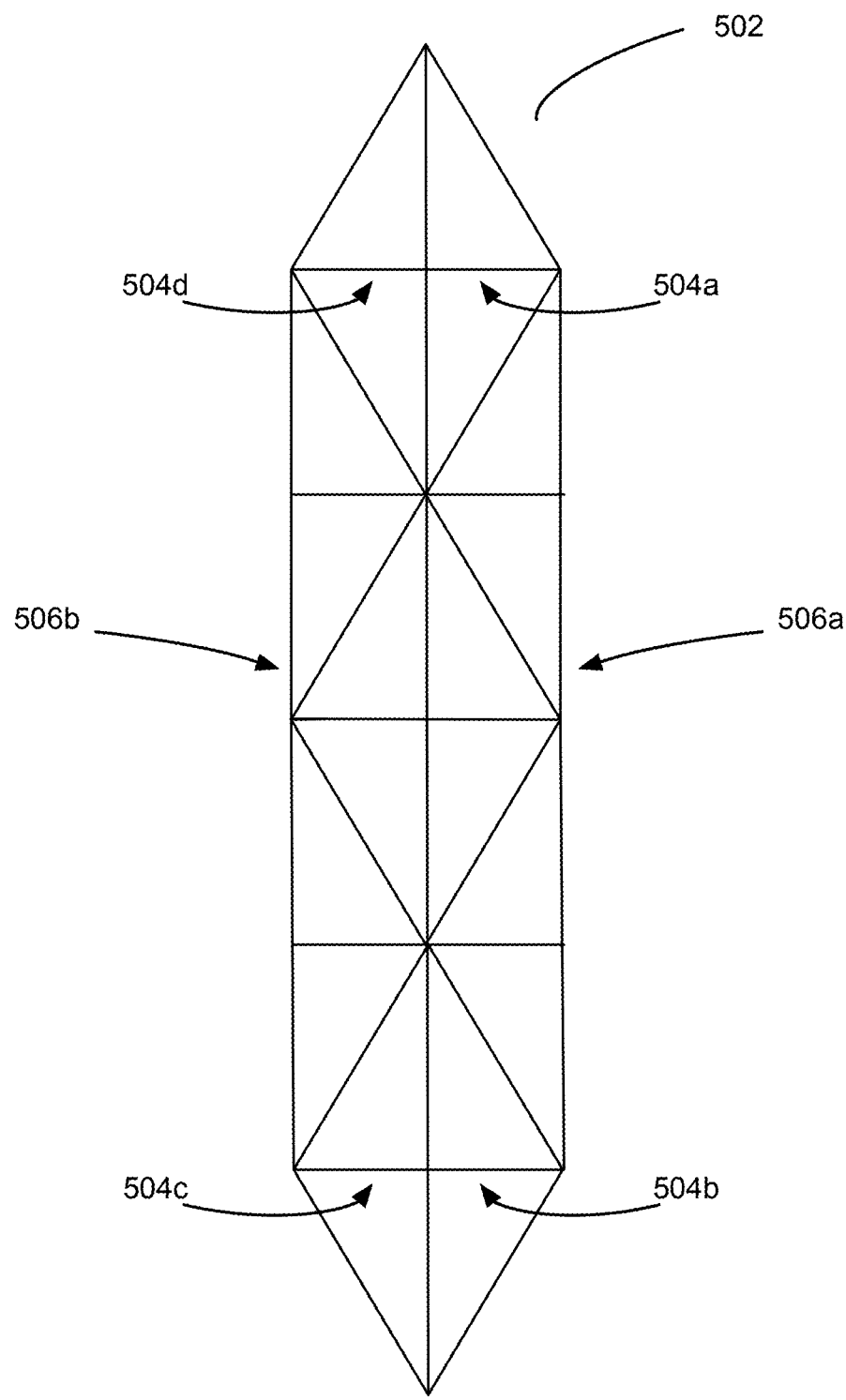
FIG. 5 illustrates yet another design aspect in accordance with an embodiment of the present invention.

FIG. 5 illustrates another design aspect in accordance with an embodiment of the present invention. A design 502 of support is similar to the design 402, with the addition of linear parts (e.g., linear parts 504a, 504b, 504c, 504d) that run across the two length-wise parallel lines or subparts of the hexagon or hexagon-like shape of the rim or outer part. If the quantity or number of such additional linear parts in the design 502 is two, then the linear parts 504a and 504d may constitute one, and the linear parts 404b and 404c may constitute the other. In comparison to the design 402, the design 502 comprises more inner or hollow spaces that resemble a shape of triangle (e.g., 20 in total). Applicable to at least one manufacturing process and/or one type of material, a support manufactured based on the design 405 possesses more resiliency to deformation in shape, and/or more surface for placement of connectors (thereby allowing more elaborate faux floral arrangement patterns), than a support based on the design 402. Specifically, the two additional horizontal structures based on the linear parts 504a, 504b, 504c, 504d that are placed near the top and the bottom respectively in relation to the shape or orientation of the support shown in FIG. 5 enable faux floral artifacts to be attached close to, or otherwise placed near, the middle of the support at the respective ends of the two length-wise parallel lines or portions 506a, 506b of the hexagon-shaped or hexagon-like support. As such, the design 502 not only provides additional resilience to deformity in shape, but also enables securer, sturdier, and/or easier placement of faux floral artifacts onto those locations or areas of the support, without the need of excessive material.

Figure 6:
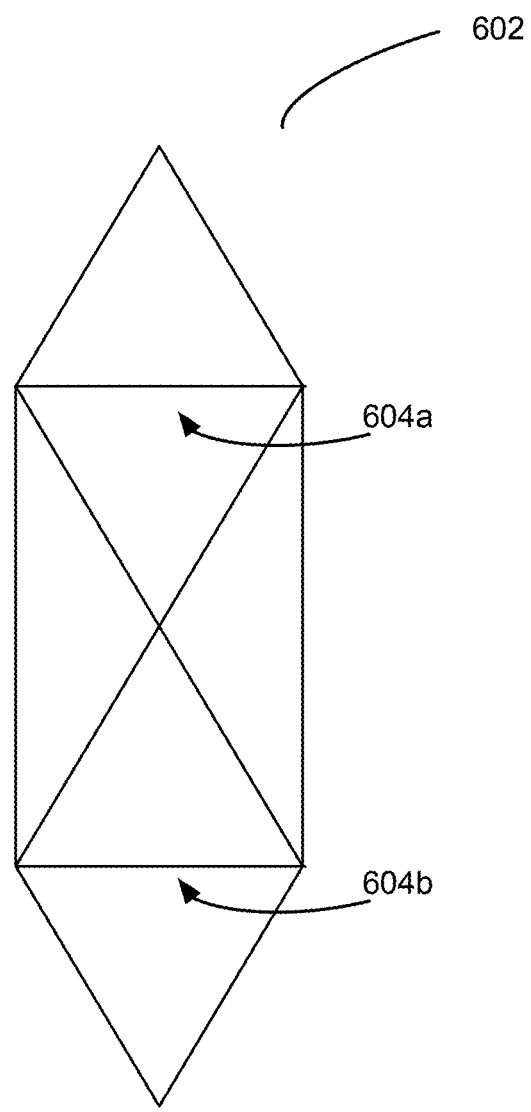
FIG. 6 illustrates a design where more parts are added to another design, in accordance with an embodiment of the present invention.

FIG. 6 illustrates a design 602 where linear parts 604a, 604b are added to the design 202 shown in FIG. 2, similarly to the addition of the linear parts 504a, 504d, as well as that of linear parts 504b, 504c (shown in FIG. 5) to the design 402 shown in FIG. 4. Hence, such additions, as a whole or in part, can improve supports for faux floral arrangement when these supports do not necessarily have the same structure, length, dimension, or quantity of parts, among other variations.

Figure 7:
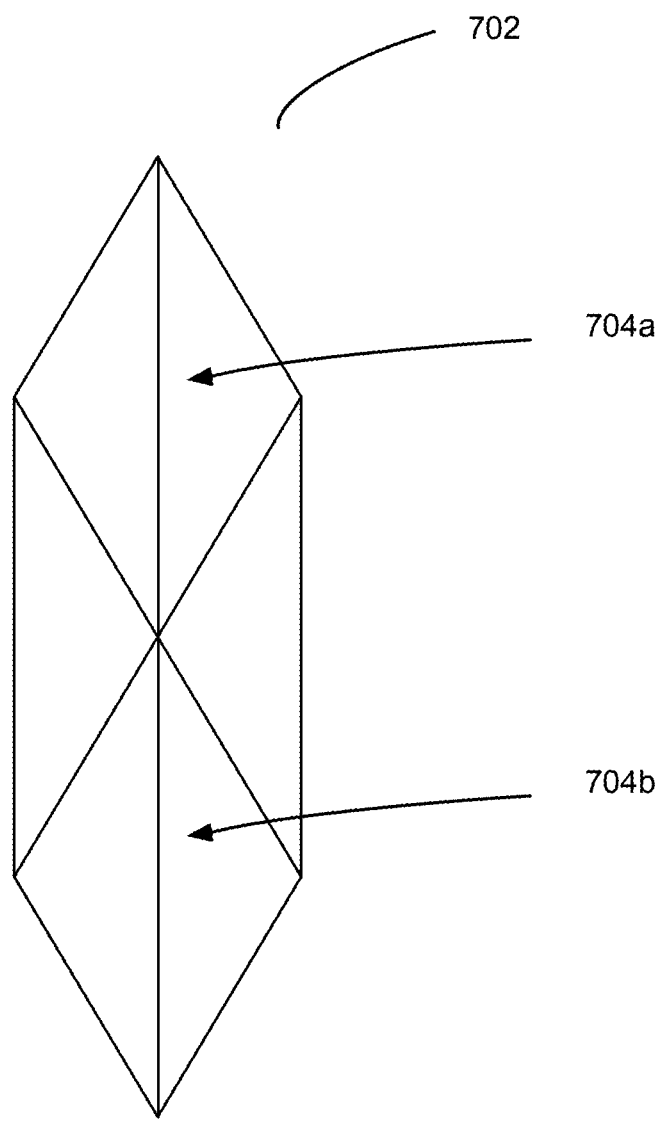
FIG. 7 illustrates a second design where more parts are added to another design, in accordance with an embodiment of the present invention.

Likewise, FIG. 7 illustrates a design 702 where linear parts 704a, 704b are added to the design 202 shown in FIG. 2, similarly to the addition of the linear parts 404a, 404b, 404c, 404d (shown in FIG. 4) to the design 302 shown in FIG. 3. Hence, such addition(s), as a whole or in part, can also improve supports for faux floral arrangement when these supports do not necessarily have the same structure, length, dimension, or quantity of parts, among other variations.

Figure 8:
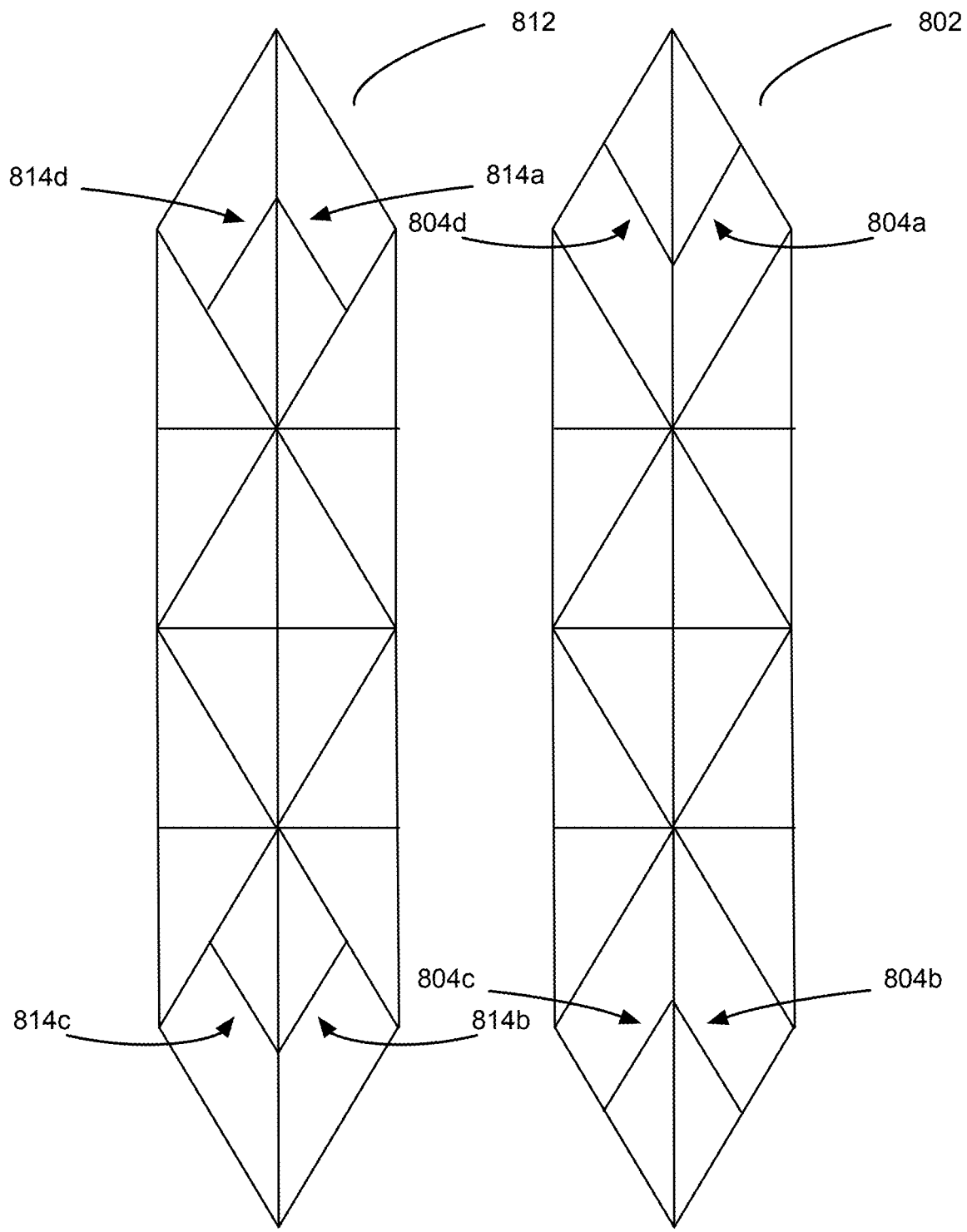
FIG. 8 illustrates multiple designs each of which comprises additional linear parts in relation to another design, in accordance with an embodiment of the present invention.

FIG. 8 illustrates designs 802, 812, each of which comprises additional linear parts in relation to the design 402 (shown in FIG. 4), and the orientation of these additional linear parts differs from those additional linear parts in the design 502 (shown in FIG. 5). For instance, where the additional linear parts 504a, 504b, 504c, 504d, run across the two length-wise parallel lines or subparts of the hexagon or hexagon-like shape of the rim or outer part, the additional linear parts 804a, 804d, form a V-shape, with the vertex pointing toward the center of the support, and being located on the middle part, or one of the middle parts, that run parallel to the two outer and opposite length-wise parallel lines or subparts of the rim or outer part, such as the two length-wise parallel lines or portions 506a, 506b in FIG. 5. The additional linear parts 804b, 804c, also form a V-shape, with the vertex oriented and located likewise. On the other hand, the additional linear parts 814a, 814d, form an inverted V-shape, with its apex pointing away from the center of the support, and being located on the middle part, or one of the middle parts, that run parallel to the two outer and opposite length-wise parallel lines or subparts of the rim or outer part, such as the two length-wise parallel lines or portions 506a, 506b in FIG. 5. The additional linear parts 814b, 814c, also form an inverted V-shape, with the apex oriented and located likewise. These additional parts 804a, 804b, 804c, 804d enable a support, such as one comprising or otherwise embodying, for example, any of the designs 202, 302, 402, to have more artificial floral artifacts placed at the top and the bottom of a vertically-standing support. While both the designs 502 and 802 provide more area for such placement, a support based on the design 802 provides additional areas closer to the tip of the either end, than a support based on the design 502. On the other hand, a support based on the design 812 provides additional areas closer to the center of the support, than a support based on the design 502. These differences provide for practical advantages in relation to patterns of faux floral arrangements of interest. For example, for an overall oval-shaped faux floral arrangement pattern, a support embodying the 812 design may provide a better structure and points of attachment for faux floral artifacts than one embodying the 502 design. In one embodiment, additional parts forming a U-shape or an inverted U-shape may be used in instead of, or in addition to, a V-shape or an inverted V-shape. In another embodiment, a support may comprise one or more inner parts or structures, where each of the one or more inner parts or structures comprises at least two ends, and the at least two ends do not touch the outer part. Addition of such parts or structures provides more freedom of placement of faux floral artifacts onto the support, based on the requirement of a specific arrangement pattern, than what might have been restricted, bounded or otherwise made less convenient by the outer part, and/or the inner parts that touch the outer part with at least one of their ends. In one embodiment, these inner parts or structures are beam-shaped or linear. The parts 814a and 814d are an example of such parts or structures.

Figure 9:
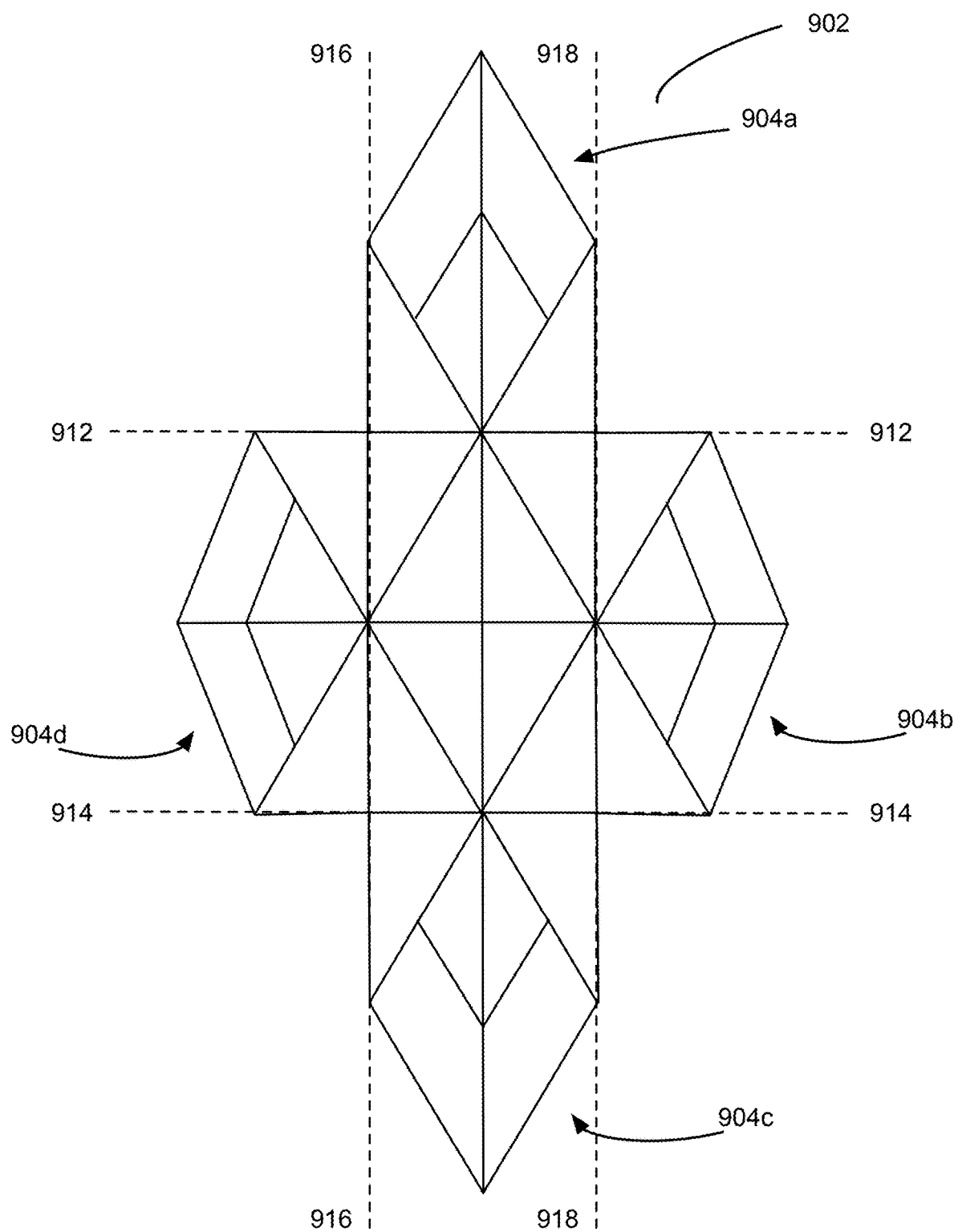
FIG. 9 illustrates a design that comprises another design, with parts or structures extending from the lengthwise sides, in accordance with an embodiment of the present invention.

FIG. 9 illustrates a design 902 that comprises the design 902, with parts or structures extending from the lengthwise sides. The shape of the design 902 resembles a cross, with four arrow-like or pointy ends. The part, composite part, portion or structure 904b (to the right as delimited by lines 912, 914 and 918 shown in FIG. 8) resembles the pattern of the part, composite part, portion or structure 904a (to the top as delimited by lines 912, 916 and 918 shown in FIG. 8) or that of the part, composite part, portion or structure 904c (to the bottom as delimited by lines 914, 916 and 918 shown in FIG. 8). The part 904b, or a part similar to it, enables or otherwise supports faux floral arrangements of, for example, an oval or elliptical shape at the base, with a higher ratio of semi-minor axis of length to semi-major axis of length. In one embodiment, the lengths of the parts 904a, 904b, 904c, 904d, are approximately equal, such that a support embodying this design supports faux floral arrangements of a circle shape at the base (e.g., the ratio of semi-minor axis of length to semi-major axis of length, being close to one). In another embodiment, the length or dimension of each of the parts 904a, 904b, 904c, 904d may differ from one another, such that a support embodying the design may support faux floral arrangements of other shapes or forms, e.g., a pear shape.

Figure 10:
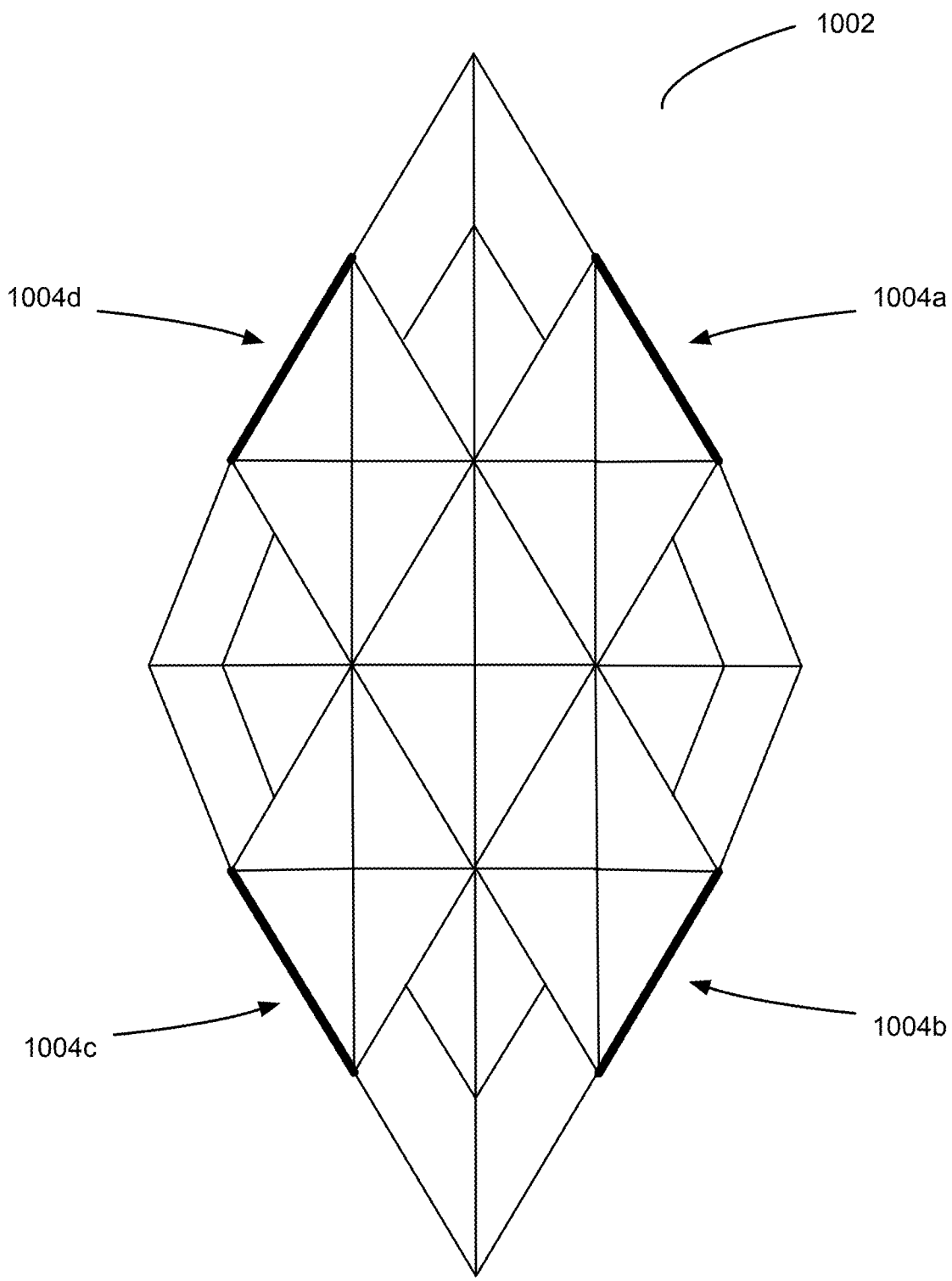
FIG. 10 illustrates a design that comprises another design, with additional parts or structures, in accordance with an embodiment of the present invention.

FIG. 10 illustrates a design 1002 that comprises the design 902, with parts or structures 1004a, 1004b, 1004c, 1004d, and a support embodying the design 1002 comprises a rim, a contour, or an outline that resembles a shape of a diamond. These additional parts or structures, without the need of excessive material, further reinforce the resiliency to deformation of the shape of the support, while adding more surfaces to attach faux floral artifacts for an arrangement in shape of an oval or circle.

Figure 11:
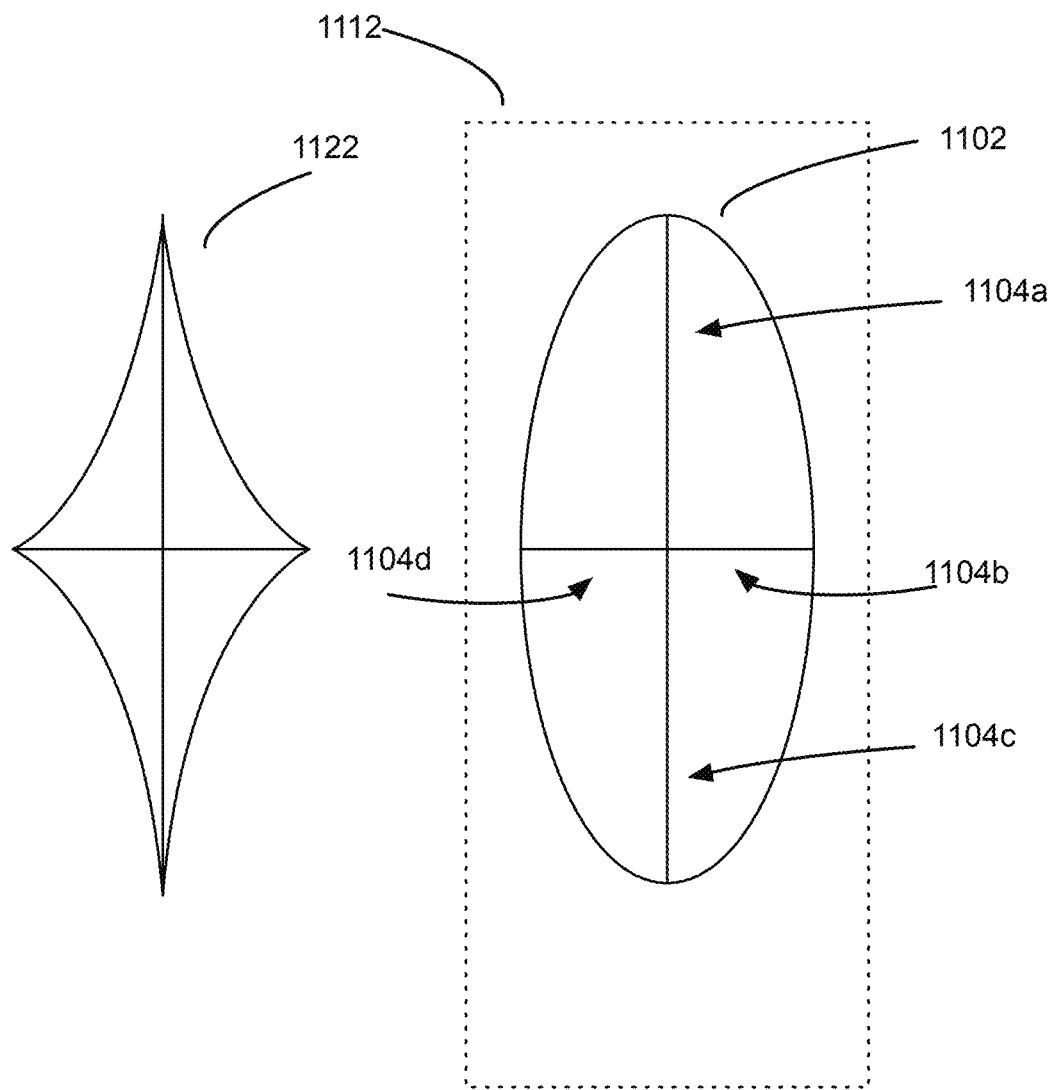
FIG. 11 illustrates a design, with one or more inner parts oriented differently with respect to the orientation of the inner parts in another design, in accordance with an embodiment of the present invention.

FIG. 11 illustrates a design 1102, with inner parts 1104a, 1104b, 1104c, 1104c, oriented differently with respect to the orientation of the inner parts 116a, 116b, 116c, 116d in the design 112 (shown in FIG. 1). Being placed on a rectangular surface 1112, such as the surface of a casket or coffin, a support, frame, or base that embodies the design 1102 and underpin a faux floral arrangement would have inner parts aligned with the length and width of such a surface. This allows for closer proximity of placement of faux floral artifacts onto the vertical (or major) axis and the horizontal (or minor) axis of the support, frame or base. In some situations, the outer part of such a support might not be optimal for its application, for example, if the faux floral arrangement resembles a cross. In one embodiment, a design 1122 may be used for faux floral arrangements that resemble a cross.

Figure 12:
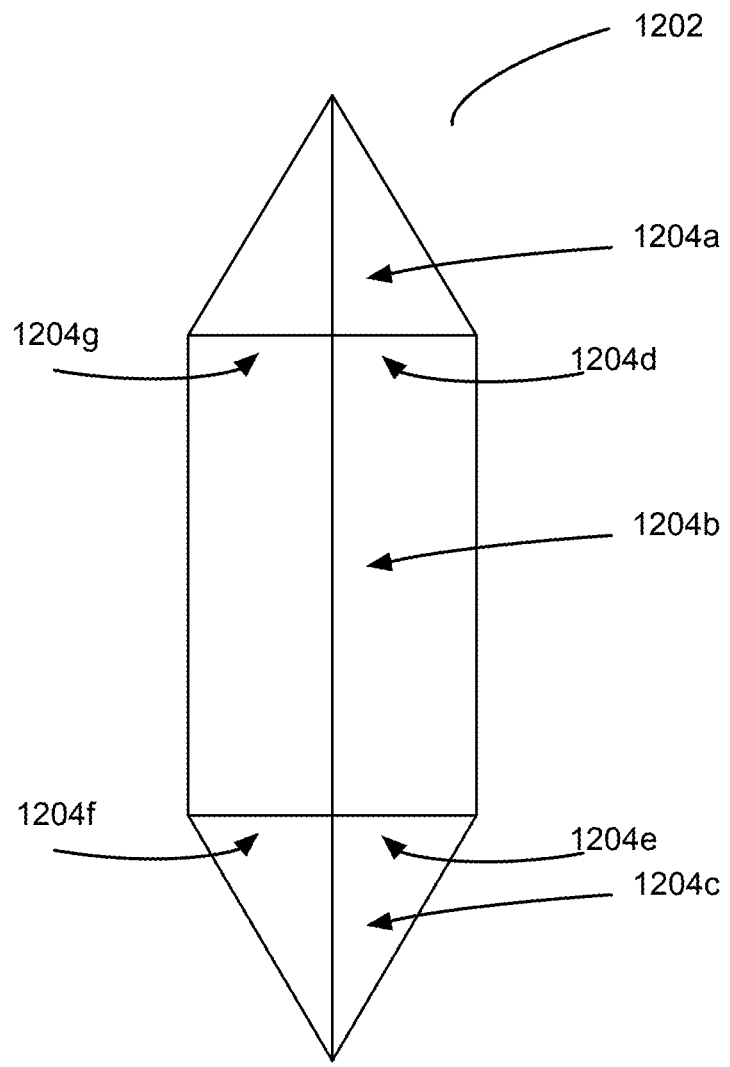
FIG. 12 illustrates a design that comprises a rim, contour, or outline resembling a hexagon, in accordance with an embodiment of the present invention.

FIG. 12 illustrates a design 1202 that comprises a rim, contour, or outline resembling a hexagon. Similar to the design 1102 (shown in FIG. 11), the design 1202 possesses inner parts that can be aligned with the length (e.g., parts 1204a, 1204b, 1204c) and width (e.g., parts 1204d, 1204e, 1204f, 1204g) of a rectangular surface, or a surface whose footprint or outline is close to a rectangle in shape, intended for placement of a faux floral product.

Figure 13:
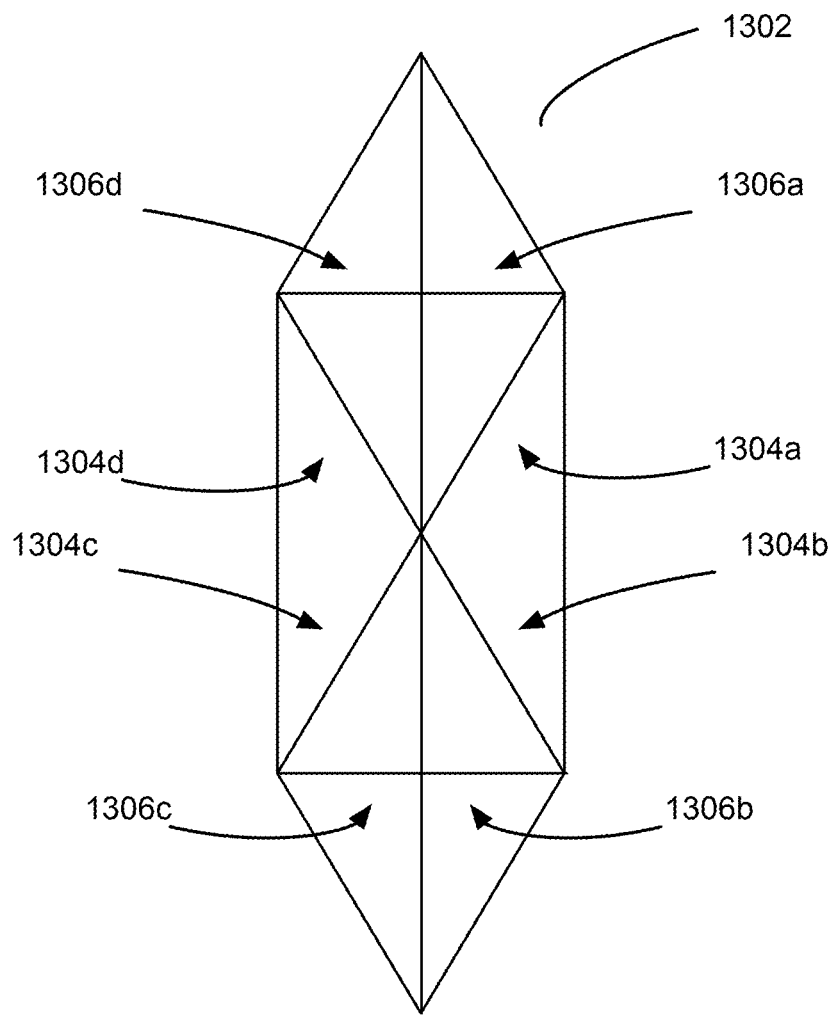
FIG. 13 illustrates a design that comprises another design, with additional parts or structures, in accordance with an embodiment of the present invention.

FIG. 13 illustrates a design 1302 that comprises the design 1202, with additional parts or structures. For instance, the inner parts and structures 1304a, 1304b, 1304c, 1304d, are oriented at an angle to the length and width of a rectangular surface intended for placement of a faux floral product. Without the need of excessive material, they together provide not only further reinforcement to withstand deformation of the shape or form of the support embodying the design, but also more estate or surfaces for attachment of or connection to faux floral artifacts that may be placed diagonally across the center region of the support.

Figure 14:
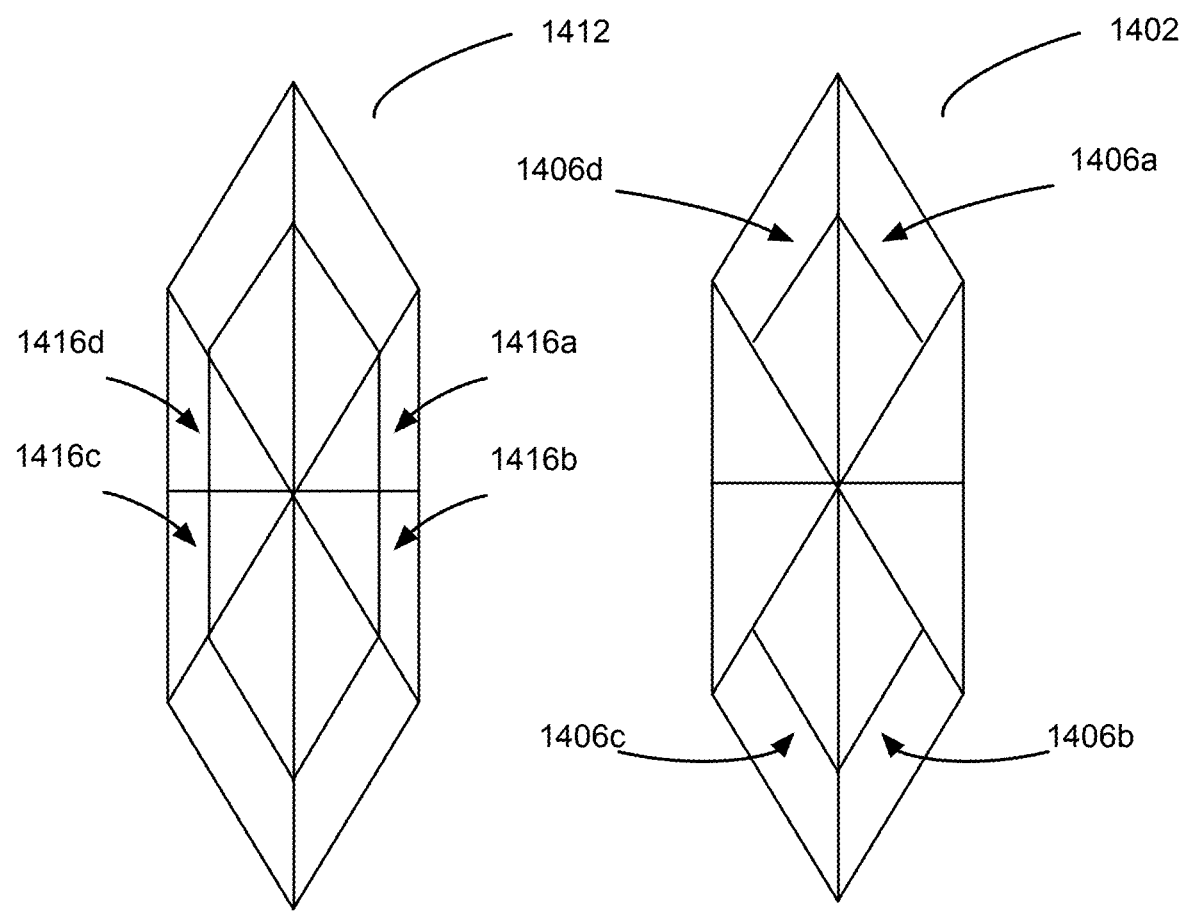
FIG. 14 illustrates a design that comprises one or more inner parts, and the one or more inner parts may form an inverted V-shape, in accordance with an embodiment of the present invention.

FIG. 14 illustrates a design 1402 that comprises inner parts 1406a, 1406d, as well as inner parts 1406b, 1406c, that form an inverted V-shape with its apex pointing away from the center, where none of the constituent parts of the inverted V-shape touches the outer part without an outline, contour, or rim resembling a shape of hexagon. (In one aspect, a difference between the designs 1402 and 1302 is similar to that between the designs 812 and 502.) In at least one embodiment, a support embodying the design 1402 is suitable for faux floral arrangements with an overall oval or elliptical shape, where, for example, a several successions of oval-shaped bands of faux flowers may be arranged around the center, with a center-piece being placed at the center. FIG. 14 also illustrates a design 1412 that comprises the design 1402, with additional inner parts 1416a, 1416b, 1416c, 1416d, whose ends do not touch the outer part. In one embodiment, a support embodying the design 1412 might be more suitable than a support embodying the design 1402, if, for example, the faces of some faux floral artifacts essential to the presentation or arrangement are relatively small in comparison to the spaces or gaps between the inner parts. In another embodiment, a support embodying the design 1402 is just as adequate or sufficient as a support embodying the design 1412 to underpin the same faux floral arrangement. In one embodiment, a support embodying the design 1402 is better than a support embodying the design 1412 because it uses less material to make, while providing or affording the same or similar sufficiency for resilience to deformation and for surfaces for attachment to faux floral artifacts.

Figure 15:
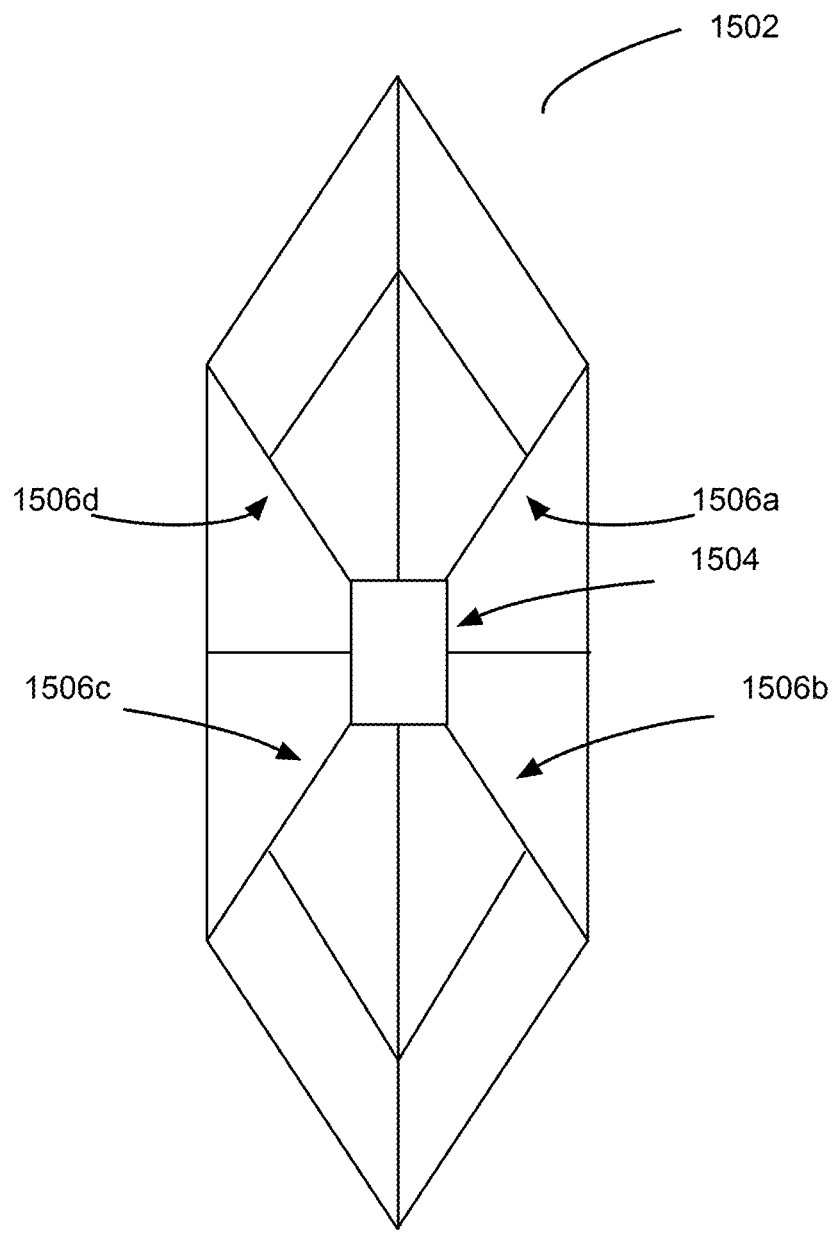
FIG. 15 illustrates a design that comprises another design, with an additional part at or in the center of a support, in accordance with an embodiment of the present invention.

FIG. 15 illustrates a design 1502 that comprises the design 1402, with an additional part 1504 at or in the center of the support. This center part 1504 as shown is rectangular in shape, and may be hollow inside. In one embodiment, such a center part may be solid with one or more holes inside. In another embodiment, such a center part may resemble in shape of, or otherwise comprise an outline of, a circle, oval, or polygon. In one embodiment, the center part 1504 provides the points or location of attachment or connection to a centerpiece per some faux floral arrangement, where the centerpiece may comprise one or more faux floral artifacts. Where there are eight spaces in a shape of triangle each with a vertex touching the center of the support in the design 1402, each of the eight spaces with a vertex touching the center resembles a shape of polygon having four sides, and some of these polygons are in the shape of a trapezoid or right-angled trapezoid. As such, the otherwise triangular shape of the spaces that surround the center of the support may be modified by the shape of a center part, as in the case with the center part 1504. For instance, if a center part has a shape of an oval or circle, then these eight spaces would each comprise a non-linear "side" or "edge," the side being carved out or otherwise modified due to the center part. In one embodiment, the spaces that surround a center part may resemble a polygon of more than four sides, when the shape of the center part resembles a polygon. In another embodiment, the spaces surrounding a center part may have different number of sides. For example, one end of the inner part 1506a or the inner part 1506d could have connect to otherwise touch the nearby length of the center part 1504, instead of the nearby corner or vertex. If the inner parts 1506a and 1506d had been so connected, while the inner parts 1506b and 1506c are connected to its nearby corner or vertex of the center part, then there would be two five-sided shapes and six four-sided shapes among these eight spaces each having at least one vertex or corner that anchors around, or at an edge of, the center part of the support.

Figure 16:
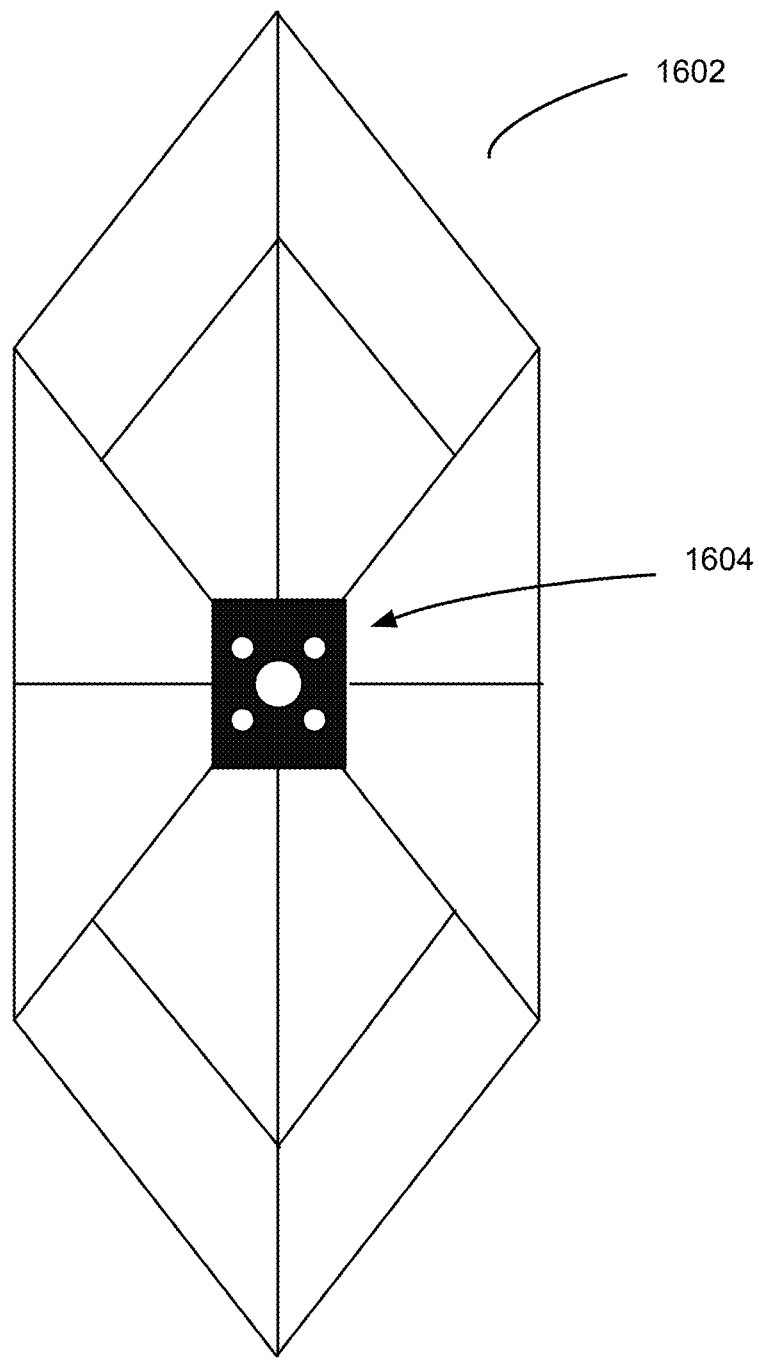
FIG. 16 illustrates a design that comprises one or more aspects or features found in another design.

FIG. 16 illustrates a design 1602 that comprises one or more aspects or features found in the design 1502. The center part 1604 comprises solid material, with five holes or hollow spaces on or within it. In one embodiment, the center part 1604 may serve as a platform for an elaborate arrangement of faux floral artifacts that may require more surface area for support in or at the middle of the arrangement. One or more of the five holes or hollow spaces may serve as female connectors for attachment of or to individual faux floral artifacts or a collection of faux floral artifacts, such as a centerpiece bouquet or posy. In another embodiment, one or more of these holes or hollow spaces are not used as female connectors. For example, the center hole of the center part 1604 may be an artifact from manufacturing (e.g., molding) or mass production of such a support.

Figure 17:
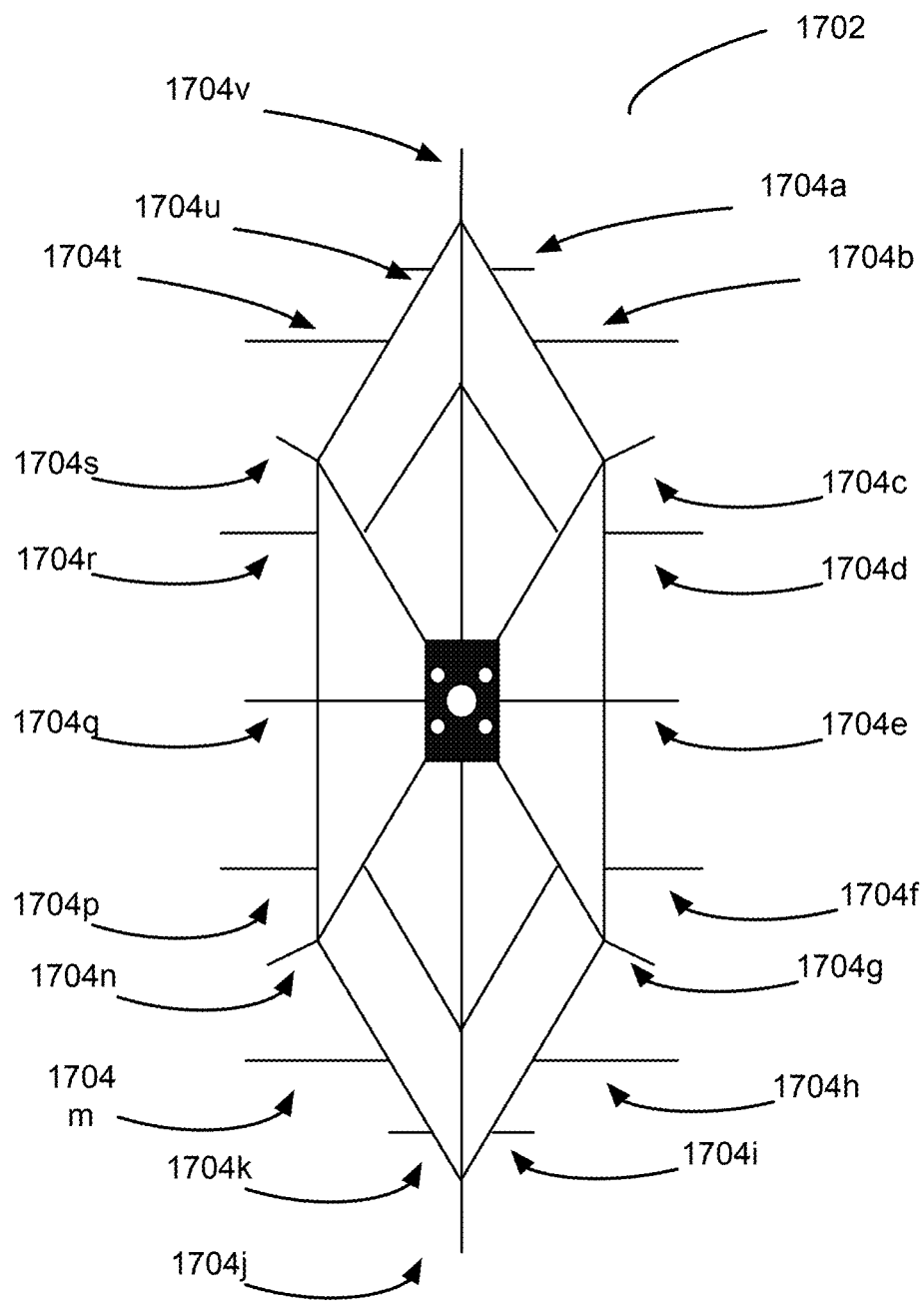
FIG. 17 illustrates a design that comprises another design, with additional parts that extend from the outer part of a support, in accordance with an embodiment of the present invention.

FIG. 17 illustrates a design 1702 that comprises the design 1602, with additional parts that extend from the outer part of the support. These extending parts, branches, or extensions 1704a to 1704k, 1704m to 1704n, and 1704p to 1704v, have at least one open end; that is, an end that does not connect or attach to any other part of the support. If the support is laid down on a rectangular surface lengthwise, then there are extensions (e.g., the extensions 1704a and 1704b) that run or otherwise start parallel, or approximately so, to the width of the surface, and extensions (e.g., the extensions 1704j and 1704v) that run or otherwise start parallel, or approximately so, to the length of the surface. There are also extensions (e.g., the extensions 1704c and 1704g) that run or otherwise start at an angle to either the width or length (sides) of the rectangular surface. Such various orientations among these extensions allow for better placement, connection or attachment of faux floral artifacts per some arrangement pattern. For instance, at least in one embodiment, a support embodying the design 1702 can underpin a faux floral arrangement in an oval shape, with connectors comprising one or more (male and/or female) connectors (e.g., a post connector and/or a hole) for attaching or connecting faux floral artifacts. In one embodiment, these extensions are linear in shape. In another embodiment, some or all of these extensions have a portion that is not linear.

Figure 18:
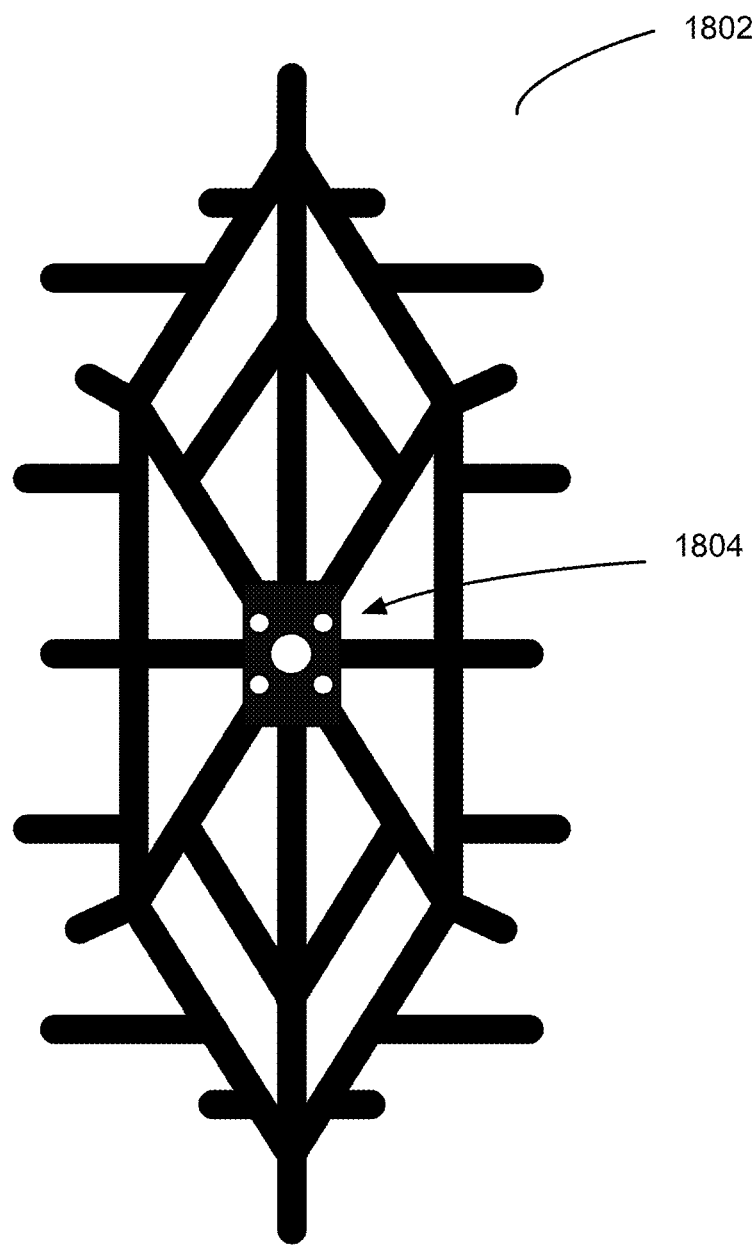
FIG. 18 illustrates a design that comprises another design, in accordance with an embodiment of the present invention.

FIG. 18 illustrates a design 1802 that comprises the design 1702. In one embodiment, all or some of the parts, including the center part 1804, comprise solid material, and have a cross section that resembles the shape of a rectangle. In one embodiment, such rectangle may have rough corners. In another embodiment, all or some of the parts have a cross section that resembles the shape of an eclipse or circle. In one embodiment, such eclipse or circle may have a portion of its edge or side being linear. In yet another embodiment, all or some of the parts have a cross section that has a shape with at least one curvature and at least one linear edge. In one embodiment, all or some of the parts have a cross section that comprises a shape of polygon. In another embodiment, all or some of the parts have a cross section that comprises an irregular shape. An asymmetrical shape with no linear side, edge or line is an example of such an irregular shape.

Figure 19:
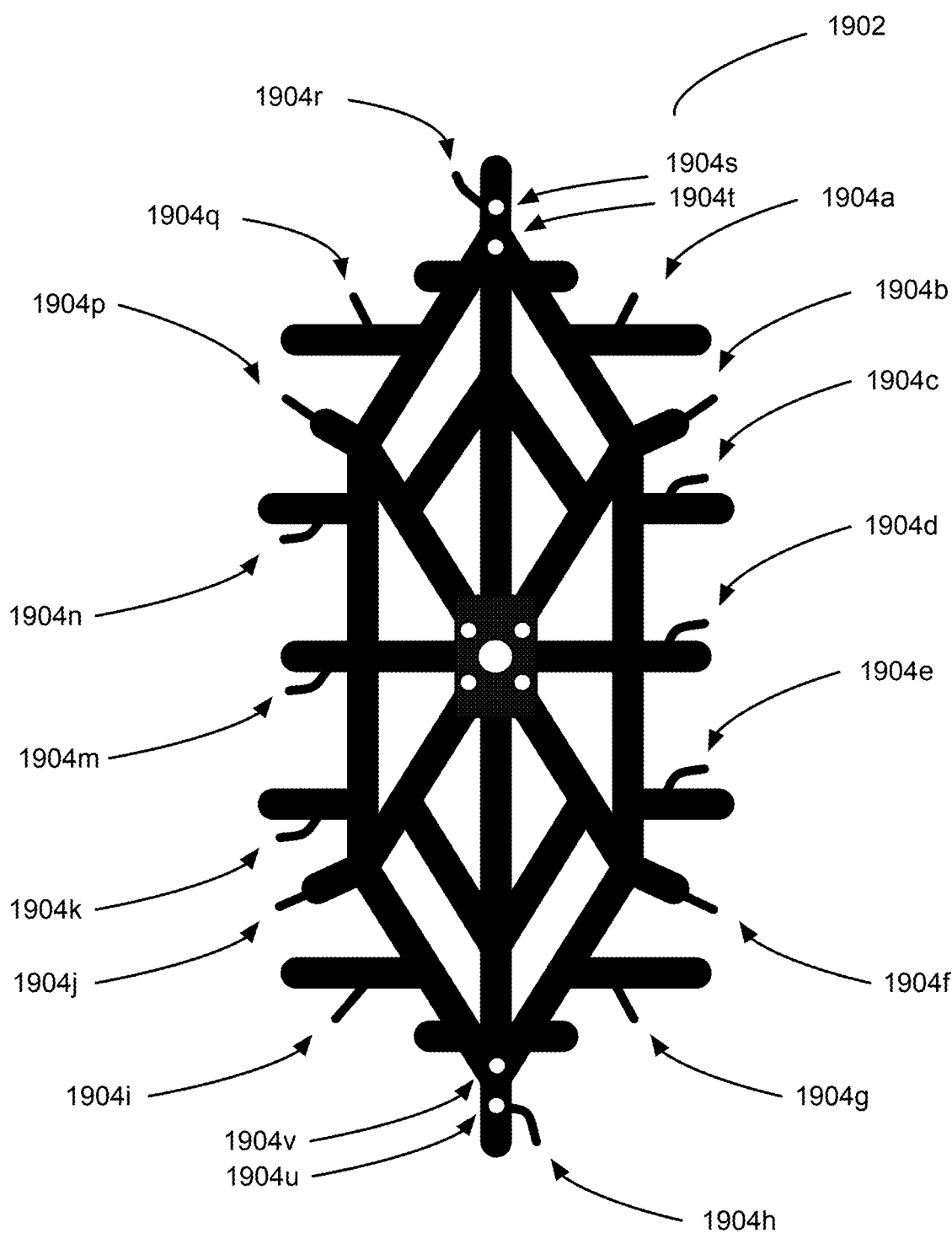
FIG. 19 illustrates a design that comprises another design, with male connectors as well as female connectors stemming or originating from one or more extensions, in accordance with an embodiment of the present invention.

FIG. 19 illustrates a design 1902 that comprises the design 1802, with male connectors (e.g., post or male connectors 1904a to 1904k, 1904m to 1904n, and 1904p to 1904r) as well as female connectors (e.g., holes or female connectors 1904s, 1904t, 1904u, 1904v) stemming or originating from the extensions. Some of these male connectors are linear in shape (e.g., the male connectors 1904a and 1904b), while there are others that have a curvature or curved portion (e.g., the male connectors 1904c and 1904d). The design 1902 comprises a plurality of female connectors (e.g., the female connectors 1904s to 1904v) that are oriented for connection or attachment to faux floral artifacts (or their connectors, such as their post connectors) in a vertical manner with respect to a geometric plane or planar surface of the support. The design 1902 also comprises a plurality of male connectors (e.g., the male connectors 1904a and 1904b) that are oriented for connection or attachment to faux floral artifacts (or their connectors, such as their female connectors) in a horizontal manner with respect to a geometric plane or planar surface of the support. Some of the connectors featured in the design 1902 (e.g., the connectors 1904b and 1904f) originate from the end or tip of an extension, while some other (e.g., the connectors 1904a and 1904c) originate from a lengthwise side of an extension. Some of the male connectors (e.g. the connectors 1904b and 1904f) in the design 1902 may be oriented for connection or attachment along the length of the extension from which they originate, while some other (e.g., the connectors 1904q and 1904r) may be oriented for connection or attachment at an angle from the length of the extension from which they originate. Such various shapes and orientations among these male connectors allow for better placement, connection or attachment of faux floral artifacts per some arrangement pattern. For instance, at least in one embodiment, a support embodying the design 1902 can provide a foundation for a faux floral arrangement in an oval shape, with faux floral artifacts being attached to the male connectors 1904a to 1904k, 1904m to 1904n, and 1904p to 1904r around the support, or the overall structure of the support. In one embodiment, a post or male connector may comprise solid material, and have a cross section that resembles the shape of a rectangle. In one embodiment, such rectangle may have rough corners. In another embodiment, a post or male connector may have a cross section that resembles the shape of an eclipse or circle. In one embodiment, such eclipse or circle may have a portion of its edge or side being linear. In yet another embodiment, a post or male connector may have a cross section that has a shape with at least one curvature and at least one linear edge. In one embodiment, a female connector may have a hallow space that resembles the shape of a rectangle. In one embodiment, such rectangle may have rough corners. In another embodiment, a female connector may have a hollow space that resembles the shape of an eclipse or circle. In one embodiment, such eclipse or circle may have a portion of its edge or side being linear. In yet another embodiment, a female connector may have a hollow space that has a shape with at least one curvature and at least one linear edge. In one embodiment, a female connector may comprise a hollow space that is not seen through. In another embodiment, a female connector may comprise a hole that can be seen through.

Figure 20:
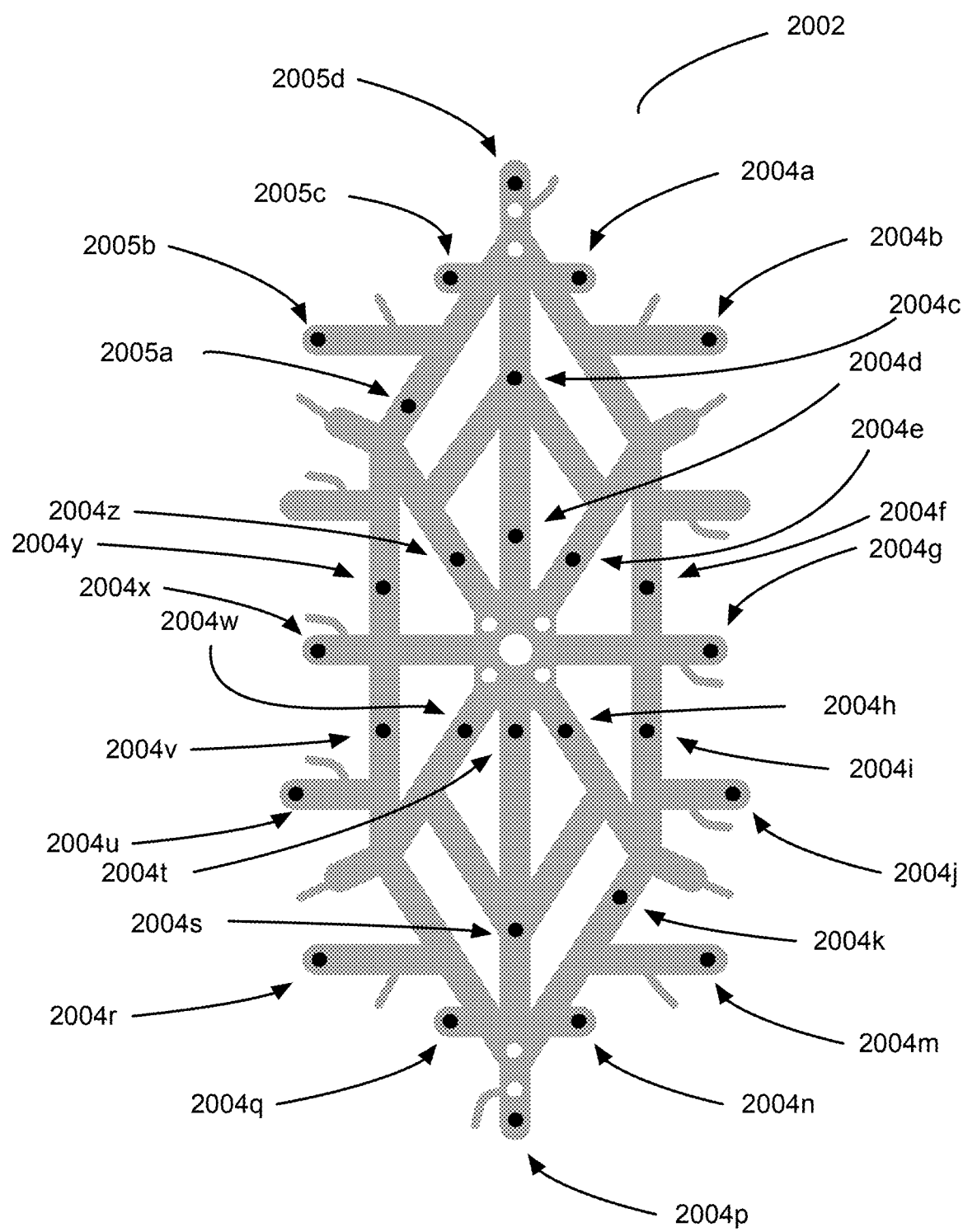
FIG. 20 illustrates a design that comprises another design, with male connectors oriented in the same or a similar way as female connectors, in accordance with an embodiment of the present invention.

FIG. 20 illustrates a design 2002 that comprises the design 1902, with male connectors (e.g., male connectors 2004a to 2004k, 2004m to 2004n, 2004p to 2004z, and 2005a to 2005d) oriented in the same or a similar way as the female connectors 1904s to 1904v. These connectors enable connection or attachment of or to faux floral artifacts (or their connectors, such as their female connectors) in a vertical manner with respect to a geometric plane or planar surface of the support.

Figure 21A:
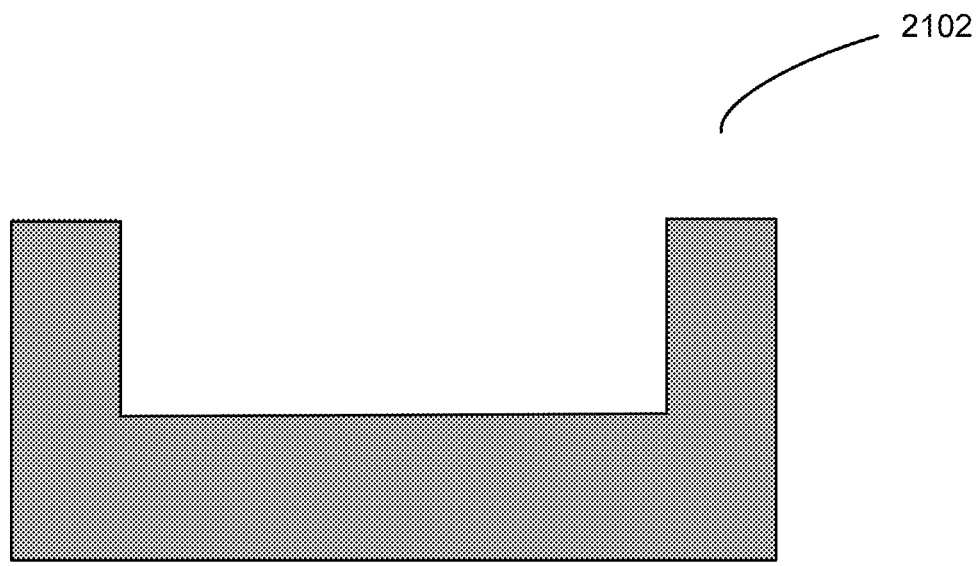
FIG. 21A illustrate a cross section that a part in a design may comprise, in accordance with an embodiment of the present invention.

FIG. 21A illustrate a cross section 2102 that a part in the design 1802 (or other designs in accordance with the present invention) may comprise. For instance, a linear part comprising the cross section 2102 may have two raised bands on one of its lengthwise sides, with each band located near the either edge on the lengthwise side. In one embodiment, the side of the part on which the raised bands are found is on the same side of the support where a connector is located. In another embodiment, the side of the part on which the raised bands are located is on the side of the support that has the most expansive surface and underpins one or more floral artifacts above it. In one embodiment, the indentation or recess formed by this pair of raised bands is rectangular in shape insofar as the cross section of the indentation or recess is concerned, as shown in FIG. 21A. In another embodiment, the cross section of the raised bands may comprise a curved portion or edge, such that the cross section of such an indentation or recess comprises a shape that is semi-elliptical or circular, or approximately so. In one embodiment, the grove formed by such a pair of raised bands on the lengthwise surface is semi-cylindrical, or approximately so. In one embodiment, the cross section of such a raised band does not have any linear side, edge or line.

Figure 21B:
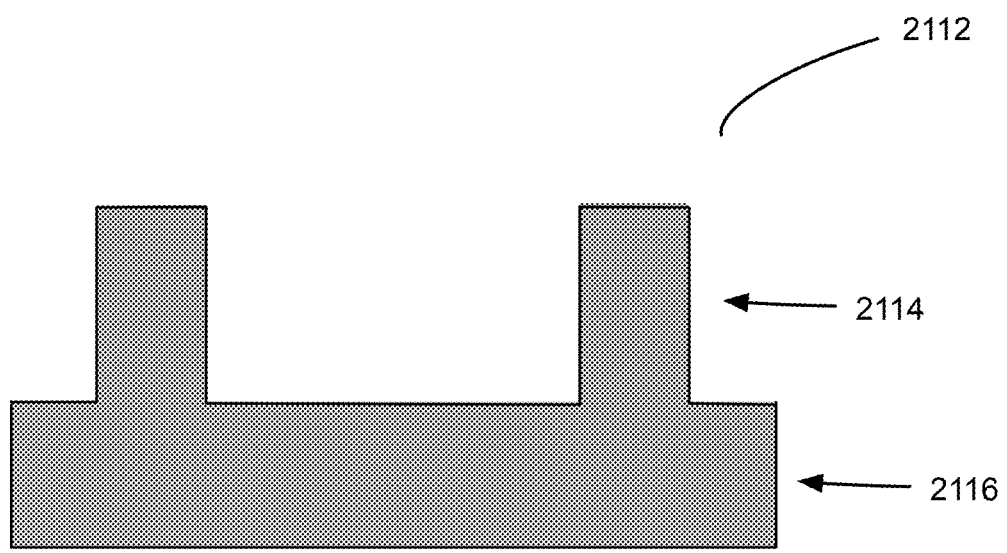
FIG. 21B illustrate another cross section that a part in a design may comprise, in accordance with an embodiment of the present invention.

FIG. 21B illustrates a cross section 2104 that a part in the design 1802 (or other designs in accordance with the present invention) may comprise. Similar to the cross section 2102, the cross section 2112 comprises two subsections associated with a pair of raised bands. However, each of the subsections associated with the raised bands in the cross section 2112 is situated away from the respective edge or corner, whereas the sub-section associated with each of the raised bands in the cross section 2102 is situated at the respective edge or corner, and has an exterior side flush or even, or approximately so, with an adjacent side that belongs to the rest of the cross section 2102. In contrast, the exterior side 2114 is not flush or even with the side 2116 that belongs to the rest of the cross section 2112.

Figure 22:
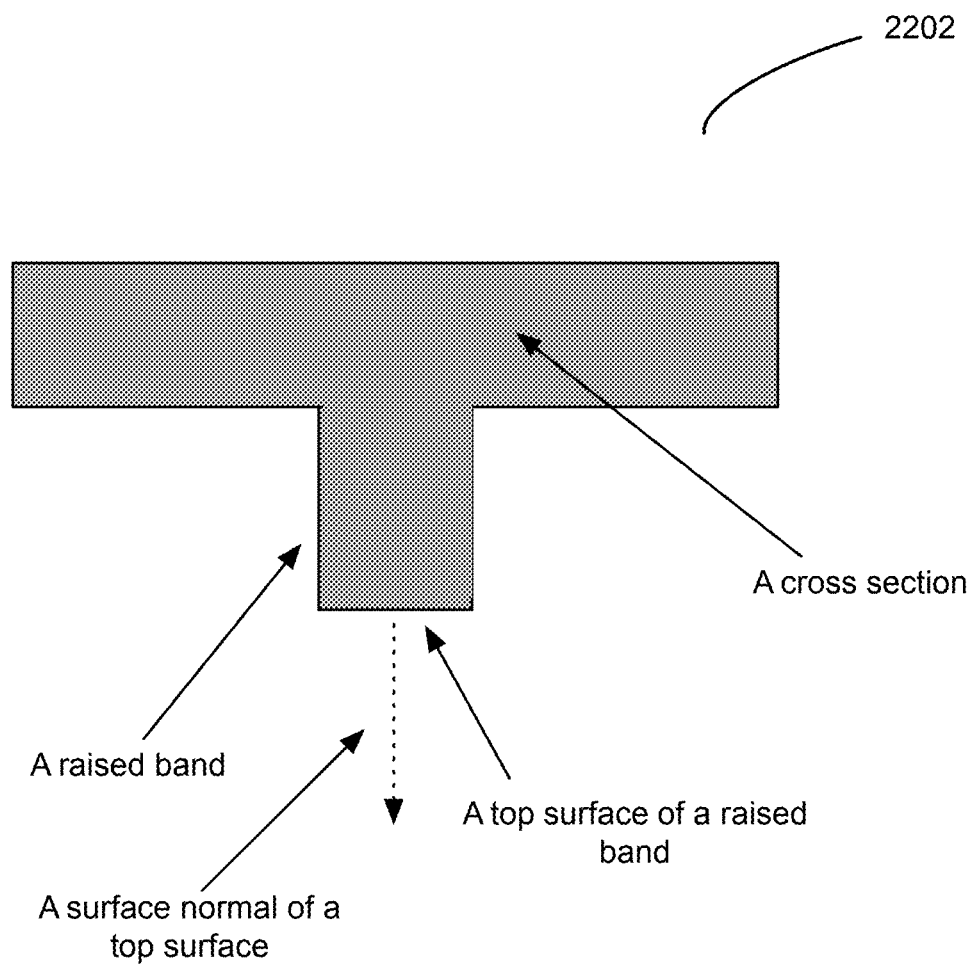
FIG. 22 illustrate yet another cross section that a part in a design may comprise, in accordance with an embodiment of the present invention.

FIG. 22 illustrates a cross section 2202 that a part in the design 1802 (or other designs in accordance with the present invention) may comprise. For instance, a linear part comprising the cross section 2202 may have one raised band along the middle on one of its lengthwise sides. This single raised-band approach helps reinforce the rigidity, or otherwise the resilience to deformation of the support that comprises the part embodying this approach. While the pair of raised bands in the cross section 2102 as well as 2112 may serve the same purpose or otherwise aim to provide a similar advantage, the single raised brand approach as shown in FIG. 22 requires less material than those shown in FIG. 21. In one embodiment, the side of the part on which the raised band is found is on the opposite side of the support where a connector is located. In another embodiment, the side of the part on which the raised band is located is on the side of the support that has the most expansive surface and is on the opposite of the side from which one or more floral artifacts are attached to for presentation.

Figure 23:
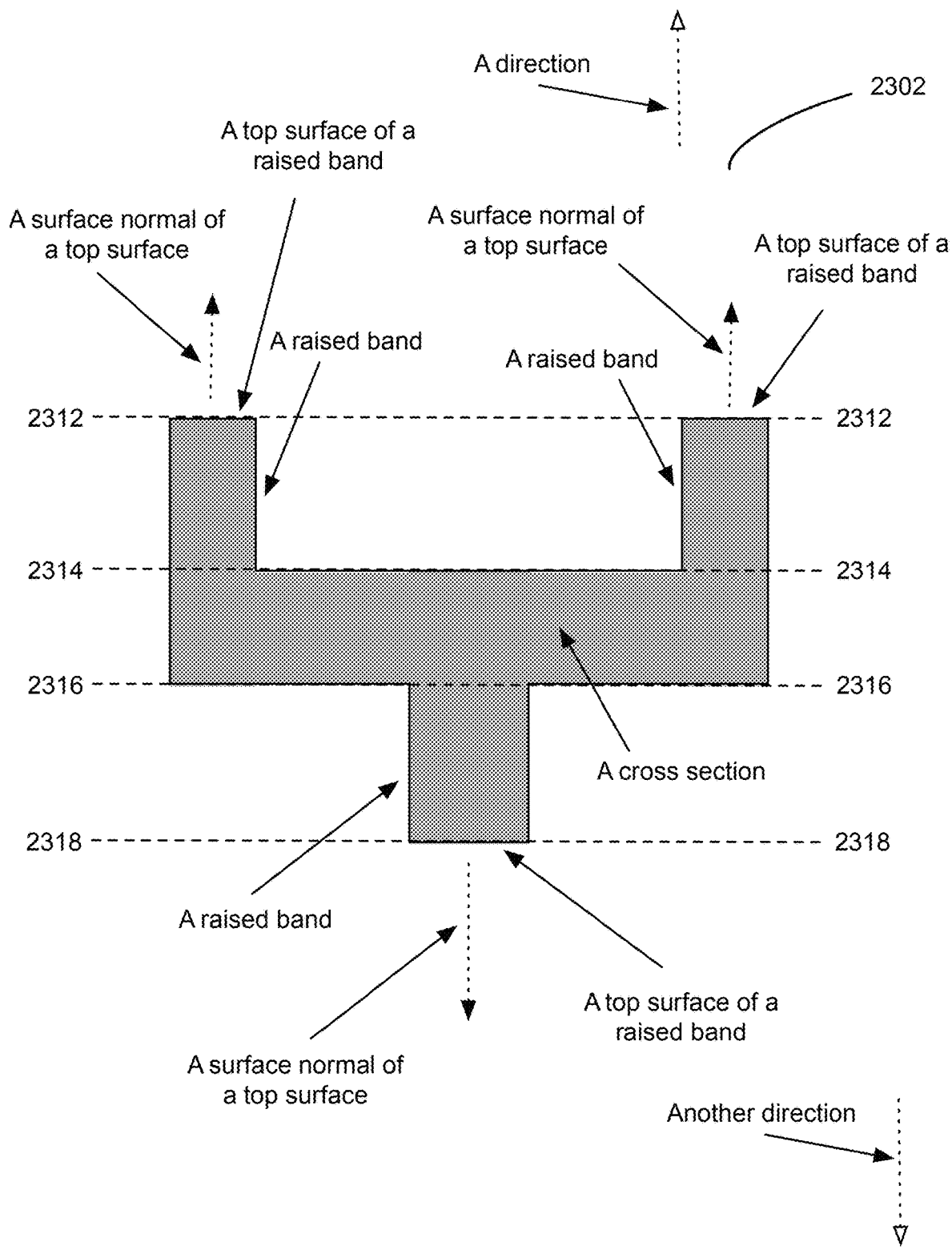
FIG. 23 illustrate some more cross section that a part in a design may comprise, in accordance with an embodiment of the present invention.

FIG. 23 illustrates a cross section 2302 that a part in the design 1802 (or other designs in accordance with the present invention) may comprise. For instance, a linear part comprising the cross section 2302 may have two raised bands (e.g., the two sub-sections delimited by lines 2312 and 2314 in FIG. 23) at the either edge on one side lengthwise of the linear part, while one raised band (e.g., the sub-section delimited by lines 2316 and 2318) at the middle on the opposite side. A part that comprises such an arrangement of raised bands, runs along or parallel to the most expansive geometric plane or planar surface of a support, and constitutes a portion of the support, may then provide enhanced rigidity or resilience to deformation, including but not limited to deviation of shape or form of the support with respect to this geometric plane or planar surface of the support. In one embodiment, a part may comprise one middle-running, single raised band on one of its lengthwise side, and another middle-running, single raised band on the opposite side, thereby comprising a cross section with a shape resembling a cross. In at least one embodiments, this approach could reduce the space or surface available for placement of connectors on the side that have a raised band running along the middle of the side, or restrict the size or diameter of a connector that can be placed there.

Figure 24A:
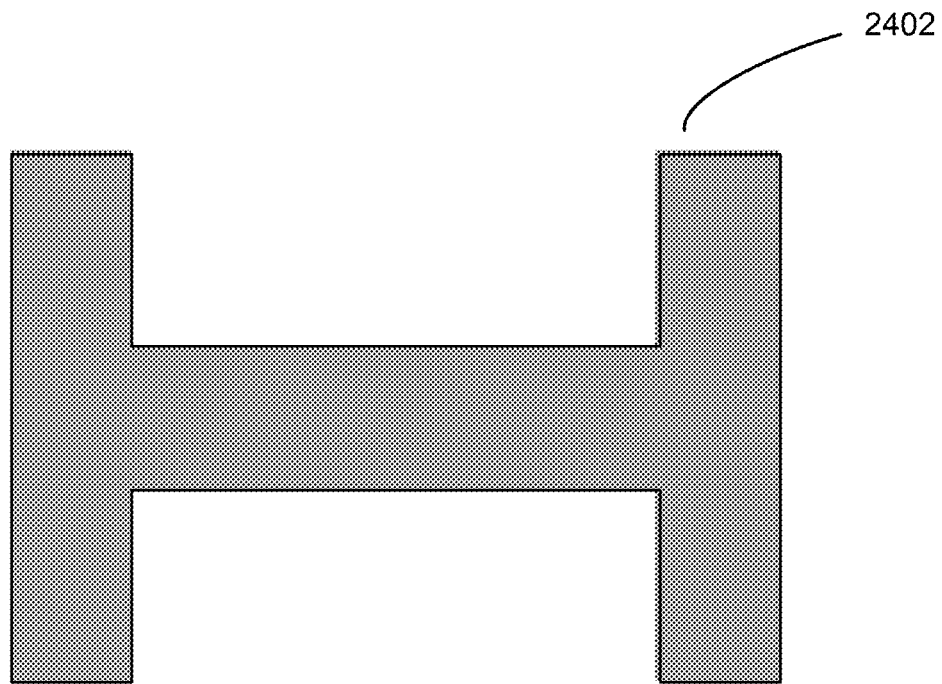
FIG. 24A illustrates a cross section that a part comprising four raised bands may have, in accordance with an embodiment of the present invention.

FIG. 24A illustrates a cross section 2402 that a part comprising four raised bands may have. For instance, a linear part may comprise a pair of raised bands, with each band being located at the either edge of one side, and another pair of raised bands similarly located on the opposite side. The side of the part on which a pair of raised bands are located may, for example, be on a side of the support that has the most expansive surface.

Figure 24B:
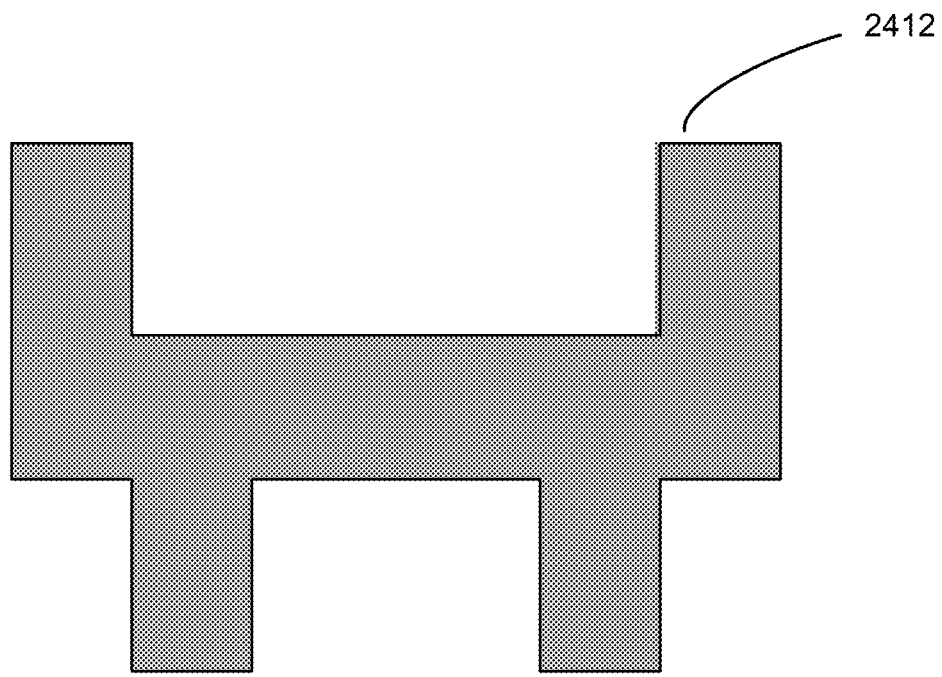
FIG. 24B illustrates another cross section that a part comprising four raised bands may have, in accordance with an embodiment of the present invention.

FIG. 24B illustrates a cross section 2412 that a part comprising four raised bands may have. For instance, a linear part may comprise a pair of raised bands (e.g., edge-bound raised bands), with each band being located at the either edge of one side, and another pair of raised bands located away from their respective edges on the opposite side. The side of the part on which the pair of edge-bound raised bands are located may, for example, be on a side of the support that has the most expansive surface, and where a connector for attachment or connection to a faux floral artifact may be located.

Figure 25A:
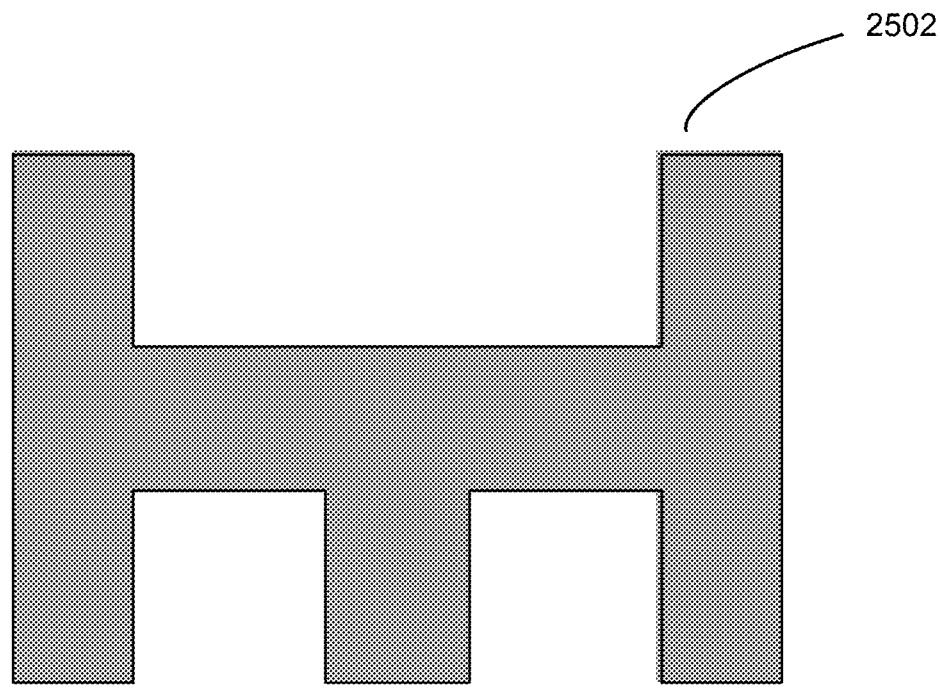
FIG. 25A illustrates a cross section that a part comprising five raised bands may have, in accordance with an embodiment of the present invention.

FIG. 25A illustrates a cross section 2502 that a part comprising five raised bands may have. For instance, a linear part may comprise a pair of raised bands (e.g., edge-bound raised bands), with each band being located at the either edge of one side, and three raised bands located on the opposite side, where two of the three raised bands are edge-bound raised bands, and one of the three is a center-bound raised band which runs along the middle of the surface on a lengthwise side of the part. The side of the part on which the pair of edge-bound raised bands are located may, for example, be on a side of the support that has the most expansive surface, and where a connector for attachment or connection to a faux floral artifact may be located.

Figure 25B:
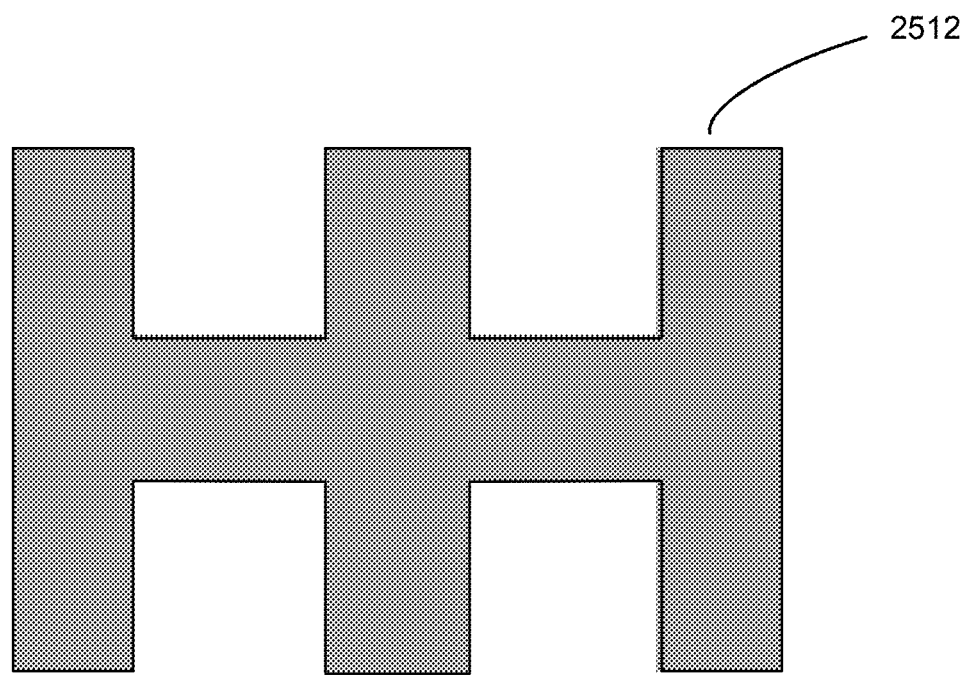
FIG. 25B illustrates a cross section that a part comprising six raised bands may have, in accordance with an embodiment of the present invention.

FIG. 25B illustrates a cross section 2502 that a part comprising six raised bands may have. For instance, a linear part may comprise three raised bands, where two of the three raised bands are edge-bound raised bands, and one of the three is a center-bound raised band which runs along the middle of the surface on a lengthwise side of the part. The linear part may comprise another collection of three raised bands, that are situated or placed likewise on the opposite side. A side of the part on which the three raised bands are located may, for example, be on a side of the support that has the most expansive surface.

Figure 26:
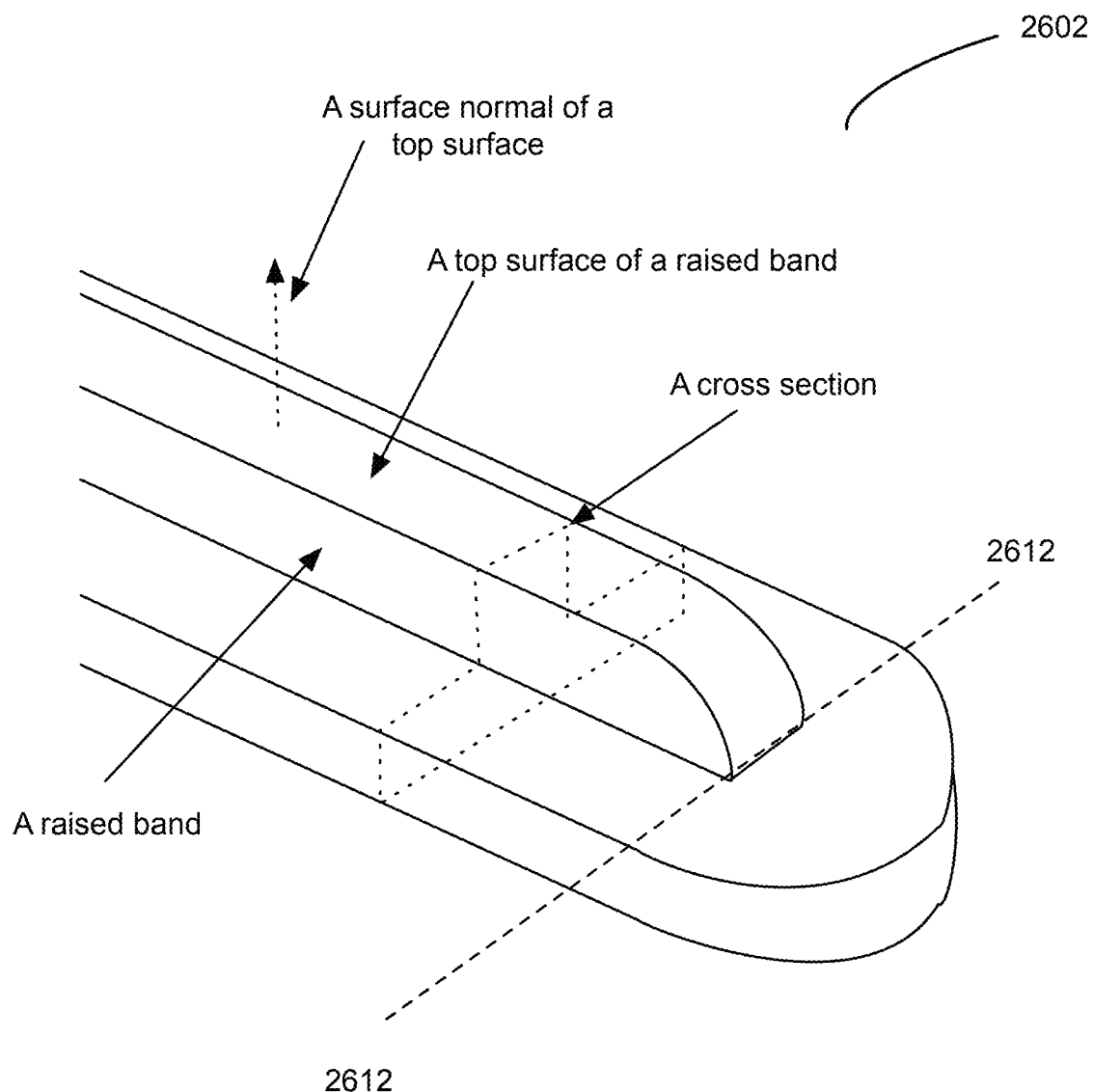
FIG. 26 is a perspective view of a portion of a part that a design may comprise, in accordance with an embodiment of the present invention.

FIG. 26 is a perspective view of a portion 2602 of a part that may comprise a cross section similar to the cross section 2202. Such a cross section does not necessarily persist or extend throughout the length of the part. For example, the center-bound or middle-running raised band tapers off, and the cross section of the portion 2602 at around the line 2612 becomes rectangular in shape. In one embodiment, the tapering may be curved, or exponential with respect to the length of the section of the raised band between the start and the end of the tapering. In other embodiments, the shape of speed of the tapering may be linear, abrupt, or irregular, among other possibilities.

Figure 27A:
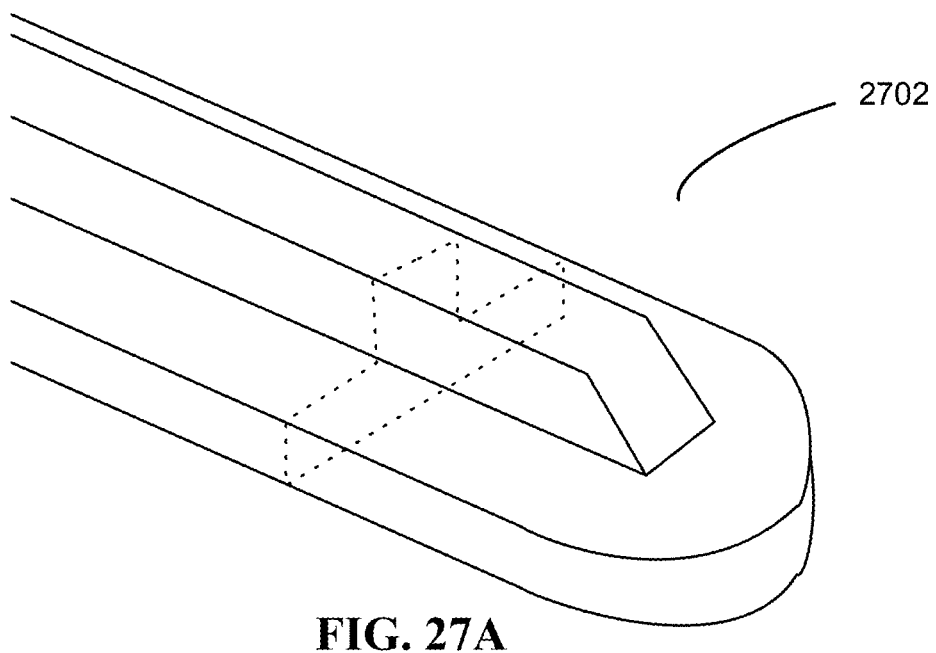
FIG. 27A is a perspective view of a portion of a part that another design may comprise, in accordance with an embodiment of the present invention.

For instance, FIG. 27A is a perspective view of a portion 2702 of a part that may comprise a cross section similar to the cross section 2202. The portion 2702 comprises a center-bound or middle-running raised band that tapers off linearly.

Figure 27B:
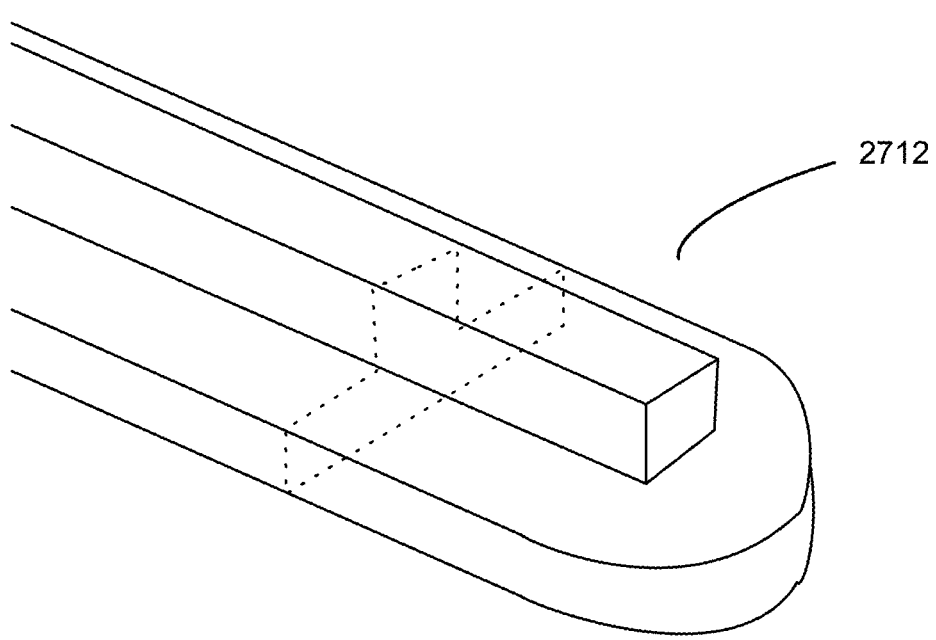
FIG. 27B is a perspective view of a portion of a part that yet another design may comprise, in accordance with an embodiment of the present invention.

FIG. 27B is a perspective view of a portion 2712 of a part that may comprise a cross section similar to the cross section 2202. The portion 2712 comprises a center-bound or middle-running raised band that tapers or cuts off abruptly.

Figure 28A:
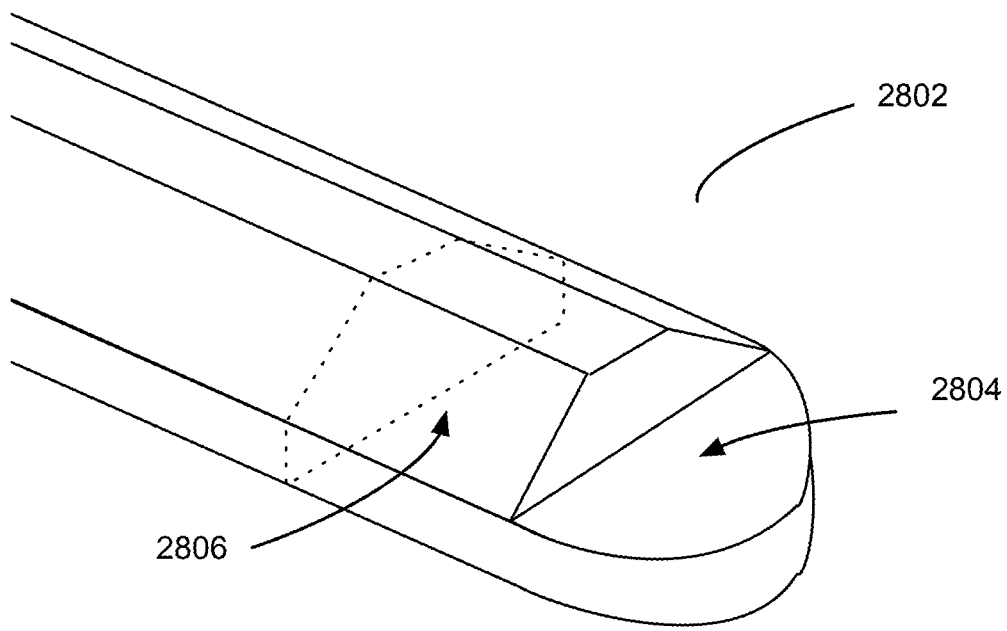
FIG. 28A is a perspective view of a portion of a part that another design may comprise, in accordance with an embodiment of the present invention.

FIG. 28A is a perspective view of a portion 2802 of a part that comprises a raised band that has a cross section whose shape resembles a trapezoid. The section of the portion 2802 that does not have the raised band has a cross section whose shape resembles a rectangle, and the width of this section reduces towards the end of the length, thereby forming a flat surface 2804 with a round or curved rim. A cross section of the portion 2802 of the part that comprises the raised band would have a shape 2806 that resembles a polygon of six sides, such as an amalgamation of a rectangle and a trapezoid along a former's length and the latter's base.

Figure 28B:
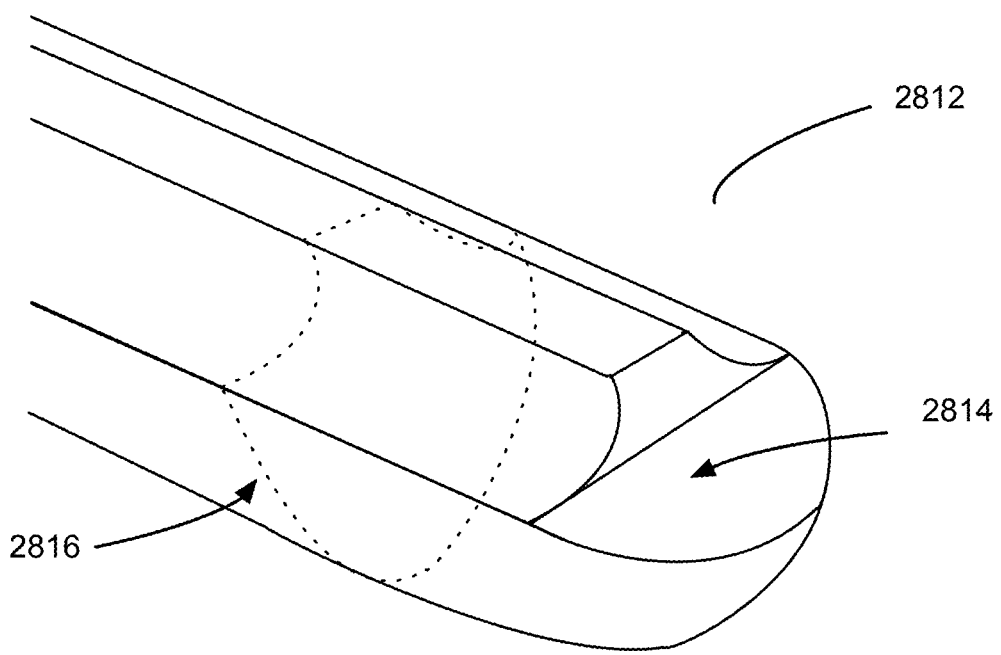
FIG. 28B is a perspective view of a portion of a part that yet another design may comprise, in accordance with an embodiment of the present invention.

FIG. 28B is a perspective view of a portion 2812 of a part that comprises a raised band that has a cross section whose shape comprises two linear sides (e.g., top and bottom) and two curved sides. The section of the portion 2812 that does not have the raised band has a cross section whose shape resembles a semi-eclipse, and the end of the section assumes the shape of a quarter of a sphere, while maintaining a flat surface 2814 with a round or curved rim. A cross section of the portion 2812 of the part that comprises the raised band would have a shape 2816.

Figure 29:
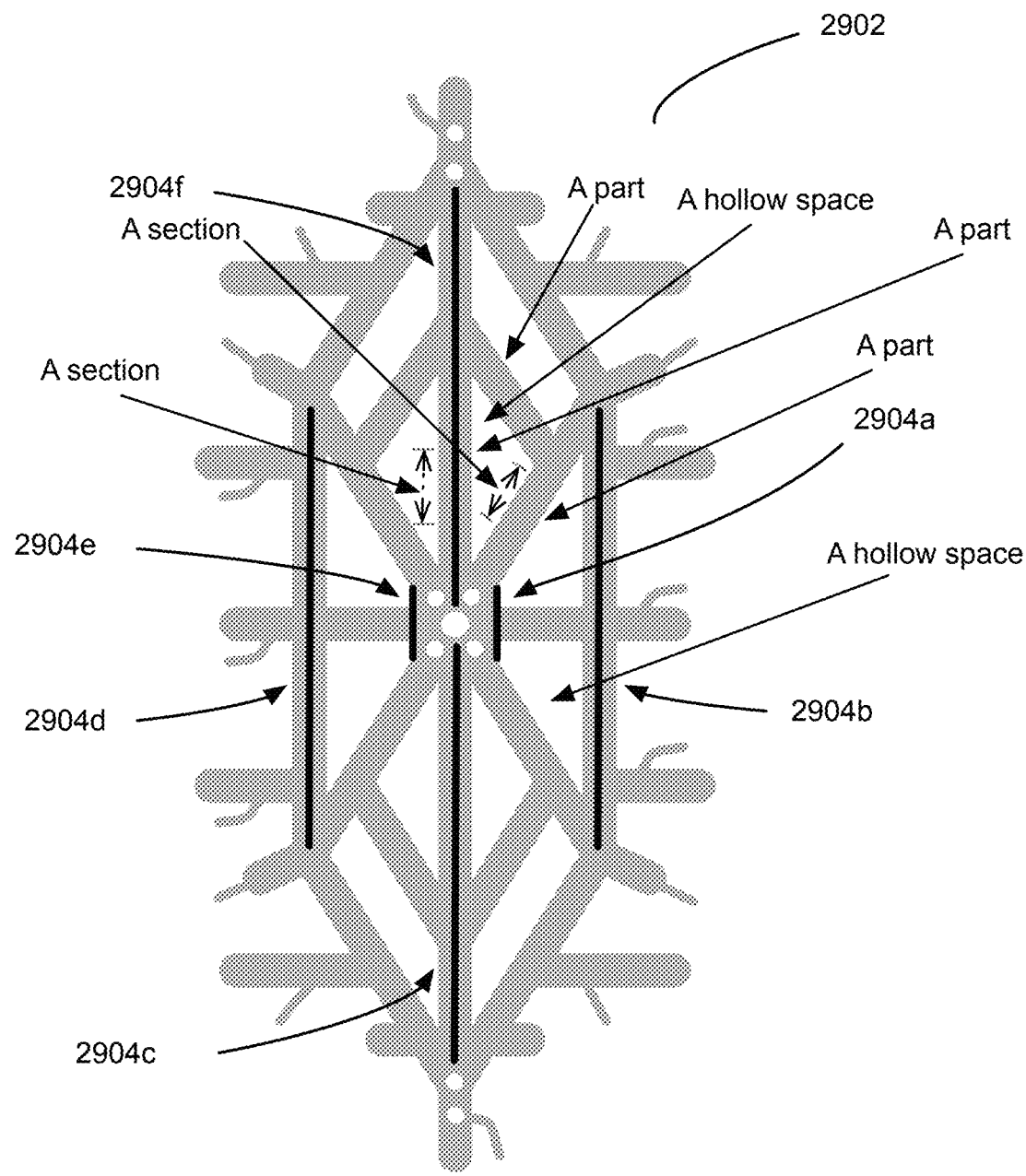
FIG. 29 illustrates a design with center-bound or middle-running raised bands on a side or surface of a support, in accordance with an embodiment of the present invention.

FIG. 29 illustrates a design 2902 that comprises the design 1902, with center-bound or middle-running raised bands on a side or surface of a support that, for example, has the most expansive surface. For instance, the support may comprise a raised band, such as one of those shown in FIG. 26, FIG. 27A, FIG. 27B, FIG. 28A, and FIG. 28B, on its side, such as at the locations 2904a to 2904f as shown in FIG. 29.

Figure 30:
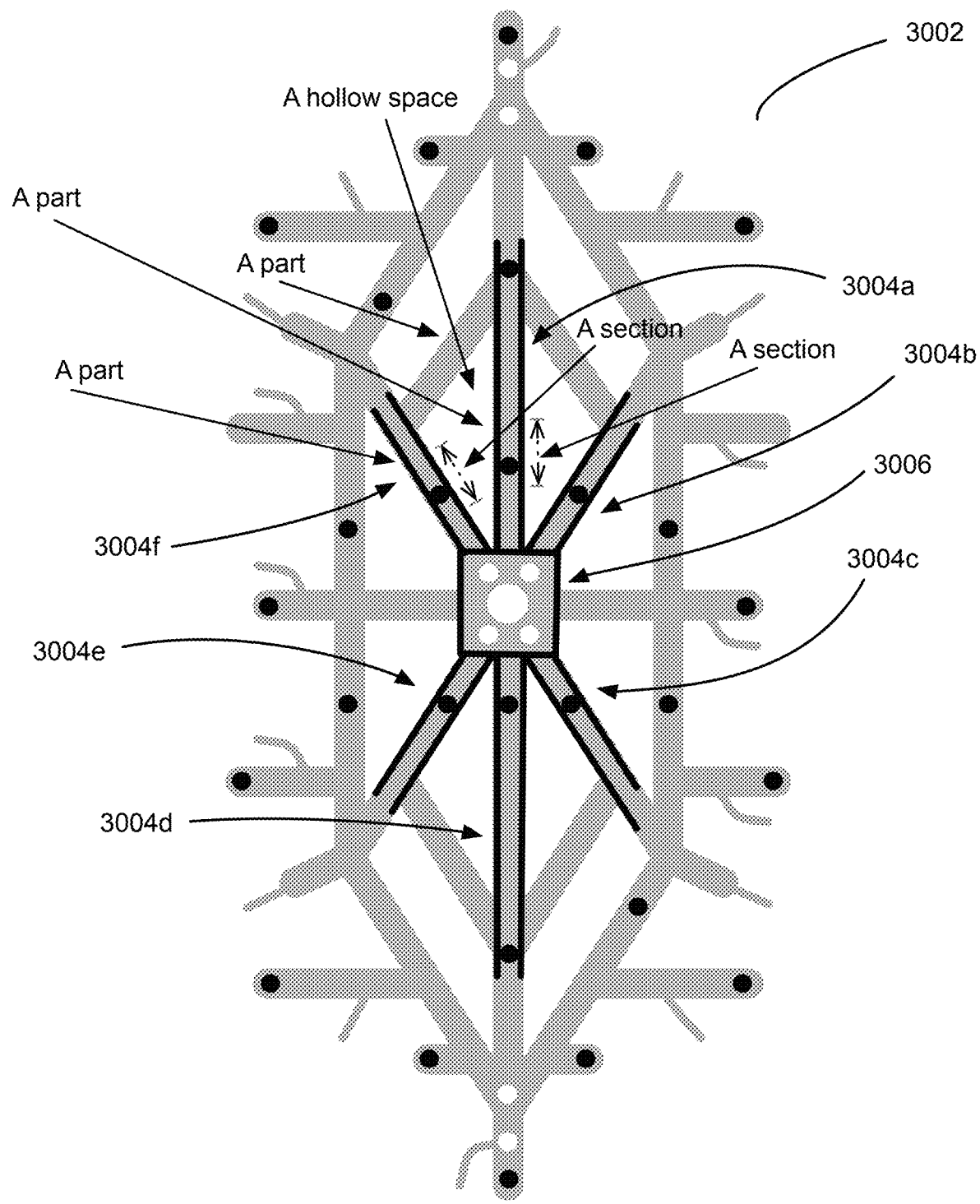
FIG. 30 illustrates a design with pairs of edge-bound raised bands on a side or surface of a support, in accordance with an embodiment of the present invention.

FIG. 30 illustrates a design 3002 that comprises the design 2002, with pairs of edge-bound raised bands on a side or surface of a support that, for example, has the most expansive surface and has a plurality of connectors located or placed thereon. For instance, the support may comprise a pair of edge-bound raised bands on one or more of its parts that have a cross section similar to one of the cross sections 2102 and 2112, and these bands are placed, for example, at the locations 3004a to 3004f as shown in FIG. 30. The location 3006 refers to a rectangular-shaped center part of the support, and the center part comprises five female connectors with a raised band or rim around the perimeter of its sides. In one embodiment, such a center part may comprise two pairs of edge-bound raised bands, with one pair being orthogonal or perpendicular to the other pair, thereby constituting the raised band or rim around the perimeter of the sides of the center part.

Figure 31:
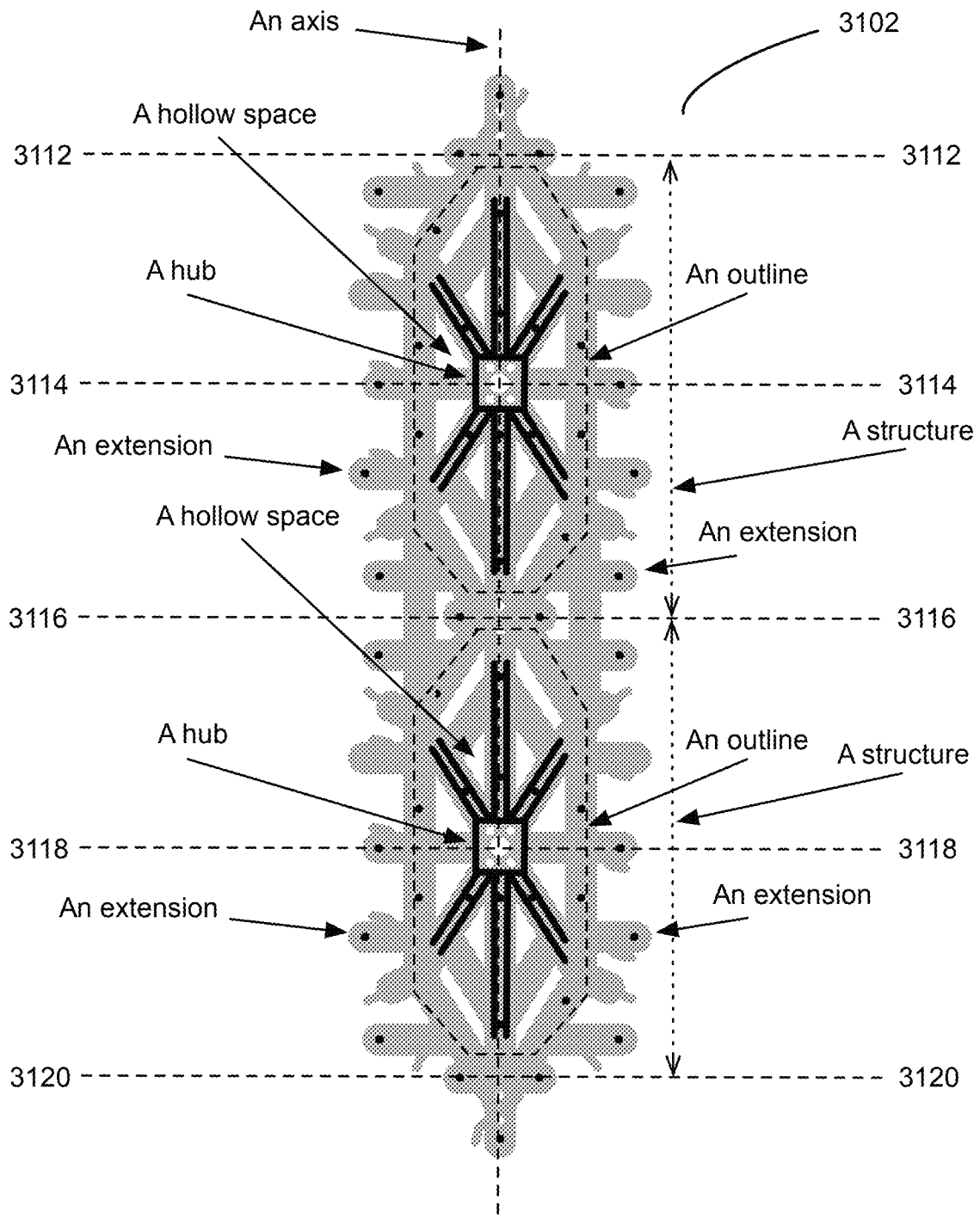
FIG. 31 illustrates a design that comprises another design, in accordance with an embodiment of the present invention.

FIG. 31 illustrates a design 3102 that comprises the design 812. Where there are three diamond-like shaped structures of approximately equal width in the design 812 that are arranged in series extending along the length of a support, there are four in the design 3102, as illustrated by delimitation through lines 3112, 3114, 3116, 3118, and 3120 in FIG. 31. This demonstrates the extensibility, adaptability, and incorporability of the design 812 and other designs disclosed herein, to result in various faux floral supports suitable for different requirements, such as the dimension requirement of a support. For instance, a single support may embody both the designs 2902 and 3002, or specific aspects or features in these designs, to underpin an elaborate arrangement of faux floral artifacts. Another support may incorporate all the features of this single support, and can be twice as long. For example, this other support may embody the design 3102, or a design of this other support may comprise the design 3102.

Figure 32:
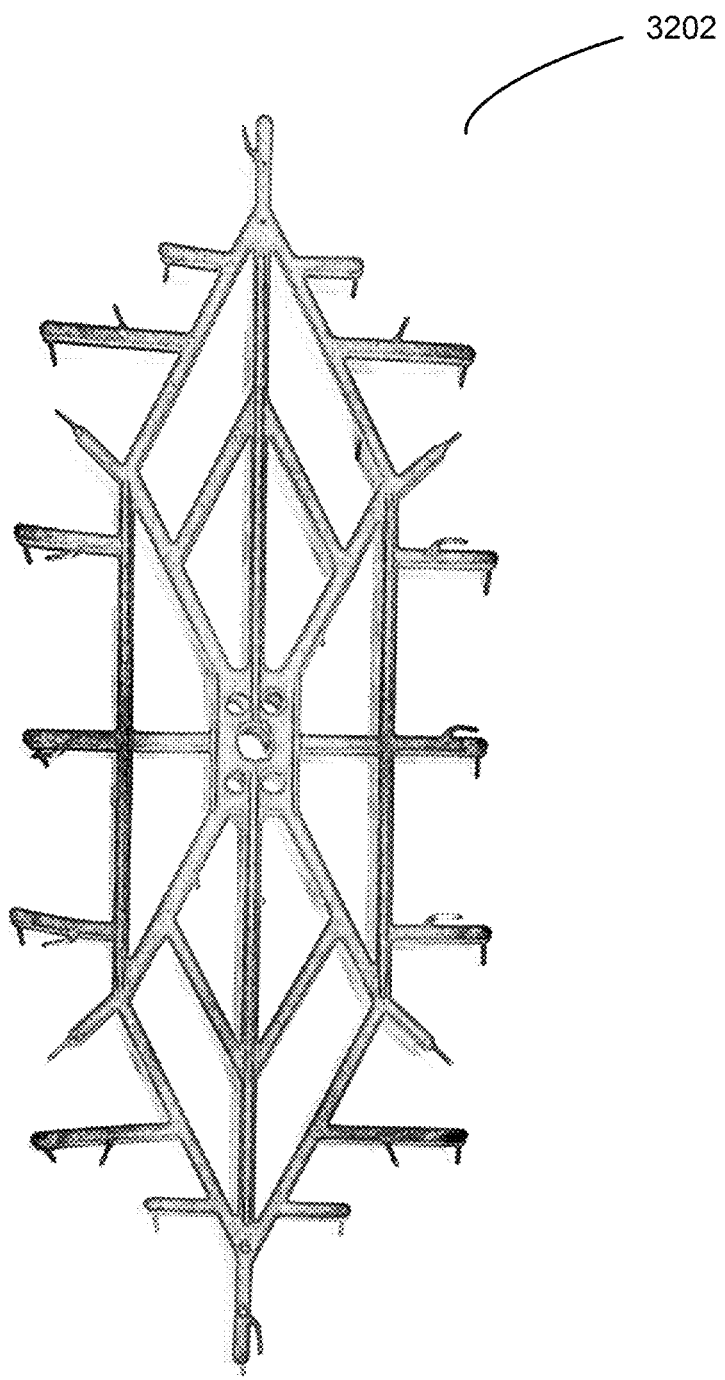
FIG. 32 shows a view of a support or an apparatus embodying multiple designs, in accordance with an embodiment of the present invention.

FIG. 32 shows a view of a support or an apparatus 3202 embodying the designs 2901 and 3002. It mainly shows the front view, if the side of the support with the most expansive surface or area where more connectors are placed (in contrast with the opposite side where fewer or no connector is located) is considered as the "front" of the support or apparatus 3202.

Figure 33:
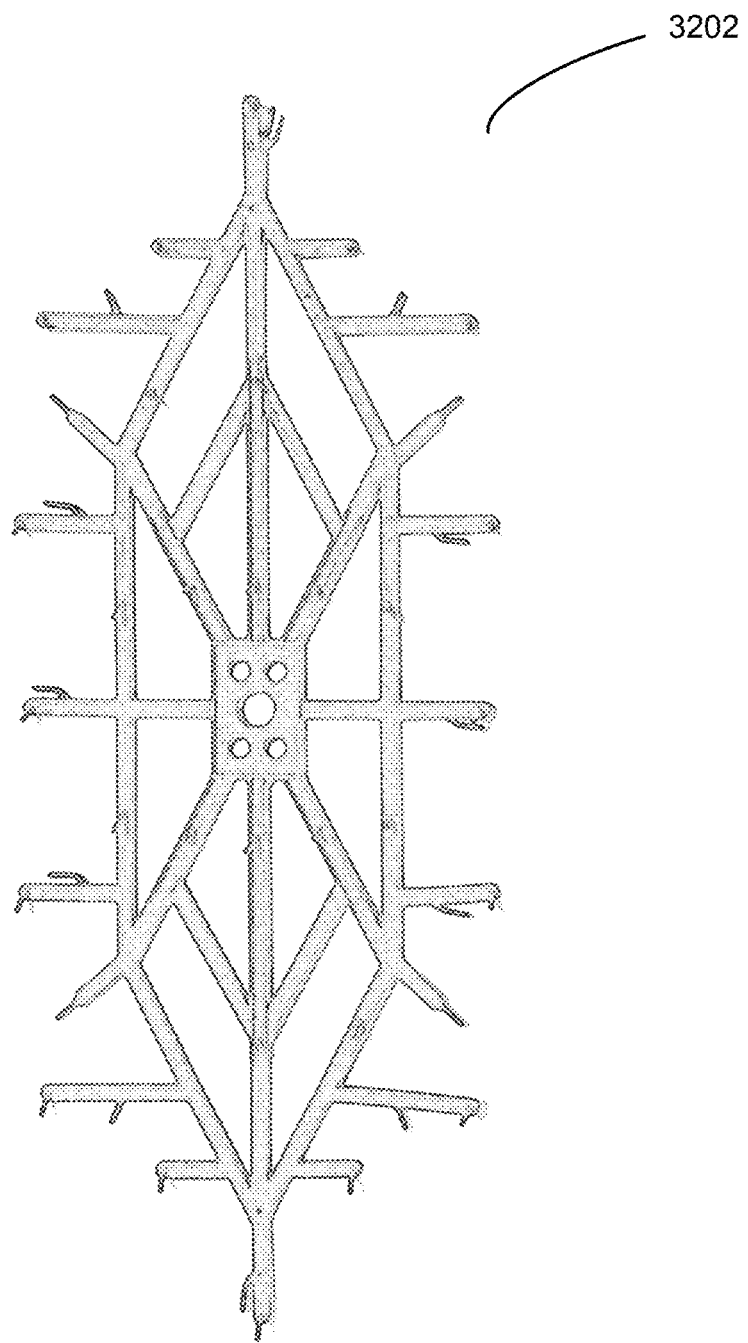
FIG. 33 shows another view of a support or apparatus that embody one or more aspects of the present invention.

FIG. 33 shows another view of the support or apparatus 3202. It mainly shows the back view, if the side of the support with the most expansive surface or area where fewer or no connector is placed (in contrast with the opposite side where more connectors are located) is considered as the "back" of the support or apparatus 3202.

Figure 34:
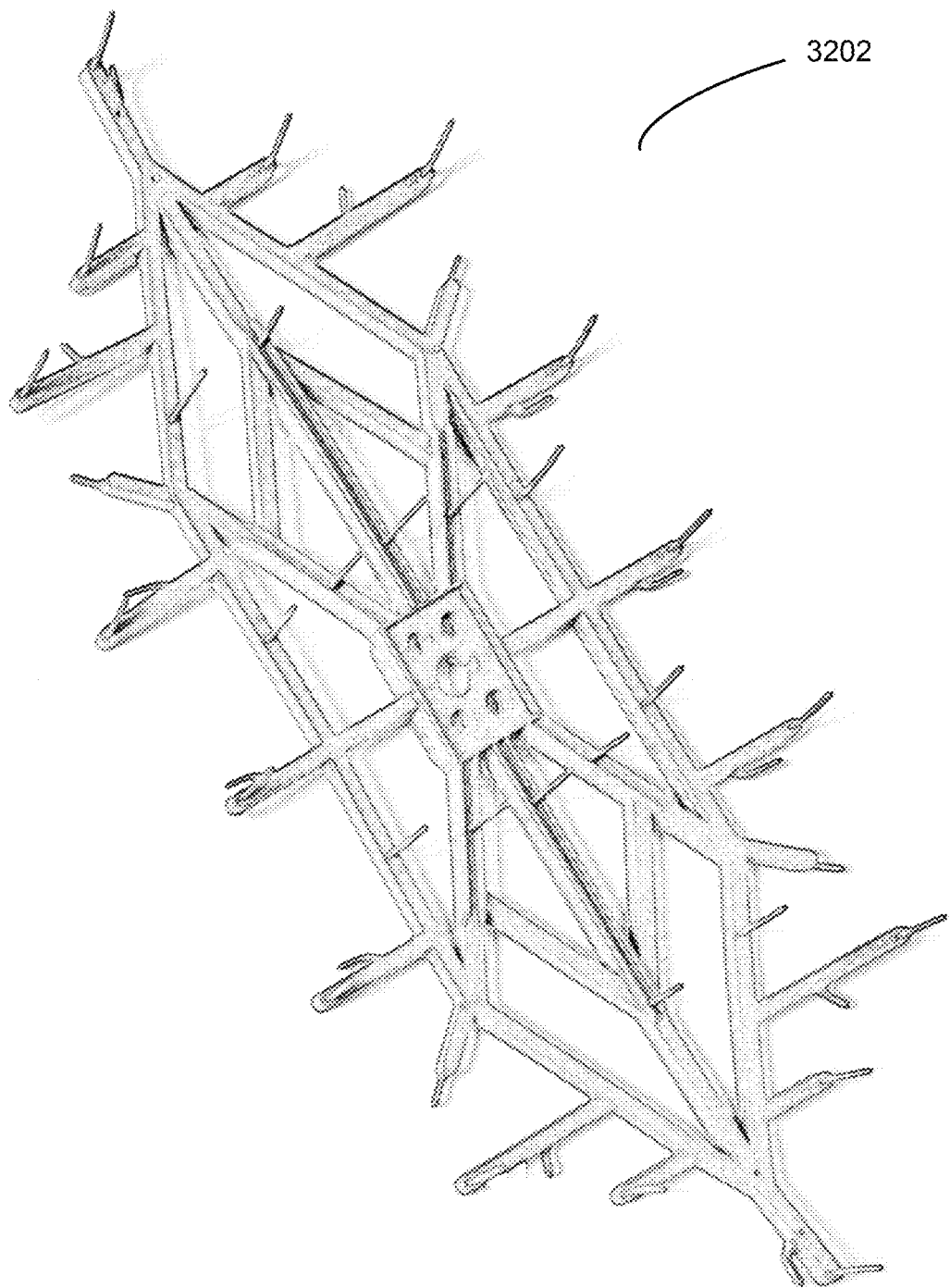
FIG. 34 shows a perspective view of the support or apparatus, in accordance with an embodiment of the present invention.

FIG. 34 shows a perspective view of the apparatus 3202 that exhibits predominantly the front of the apparatus 3202.

Figure 35:
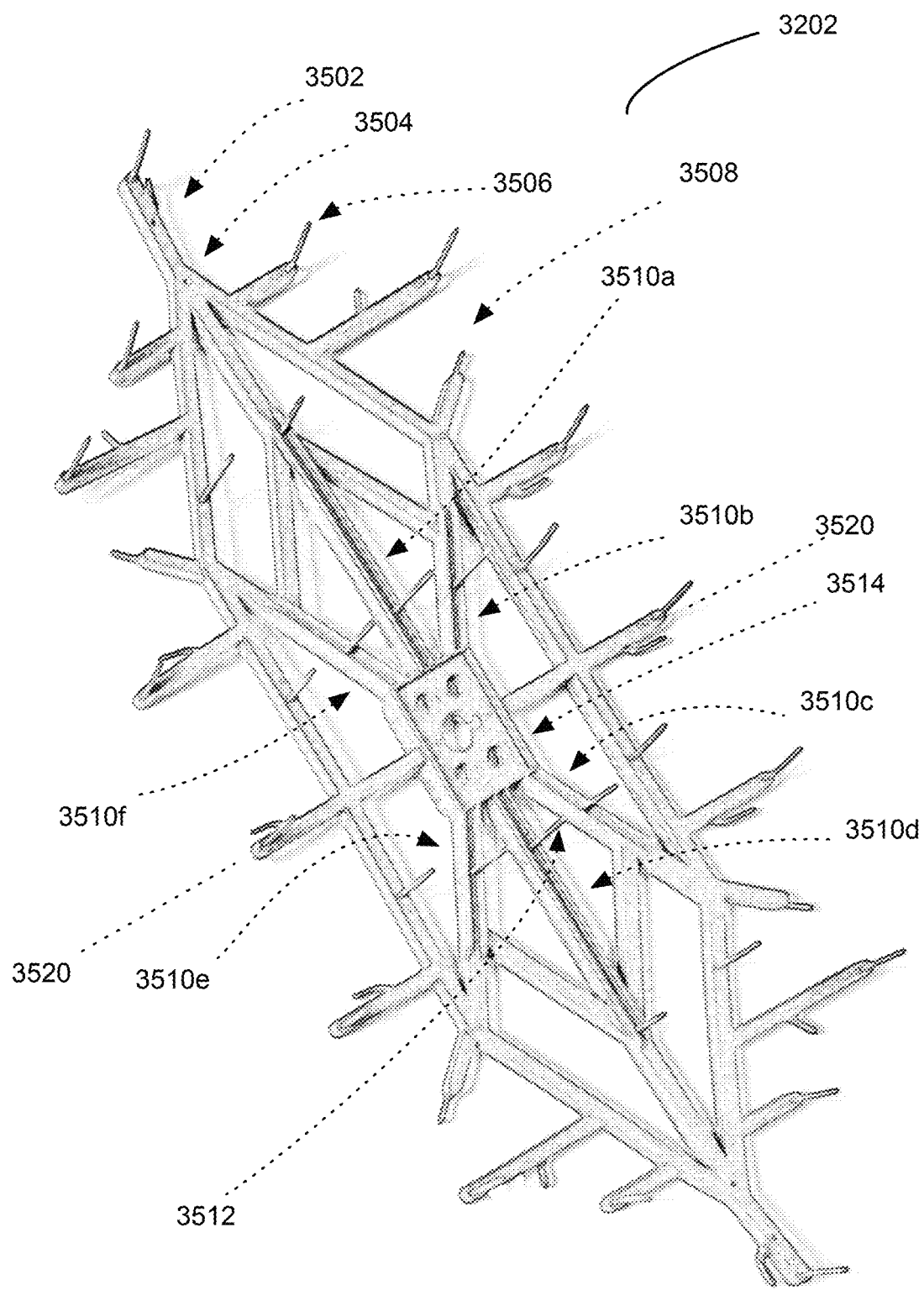
FIG. 35 shows the same or a similar perspective view of the apparatus as that in FIG. 34, with additional reference numerals.

FIG. 35 shows the same or a similar perspective view of the apparatus 3202 as that in FIG. 34, with additional reference numerals that are not part of the apparatus 3202. For illustrations of the apparatus 3202, the broken lines, arrows, and reference numerals shown in the drawings or figures form no part of the claimed design(s). All shadows shown in the drawings or figures form no part of the claimed design(s). The apparatus 3202 shown does not contain articulated parts. In one embodiment, a half of the apparatus 3202 would have matched the other half that is divided along a horizontal axis (e.g., an axis through the center along the width or the shorter dimension of the plane, e.g., line 3520-3520 in FIG. 35, or line 3710-3710 in FIG. 37), if such a half could rotate 180% at or around the center towards either side, either clockwise or counter-clockwise.

A side, e.g., the front side, of the apparatus shown in FIG. 34 comprises a plurality of (female and/or male) connectors for attaching or mating with faux or artificial floral artifacts, such as holes 3502 and 3504, and post connector 3506 in FIG. 35. The apparatus may comprise one or more connectors on a different surface, such as post connector 3508 in FIG. 35. Connectors located on the apparatus can be oriented orthogonally to one another, such as post connector (or simply post) 3506 being oriented orthogonally with respect to post 3508.

There are pairs of raised bands that are located on some of the linear portions or parts that extend from the center radially, such as portions or parts 3510a, 3510b, 3510c, 3510d, 3510e and 3510f in FIG. 35. In one embodiment, the cross section of such a portion or part would be rectangular if there is no raised band on the portion or part. One or more connectors may be placed in the gap between a pair of raised bands, such as post 3512 on part 3510d in FIG. 35. Each raised band in such a pair is placed at either end of the width of the part, and the exterior side or outward wall of each raised band is flush with the side of the part that faces the same direction as the exterior side or outward wall. There is also a part that comprises two pairs of raised bands on one side, with one pair being orthogonal to the other pair, such as part 3514 in FIG. 35, where the four raised bands form an outline of the part on that side. There is one hole in the center of Part 3514 in FIG. 35, which is surrounded by four smaller holes, each of which being at or near a corner of Part 3514. In one embodiment, the four smaller holes are female connectors for attaching or mating with one or more centerpieces of artifacts in a faux floral arrangement, while the bigger hole in the center can be a manufacturing artifact, or used as another female connector.

Figure 36:
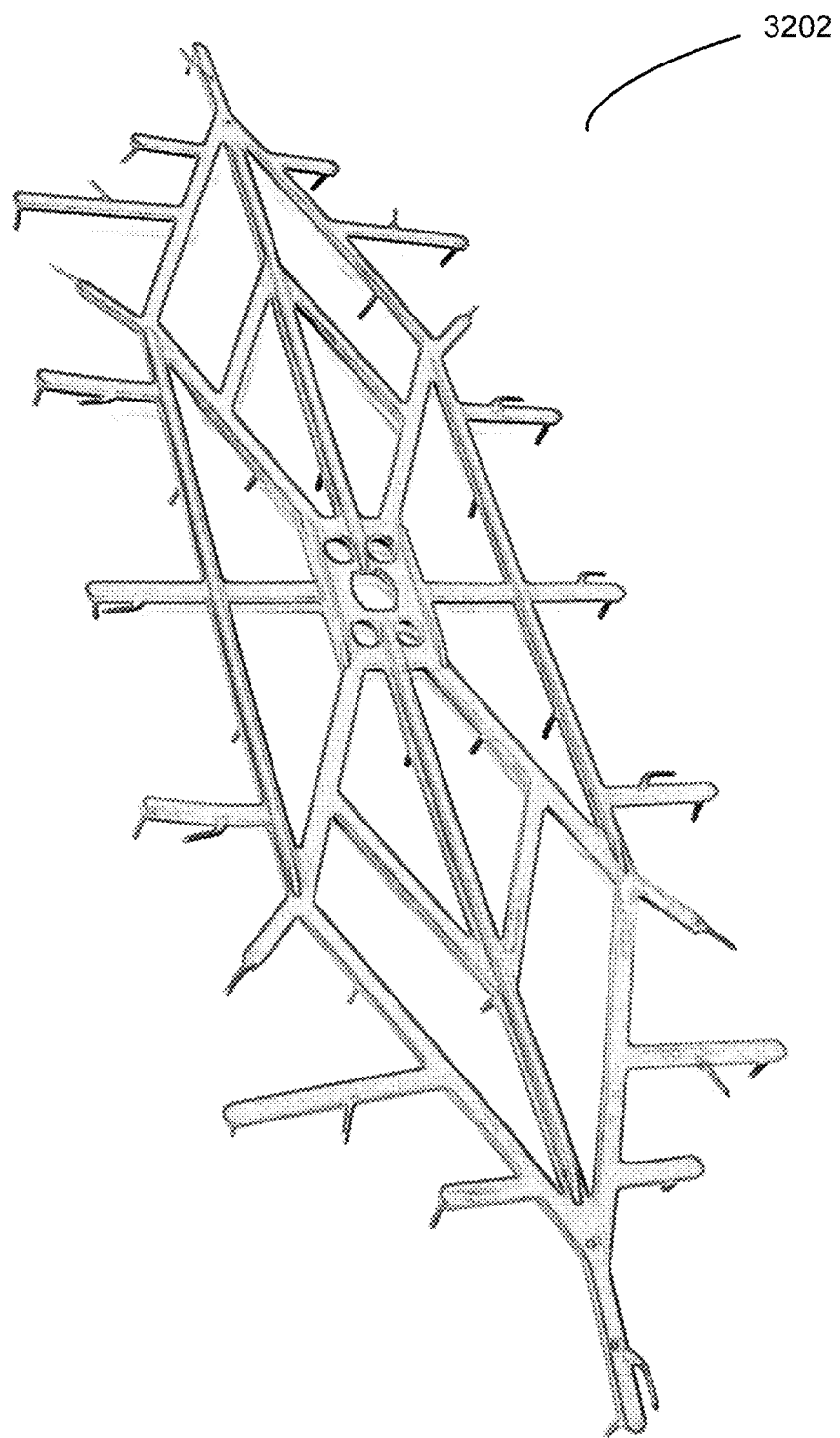
FIG. 36 shows another perspective view of the apparatus, in accordance with an embodiment of the present invention.

FIG. 36 shows another perspective view of the apparatus 3202, which exhibits predominantly another side of the apparatus 3202. This other side, e.g., the back side, of the apparatus 3202 shown in FIG. 36 comprises a plurality of connectors and a plurality of raised bands. There is no male connector extending upward from this other side and perpendicularly to the plane of this other side.

Figure 37:
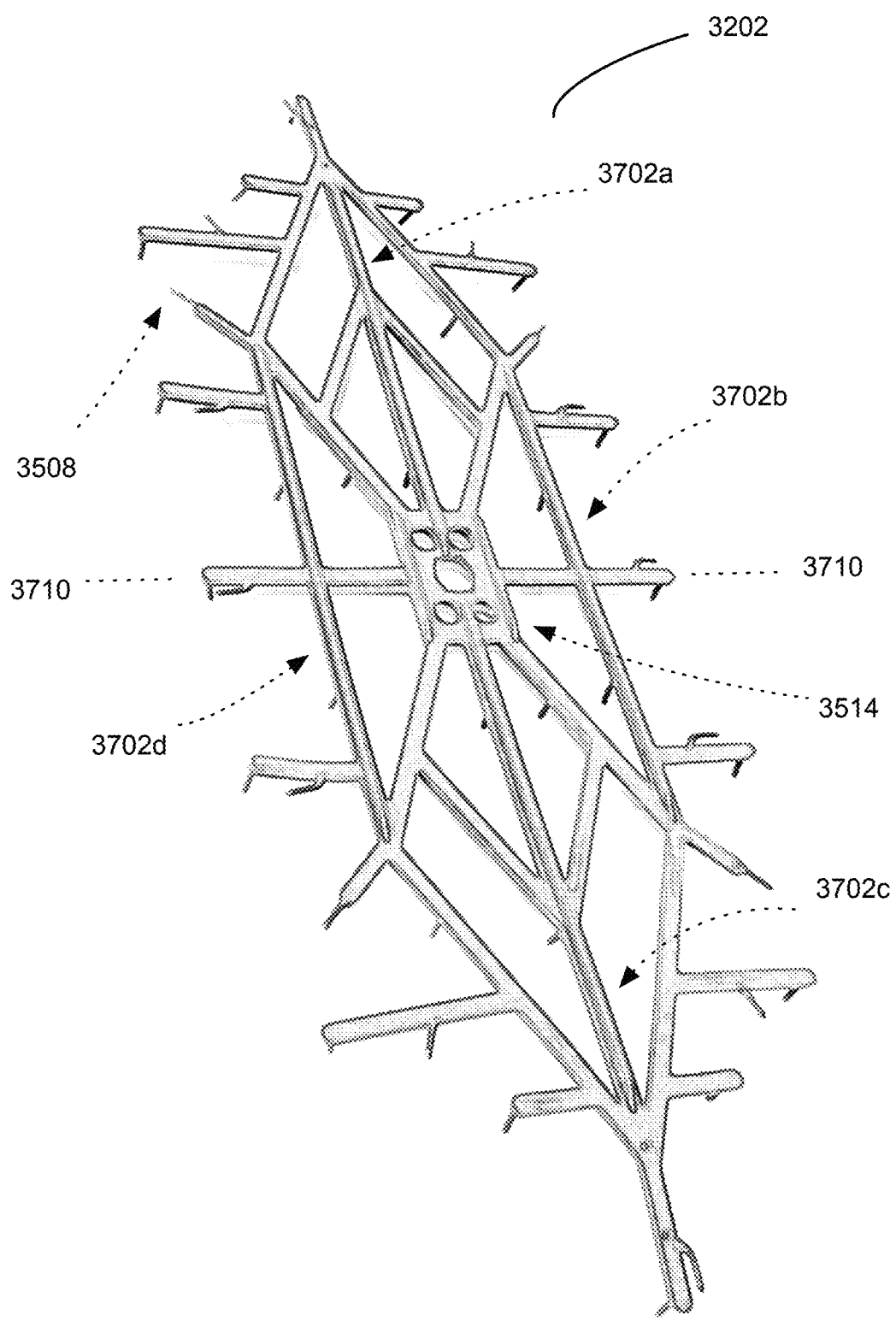
FIG. 37 shows yet another perspective view of the apparatus, in accordance with an embodiment of the present invention.

FIG. 37 shows the same or a similar perspective view of the apparatus 3202 as that in FIG. 36, with additional reference numerals that are not part of the apparatus 3202. There are male connectors, such as post 3508 in FIG. 37 (and the same post in FIG. 35), that are pointing along or aligned with this plane. This side of Part 3514 in FIG. 37 (and the same part in FIG. 35) has a pair of raised bands along one direction, but none orthogonally. Instead, this side of Part 3514 also has two singular raised bands in the middle, with one extending from the center hole in one direction in parallel with the pair of the raised bands, and the other extending from the center hole in the opposite direction, also in parallel with the pair of the raised bands. Such singular, or center, raised bands also exist on some of the other parts, such as part 3702a, 3702b, 3702c, and 3702d in FIG. 37.

Figure 38:
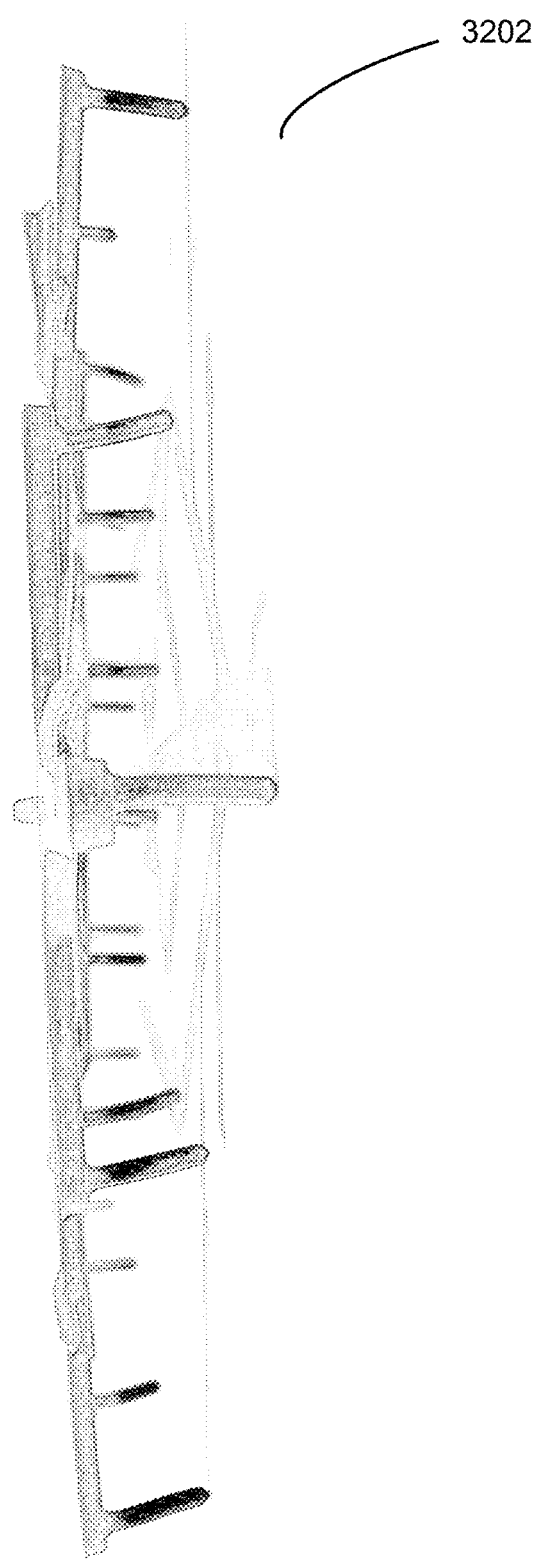
FIG. 38 shows some more view of the apparatus, in accordance with an embodiment of the present invention.

FIG. 38 shows yet another perspective of the apparatus 3202, which exhibits predominantly either a top or bottom view of the apparatus 3202. Whether it is a top or bottom view can depend on, for example, how the apparatus is oriented in relation to the orientation of the faux floral arrangement.

Figure 39:
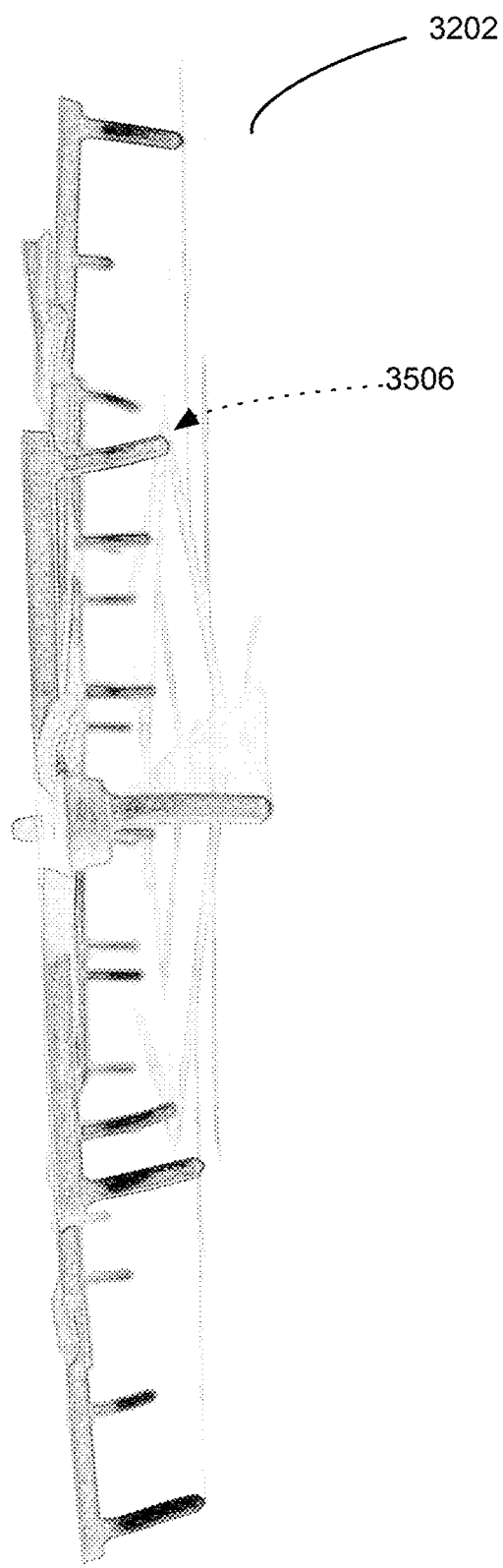
FIG. 39 shows an additional view of the apparatus, in accordance with an embodiment of the present invention.

FIG. 39 shows the same or a similar perspective view of the apparatus 3202 as that in FIG. 38, with an additional reference numeral that is not part of the apparatus 3202. The post connector 3506 can be seen from this view.

Figure 40:
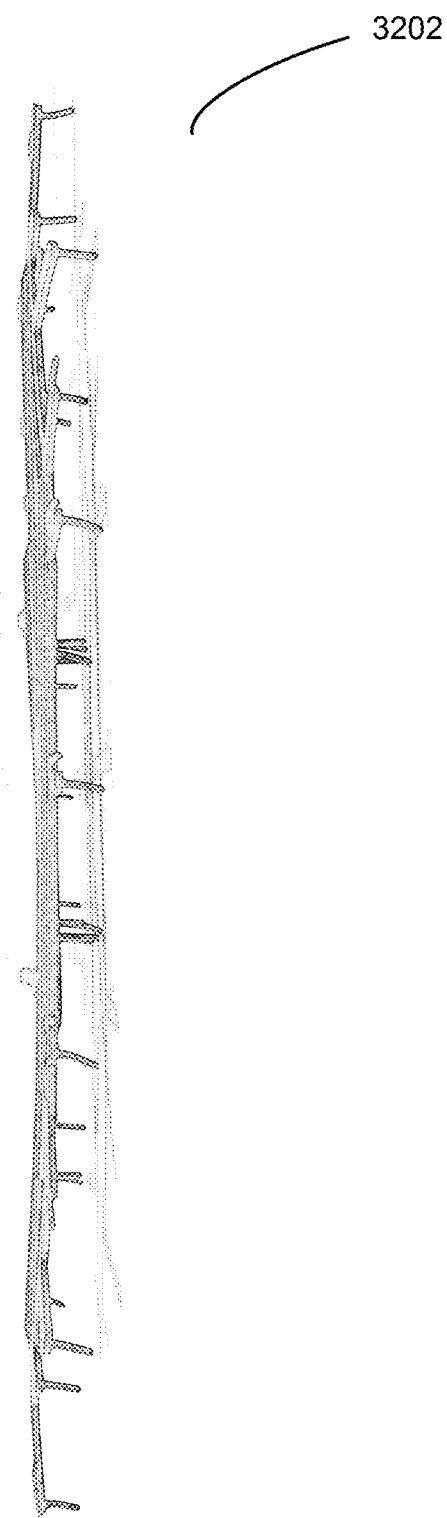
FIG. 40 shows more additional view of the apparatus, in accordance with an embodiment of the present invention.

FIG. 40 shows yet another perspective of the apparatus 3202, which exhibits predominantly a side view of the apparatus 3202. Whether it is a left or right side view can depend on, for example, how the apparatus is oriented in relation to the orientation of the faux floral arrangement.

Figure 41:
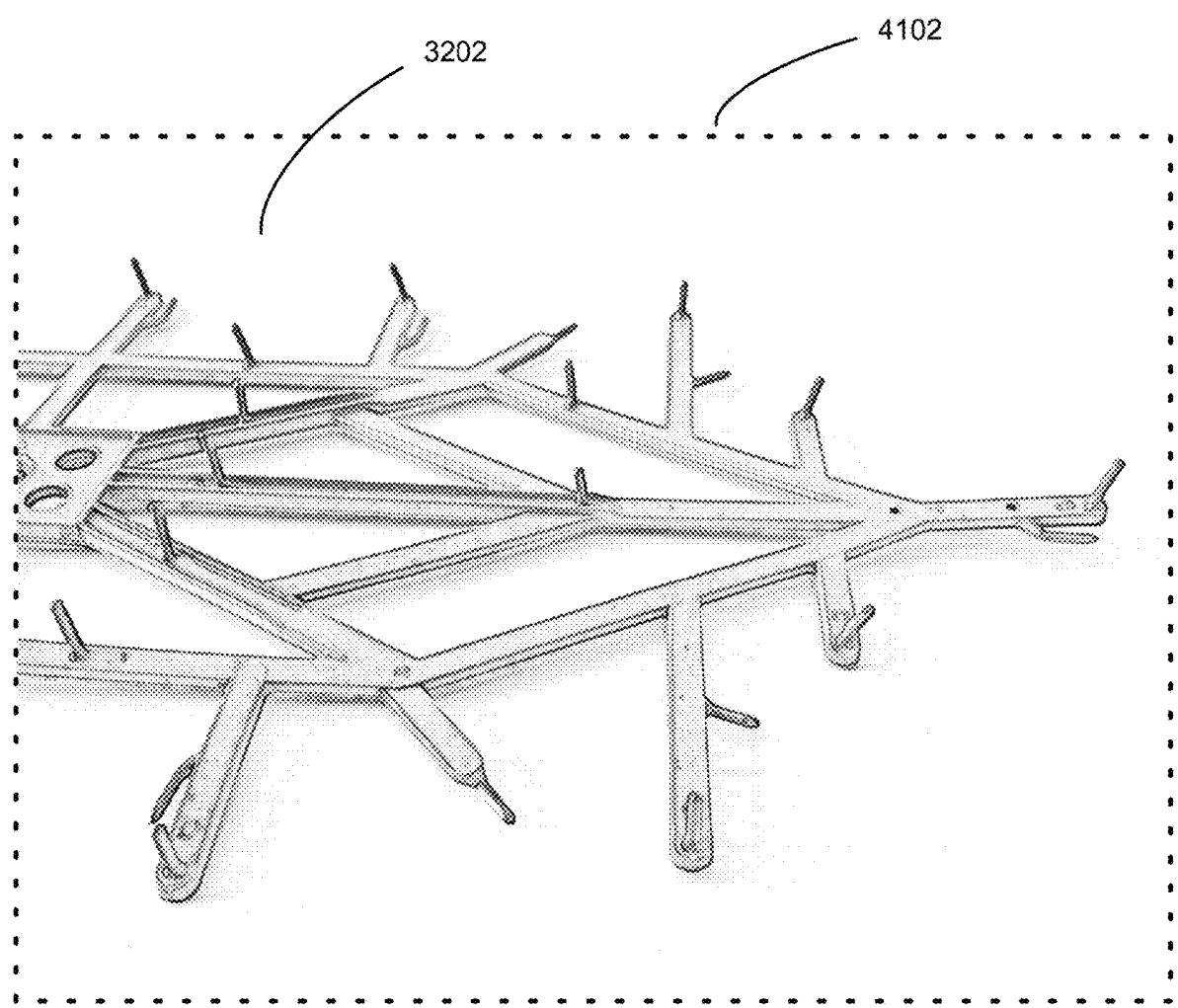
FIG. 41 shows a section or portion of the apparatus, with a view that is predominantly a front portion of the apparatus, in accordance with an embodiment of the present invention.

FIG. 41 shows a section or portion 4102 of the apparatus 3202, and the view exhibits predominantly a front portion of the apparatus 3202.

Figure 42:
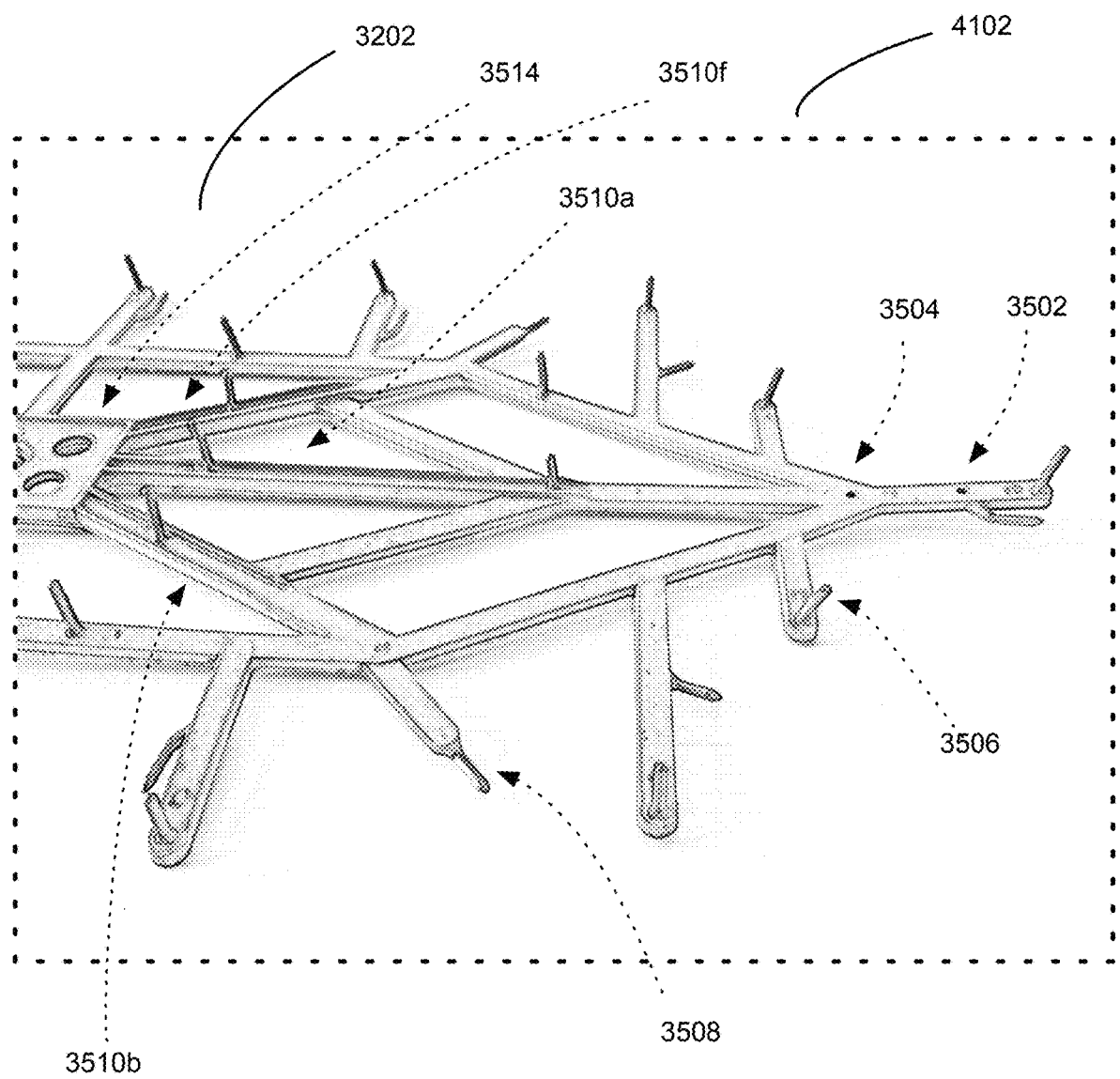
FIG. 42 shows the same or a similar perspective view of the apparatus as that in FIG. 41, with additional reference numerals.

FIG. 42 shows the same or a similar perspective view of the apparatus 3202 as that in FIG. 41, with additional reference numerals that are not part of the apparatus 3202. In one embodiment, a cross section of a linear portion or part of the apparatus 3202 would be rectangular if there is no raised band on any exterior side of the portion or part. The end of a raised band, such as the end of a center raised band and the ends of a pair of raised bands, may taper off, as illustrated by the parts 3702a, 3702b, 3702c, 3702d, and 3514 in FIG. 37, and the parts 3510a, 3510b, and 3510f in FIG. 42. Ends of raised bands may also bluntly end, as illustrated by the parts 3514, 3510f, 3510a, and 3510b in FIG. 42.

Figure 43A:
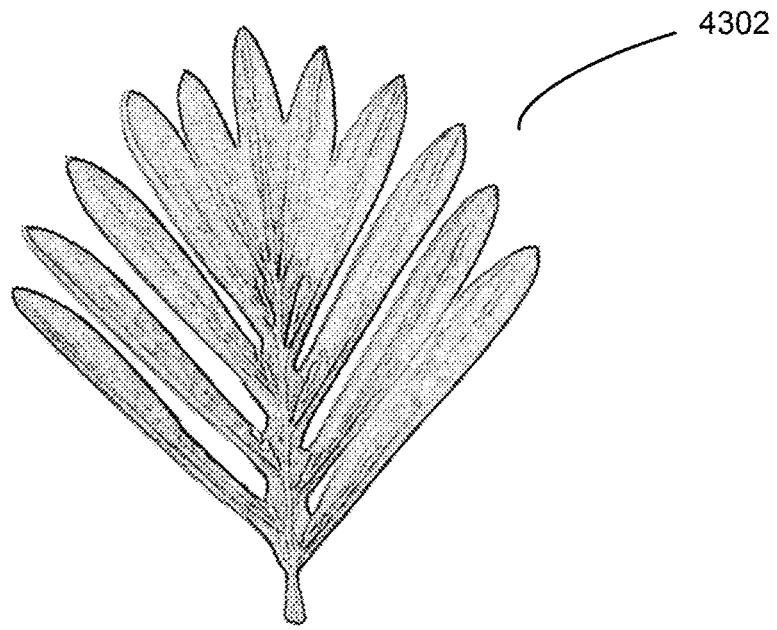
FIG. 43A and FIG. 43B show example faux floral artifacts compatible with the apparatus, in accordance with an embodiment of the present invention.
Figure 43B:
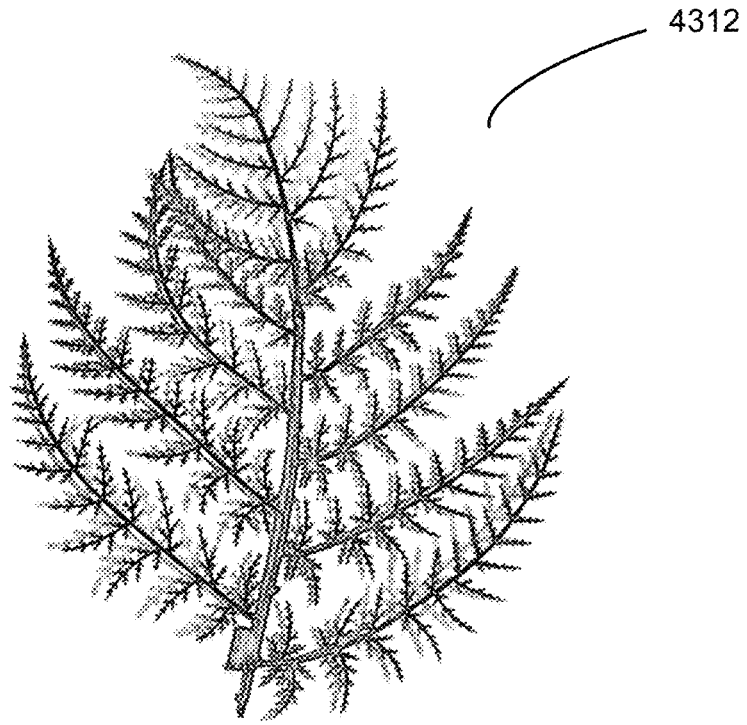

FIG. 43A and FIG. 43B show example faux floral artifacts 4302 and 4312 respectively, that comprise a female connector suitable for connection or attachment to the apparatus 3202. The faux floral artifacts 4302 and 4312, for example, may be a plant, or a section of a plant, such as a fern.

Figure 44:
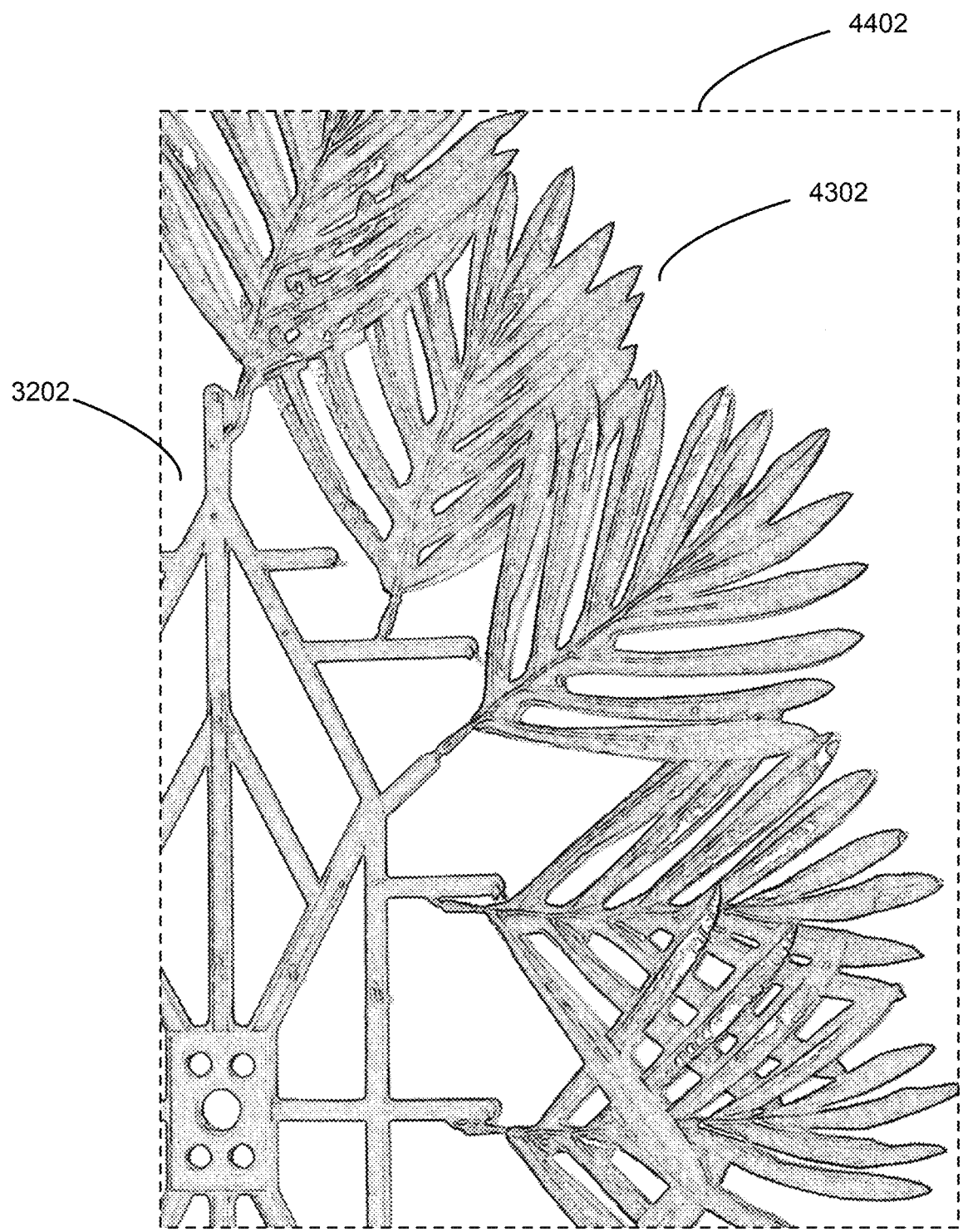
FIG. 44 shows a section or portion of the apparatus that has a plurality of artifacts attached to one or more male connectors, in accordance with an embodiment of the present invention.
Figure 45:
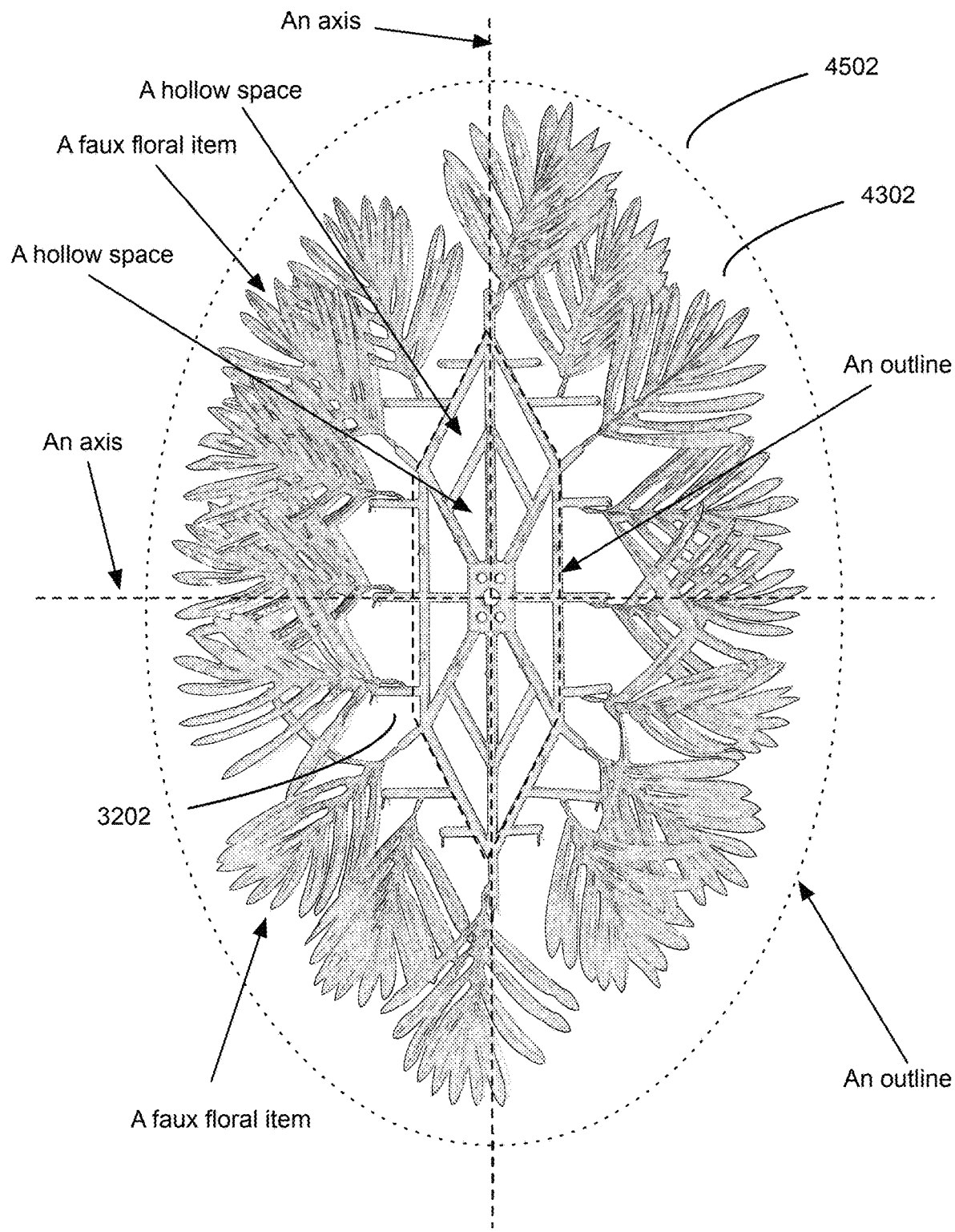
FIG. 45 shows an overall view of the apparatus that has a plurality of these artifacts attached to its male connectors, in accordance with an embodiment of the present invention.

FIG. 44 shows a section or portion 4402 of the apparatus 3202 that has a plurality of artifacts (based on the artifact 4302) attached to one or more male connectors that extend parallel to the geometrical plane of the front or back of the apparatus 3202, and away from the center of the apparatus 3202. FIG. 45 shows an overall view 4502 of the apparatus 3202 that has a plurality of these artifacts attached to its male connectors.

Figure 46:
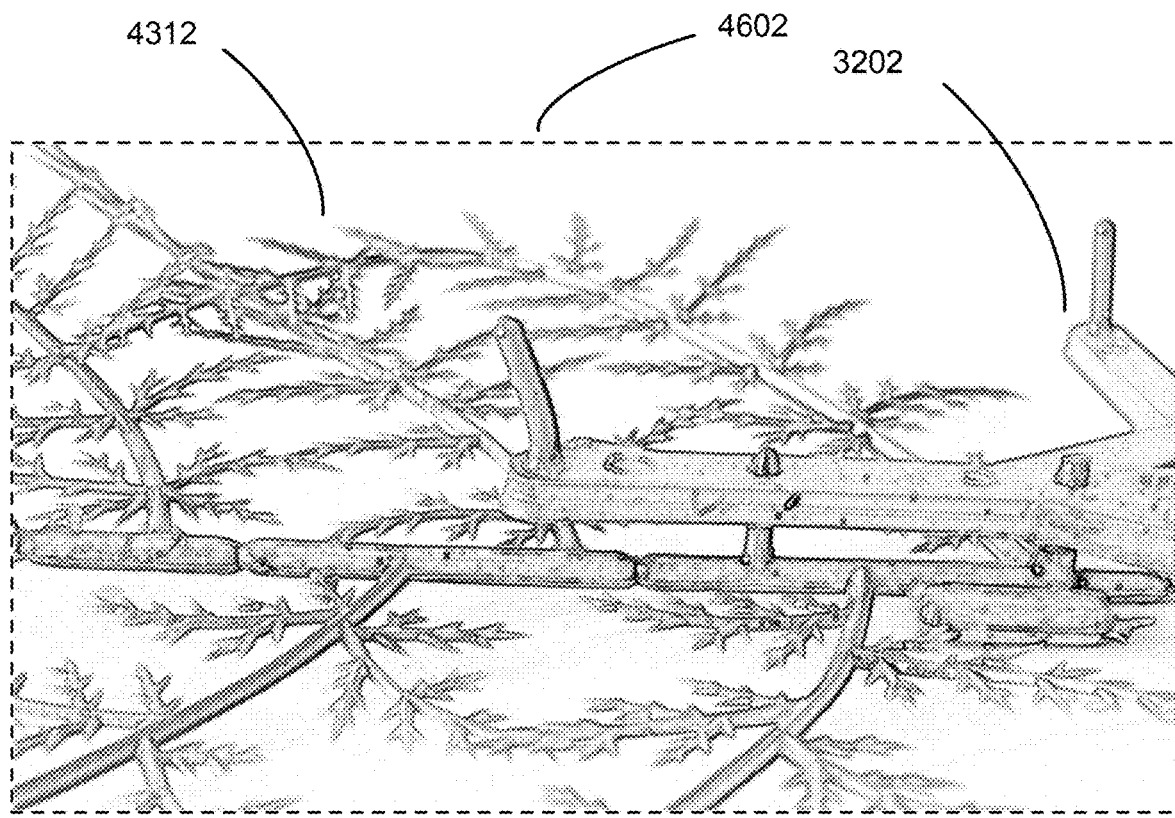
FIG. 46 shows a section or portion of the apparatus that has an artifact attached to one or more female connectors that are oriented for connection or attachment on either the front or the back side of the apparatus, in accordance with an embodiment of the present invention.
Figure 47:
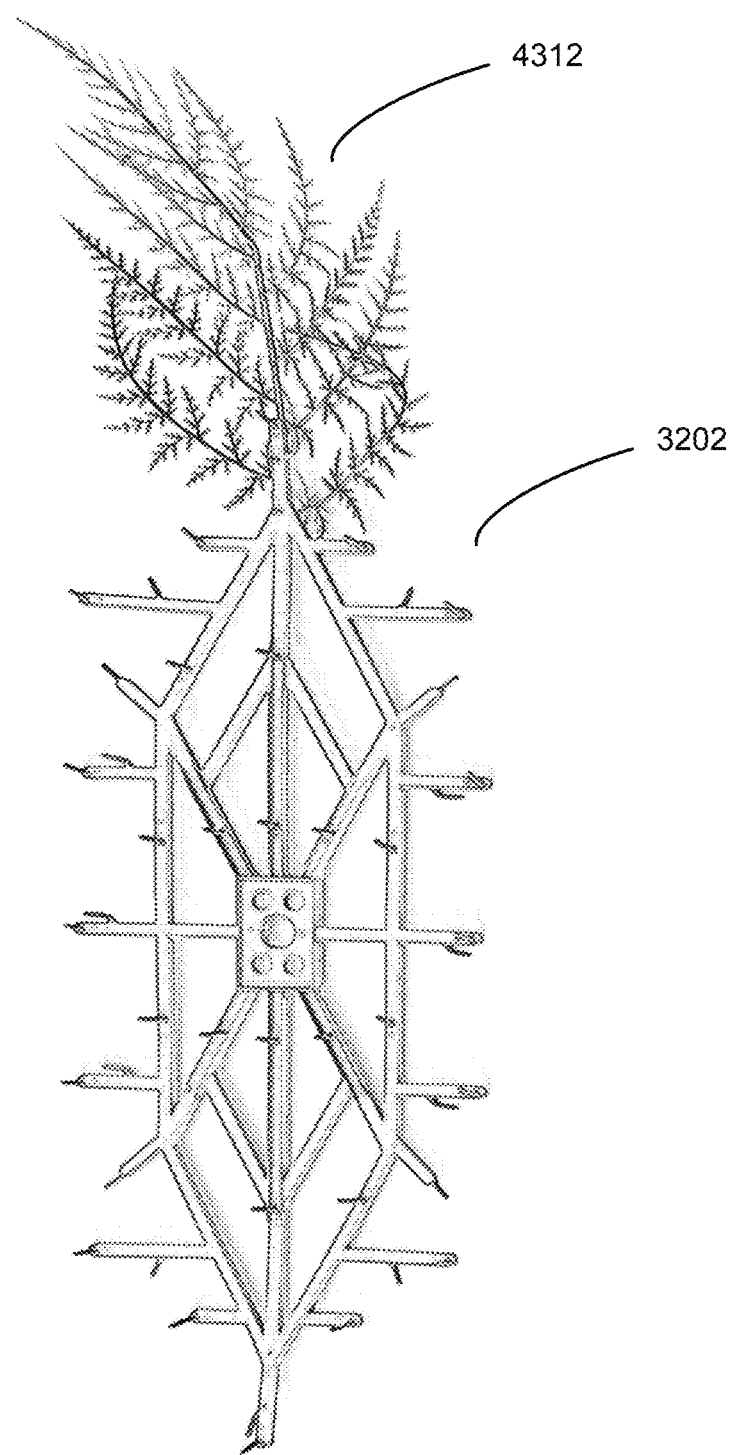
FIG. 47 shows a predominantly front view of the apparatus with an artifact attached, in accordance with an embodiment of the present invention.
Figure 48:
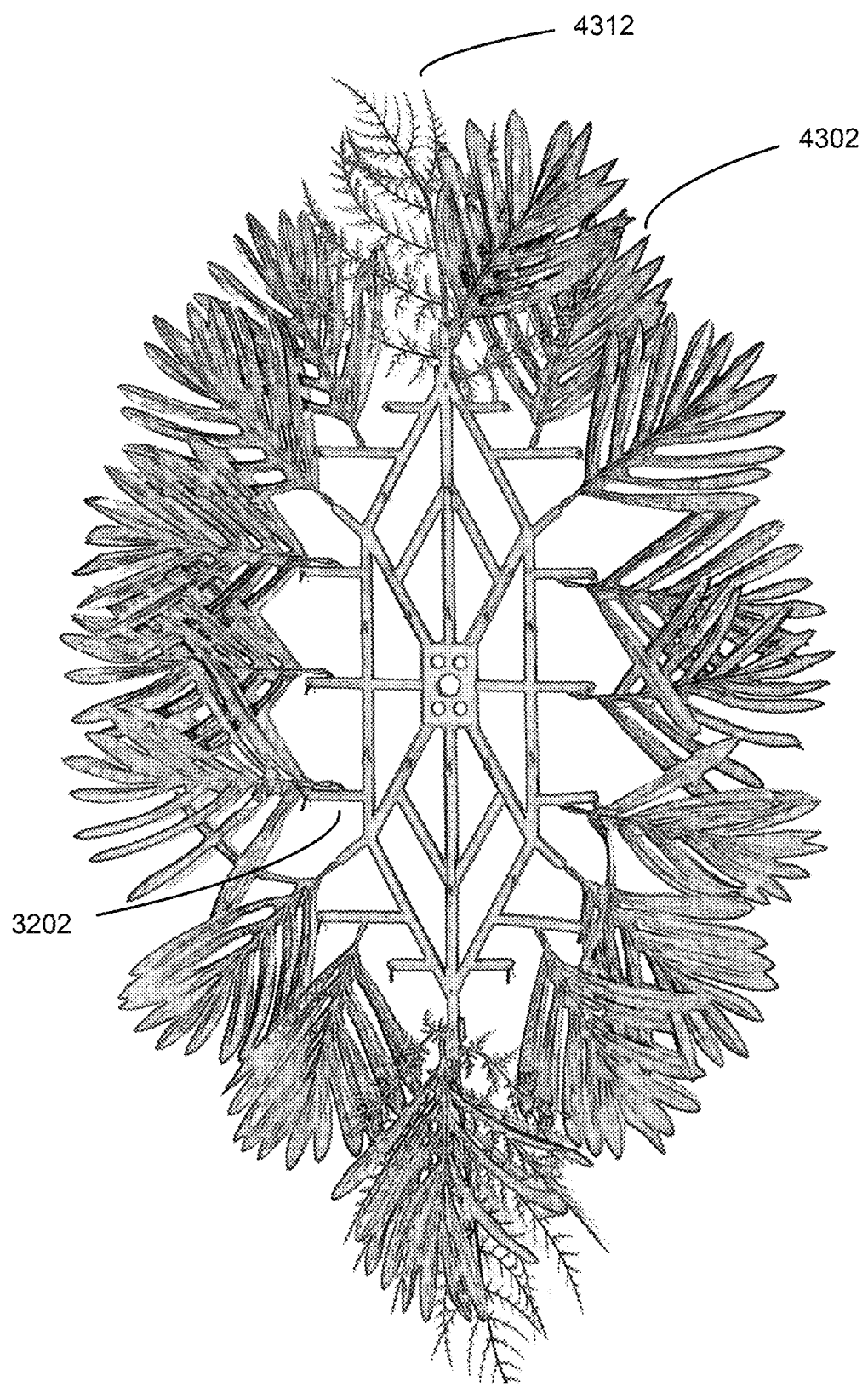
FIG. 48 shows a predominantly front view of the apparatus with a plurality of artifacts attached, in accordance with an embodiment of the present invention.

FIG. 46 shows a section or portion 4602 of the apparatus 3202 that has an artifact (based on the artifact 4312) attached to one or more female connectors that are oriented for connection or attachment on either the front or the back side of the apparatus 3202. The artifact shown in FIG. 46 possesses two male connectors that are mated with two female connectors (such as the connectors 3502 and 3504 shown in FIG. 35) from the back side of the apparatus 3202. In one embodiment as illustrated in FIG. 46, the two male connectors of the artifact 4312 are oriented perpendicular or orthogonal, or approximately so, to a surface of the artifact that is usually used or appreciated for presentation (e.g., the face of a fern). This connection or attachment arrangement thus demonstrates that an artifact (e.g., the artifact 4312) attaching or connecting via the back (or the front) of a support can be oriented in a similar fashion or manner as another artifact (e.g., the artifact 4302) attaching or connecting via a side of the support instead of the front or back. For example, both the artifacts 4302 and 4312 are planar in shape, and may extend outward around the apparatus, thereby increasing the footprint of the overall faux floral arrangement. For illustration, FIG. 47 shows a predominantly front view of the apparatus 3202 with the artifact 4312 (or a copy of the artifact 4312) attached, and FIG. 48 shows a predominantly front view of the apparatus 3202 with two copies of the artifact 4312 and a plurality of copies of the artifact 4302 attached.

Figure 49:
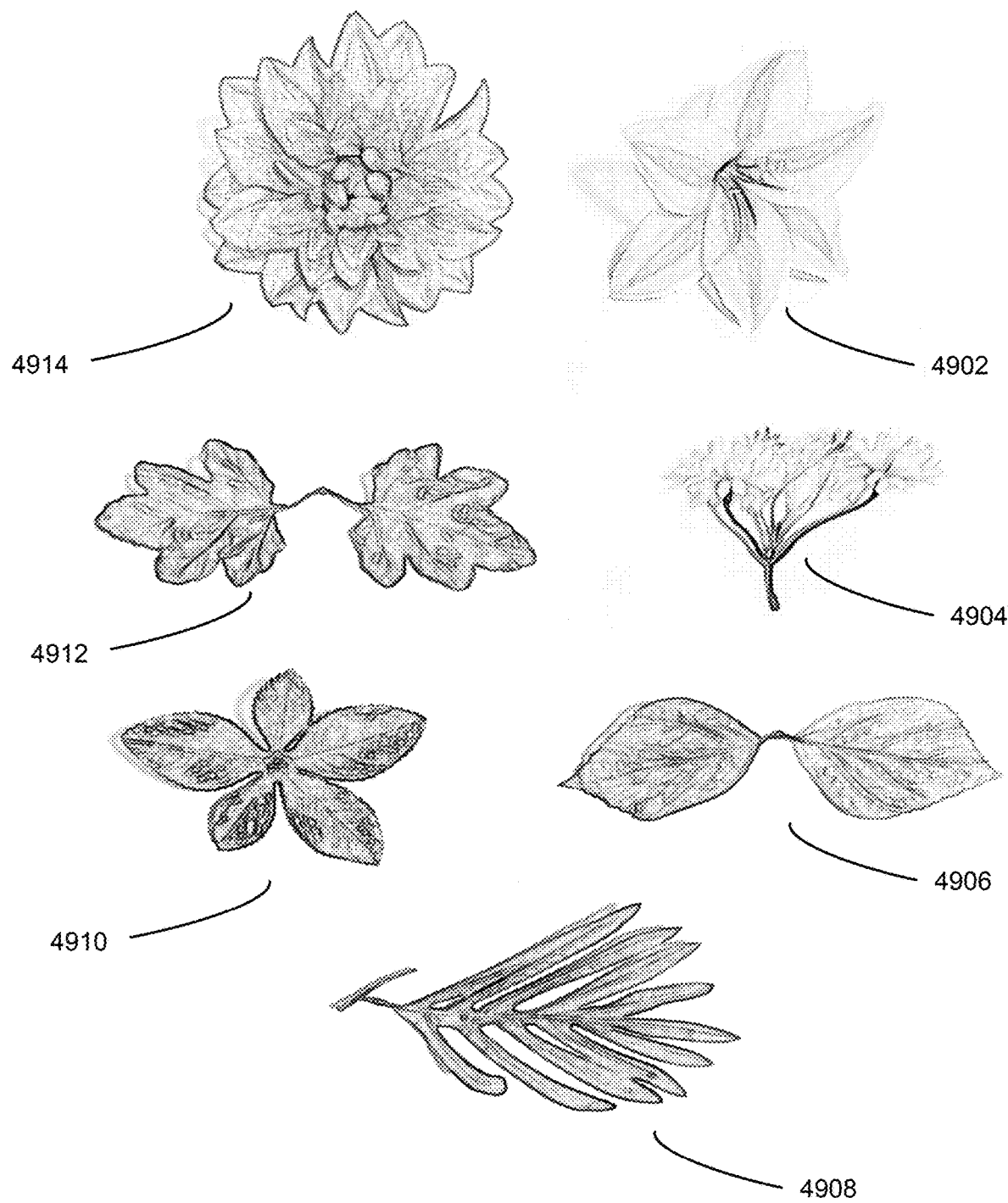
FIG. 49 shows a collection of faux floral artifacts that are compatible with the apparatus, in accordance with an embodiment of the present invention.

FIG. 49 shows a collection of faux floral artifacts 4902 (e.g., a lily), 4904 (e.g., a bundle of small flowers), 4906, 4908, 4910, 4912, and 4914 (e.g., a peony), that may attach to the apparatus 3202 via the male connectors on the front of the apparatus 3202. In one embodiment, these artifacts each possess a connector (e.g., a female connector, such as a ring as seen in the artifact 4912, or a stem comprising a hollow tube as seen in the artifact 4904) that is compatible for connection or attachment to the male connectors on the apparatus 3202.

Figure 50:
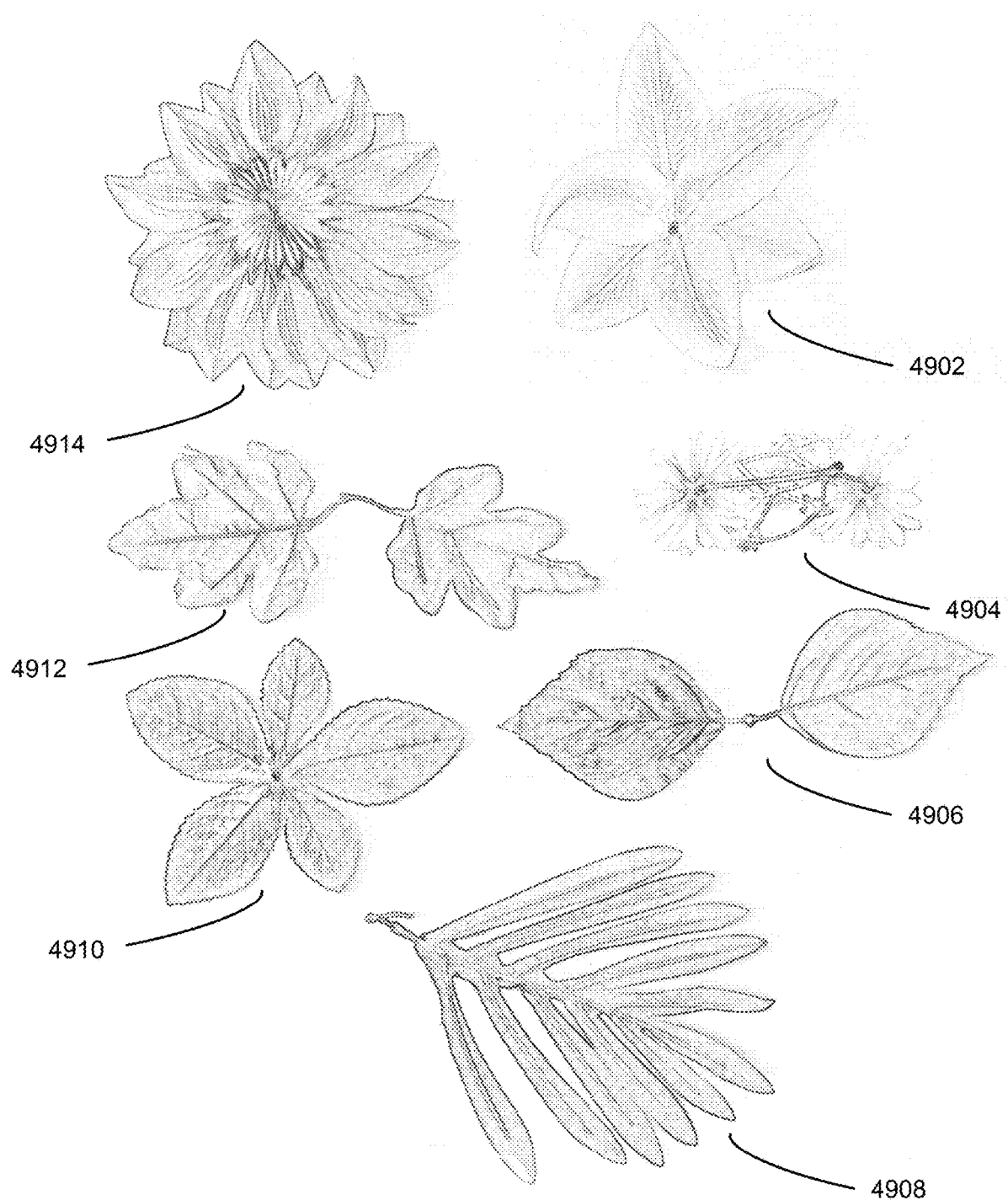
FIG. 50 shows another view or perspective of the faux floral artifacts.

FIG. 50 shows another view or perspective of the faux floral artifacts 4902, 4904, 4906, 4908, 4910, 4912, and 4914.

Figure 51:
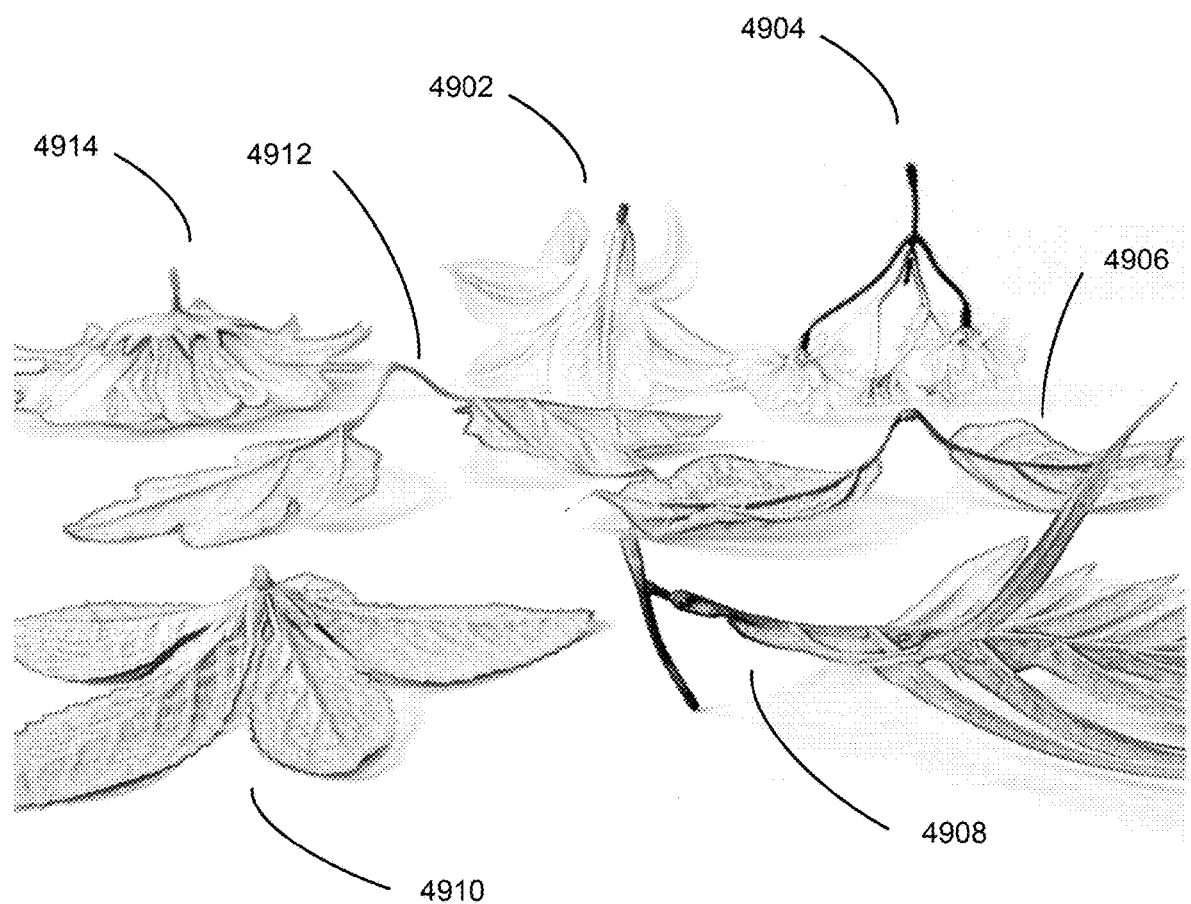
FIG. 51 shows yet another view or perspective of the faux floral artifacts.

FIG. 51 shows yet another view or perspective of the faux floral artifacts 4902, 4904, 4906, 4908, 4910, 4912, and 4914. The view is predominantly a side view of these artifacts.

Figure 52:
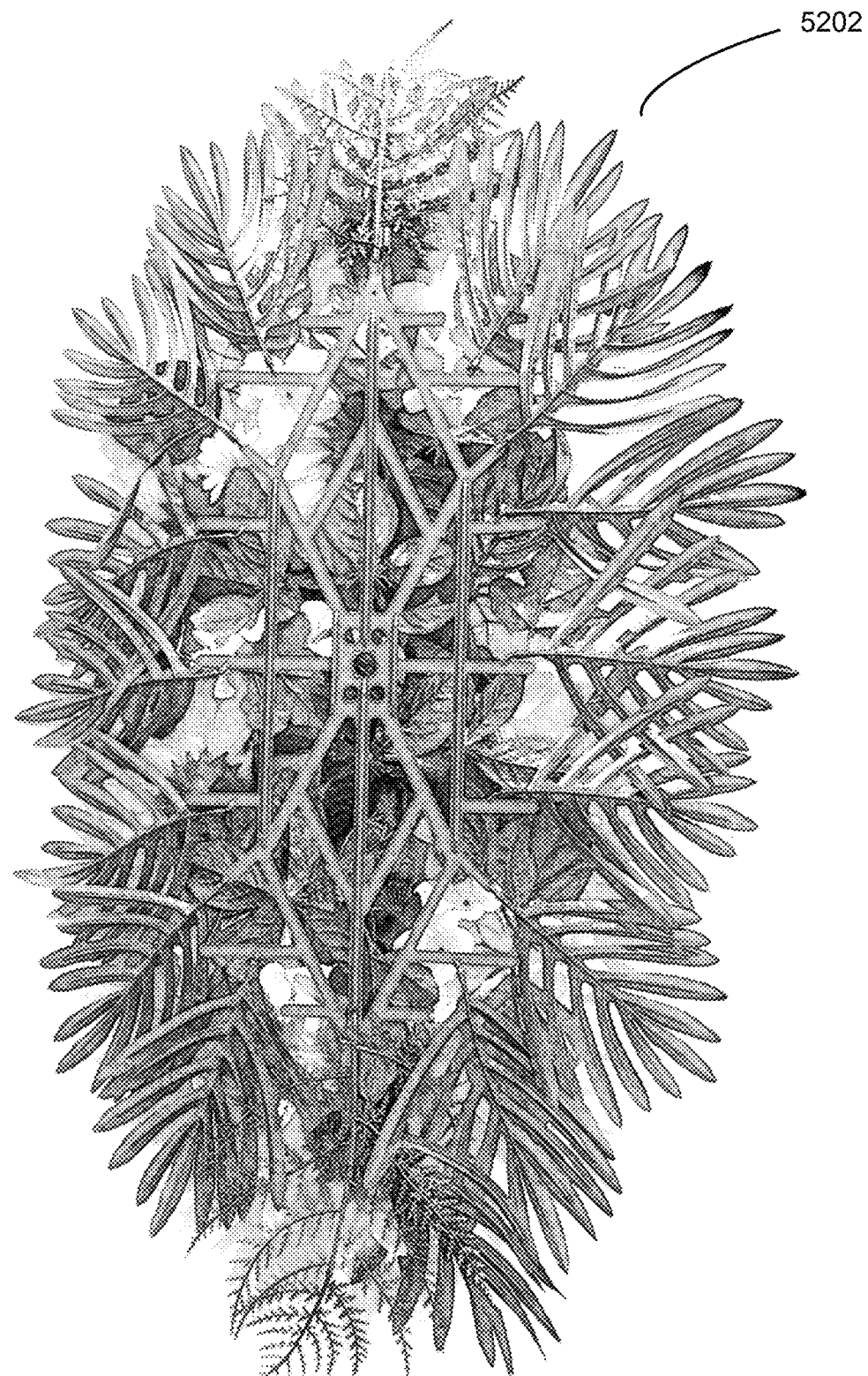
FIG. 52 shows a view, as seen from the back of the apparatus, of an example product that comprises the apparatus and a plurality of artifacts, in accordance with an embodiment of the present invention.
Figure 53:
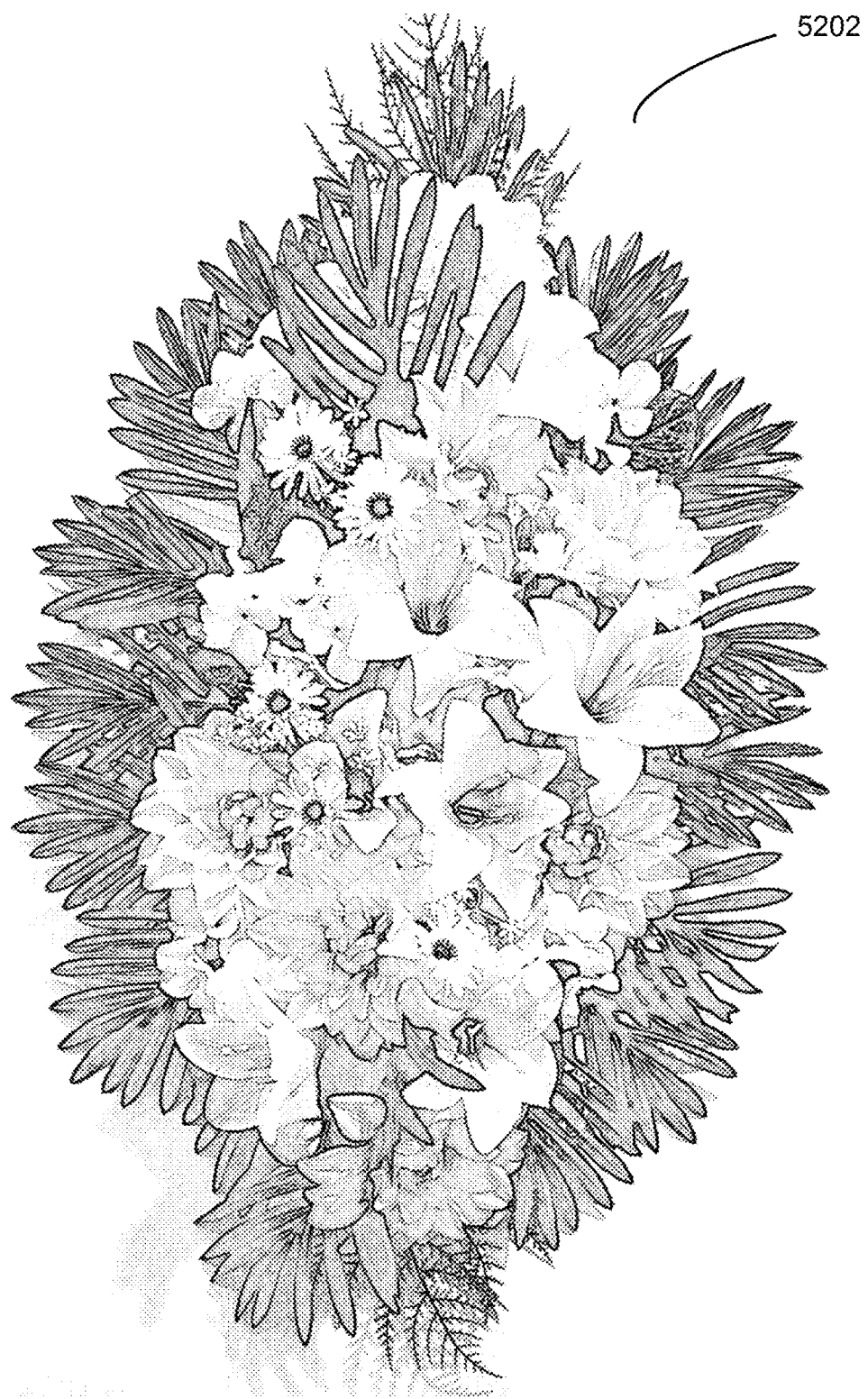
FIG. 53 shows another view, as seen from the front of the apparatus, of the example product, in accordance with an embodiment of the present invention.

FIG. 52 shows a view, as seen from the back of the apparatus 3202, of an example product 5202 that comprises the apparatus 3202 and copies of the artifacts 4302, 4312, 4902, 4904, 4906, 4908, 4910, 4912, and 4914, where these copies are attached to the apparatus 3202 in a manner so described, explained and illustrated herein. FIG. 53 shows another view, as seen from the front of the apparatus 3202, of the example product 5202.

In addition to the specific aspects, implementations, and embodiments explicitly set forth herein, other aspects, implementations, and embodiments will be apparent to those skilled in the art from consideration of the specification disclosed herein. It is intended that the specification and illustrated aspects, implementations, and embodiments be considered as examples only. For instance, while embodiments illustrate attachments of fax floral artifacts via a typical male-to-female connection or female-to-male connection, they do not exclude means of attachment or connection via two compatible connectors, even when these two connectors might not be classified or categorized as a male and a female connector respectively. Moreover, the present invention or an embodiment of the invention may comprise a plurality of inventive aspects, where one aspect alone or a subset from among them may be sufficient to provide meaningful improvements over the current art. Thus, although the invention has been described with respect to specific aspects, implementations, and embodiments, it will be appreciated that the invention is intended to cover all modifications and equivalents within the scope of the following claims.

What is claimed:

1. A support for floral arrangement comprising:
a first part and
one or more other parts;
wherein at least one part from among the first part or the one or more other parts comprises one or more connectors;
wherein at least one section from among the first part or the one or more other parts comprises three raised bands, wherein a surface normal of a top surface of a first raised band from among said three raised bands and a surface normal of a top surface of a second raised band from among said three raised bands point towards a direction, and a surface normal of a top surface of a third raised band from among said three raised bands points away from said direction; and
wherein a faux floral item is attached to a connector, and the one or more connectors comprise said connector.

2. The support of claim 1, wherein the at least one section from among the first part or the one or more other parts comprises a male or female connector, and the one or more connectors comprise the male or female connector.

3. The support of claim 2, wherein the male or female connector is situated between said first and second raised bands.

4. The support of claim 1, further comprising:
wherein the first part comprises a first outline and a plurality of extensions, wherein each of the plurality of extensions points from the first outline; and
at least one extension from among the plurality of extensions comprises one or more additional connectors.

5. The support of claim 1, wherein the one or more connectors comprise at least one connector placed on said at least one section.

6. The support of claim 1, wherein the one or more connectors comprise at least one connector placed on said at least one section, wherein said at least one connector is not placed between said first and second raised bands.

7. The support of claim 4, further comprising:
wherein the faux floral item is attached to a male connector;
wherein a plurality of artificial floral items form a second outline, and the second outline encompasses the first outline associated with the first part; and
wherein the one or more additional connectors comprise said male connection, and the plurality of artificial floral items comprise said faux floral item.

8. The support of claim 7, wherein the first outline associated with the first part is symmetrical around an axis.

9. The support of claim 8, further comprising:
wherein the first outline associated with the first part is symmetrical around at least two axes; and
wherein the second outline is round, and the first outline associated with the first part is not round.

10. The support of claim 8, further comprising:
wherein the one or more other parts are situated within the first outline.

11. The support of claim 10, further comprising:
wherein the first part or the one or more other parts comprises a hub, and an end of a raised band is attached or adjacent to a perimeter of the hub; and
wherein the three raised bands comprise-said raised band.

12. The support of claim 1, wherein said faux floral item is attached to said at least one section between said first and second raised bands via said connector from among the one or more connectors.

13. The support of claim 1, wherein said at least one section comprises said connector between said first and second raised bands for coupling said faux floral item.

14. A support for floral arrangement comprising:
a first part and
one or more other parts;
wherein at least one part from among the first part or the one or more other parts comprises one or more connectors;
wherein at least one section from among the first part or the one or more other parts comprises three raised bands, wherein a surface normal of a top surface of a first raised band from among said three raised bands and a surface normal of a top surface of a second raised band from among said three raised bands point towards a direction, and a surface normal of a top surface of a third raised band from among said three raised bands points away from said direction; and
wherein the first part or the one or more other parts enclose a plurality of hollow spaces.

15. The support of claim 14, further comprising:
wherein the first part or the one or more other parts are made of plastic; and
wherein the plurality of hollow spaces comprise four shapes, and each of the at least four shapes comprises at least three sides.

16. A support comprising:
one or more parts;
wherein a section from among the one or more parts comprises one or more connectors;
wherein said section comprises three raised bands, wherein a surface normal of a top surface of a first raised band from among said three raised bands and a surface normal of a top surface of a second raised band from among said three raised bands point towards a direction, and a surface normal of a top surface of a third raised band from among said three raised bands points away from said direction;
wherein said first and second raised bands each extend lengthwise along or near either edge of said at least one section; and
wherein the one or more connectors comprise a male or female connector.

17. The support of claim 16,
wherein the one or more parts comprise plastic and at least one rectangular or square cross section.

18. A frame comprising:
one or more parts;
a plurality of artificial floral items, wherein the plurality of artificial floral items are attached to the frame via one or more connectors;
wherein the plurality of artificial floral items form an outline above the frame;
wherein the one or more parts comprises a plurality of structures arranged in a series, wherein each structure traces an outer shape with at least four sides, and comprises at least two inner shapes, each comprising at least one hollow space;
wherein the at least one hollow space comprises a shape, and said shape comprises three sides; and
wherein the frame traces another outline, the outline formed above the frame by the plurality of artificial floral items and said other outline are not identical.

19. The frame of claim 18, wherein the one or more parts comprise plastic and at least one rectangular or square cross section.

20. A support for floral arrangement comprising:
a first part and
one or more other parts;
wherein at least one part from among the first part or the one or more other parts comprises one or more connectors;
wherein at least one section from among the first part or the one or more other parts comprises two raised bands each extending along a length of a surface and another raised band behind the surface;
wherein the at least one section from among the first part or the one or more other parts comprises a male or female connector, and the one or more connectors comprise the male or female connector; and
wherein a faux floral item is attached to the male or female connector, wherein the male or female connector is situated between said two raised bands.

* * * * *